(12) United States Patent
Chaturvedi et al.

(10) Patent No.: US 8,478,890 B2
(45) Date of Patent: Jul. 2, 2013

(54) SYSTEM AND METHOD FOR RELIABLE VIRTUAL BI-DIRECTIONAL DATA STREAM COMMUNICATIONS WITH SINGLE SOCKET POINT-TO-MULTIPOINT CAPABILITY

(75) Inventors: Sivakumar R. Chaturvedi, Allen, TX (US); Satish Gundabathula, Irving, TX (US); Rajaraman Krishnan, Chennai (IN)

(73) Assignee: Damaka, Inc., Richardson, TX (US)

( * ) Notice: Subject to any disclaimer, the term of this patent is extended or adjusted under 35 U.S.C. 154(b) by 158 days.

(21) Appl. No.: 13/183,587

(22) Filed: Jul. 15, 2011

(65) Prior Publication Data

US 2013/0019025 A1    Jan. 17, 2013

(51) Int. Cl.
*G06F 15/16* (2006.01)
(52) U.S. Cl.
USPC .......................................................... 709/231
(58) Field of Classification Search
USPC .......................................................... 709/231
See application file for complete search history.

(56) References Cited

U.S. PATENT DOCUMENTS

| | | |
|---|---|---|
| 5,442,637 A | 8/1995 | Nguyen |
| 5,761,309 A | 6/1998 | Ohashi et al. |
| 5,790,637 A | 8/1998 | Johnson et al. |
| 5,818,447 A | 10/1998 | Wolf et al. |
| 5,889,762 A | 3/1999 | Pajuvirta et al. |
| 6,031,818 A | 2/2000 | Lo et al. |
| 6,128,283 A | 10/2000 | Sabaa et al. |
| 6,141,687 A | 10/2000 | Blair |
| 6,161,082 A | 12/2000 | Goldberg et al. |
| 6,202,084 B1 | 3/2001 | Kumar et al. |
| 6,219,638 B1 | 4/2001 | Padmanabhan et al. |
| 6,298,129 B1 | 10/2001 | Culver et al. |
| 6,311,150 B1 | 10/2001 | Ramaswamy et al. |
| 6,343,067 B1 | 1/2002 | Drottar et al. |
| 6,360,196 B1 | 3/2002 | Poznanski et al. |
| 6,389,016 B1 | 5/2002 | Sabaa et al. |
| 6,438,376 B1 | 8/2002 | Elliott et al. |
| 6,473,425 B1* | 10/2002 | Bellaton et al. ............... 370/392 |
| 6,574,668 B1 | 6/2003 | Gubbi et al. |
| 6,741,691 B1 | 5/2004 | Ritter et al. |
| 6,754,181 B1 | 6/2004 | Elliott et al. |
| 6,766,373 B1 | 7/2004 | Beadle et al. |
| 6,826,613 B1 | 11/2004 | Wang et al. |
| 6,836,765 B1 | 12/2004 | Sussman |
| 6,842,460 B1 | 1/2005 | Olkkonen et al. |

(Continued)

FOREIGN PATENT DOCUMENTS

| | | |
|---|---|---|
| EP | 1404082 A2 | 3/2004 |
| EP | 160339 A1 | 12/2005 |

(Continued)

OTHER PUBLICATIONS

PCT: International Preliminary Report on Patentability of PCT/US2008/075141; Mar. 9, 2010; 5 pgs.

(Continued)

*Primary Examiner* — Jeffrey R Swearingen
(74) *Attorney, Agent, or Firm* — Howison & Arnott, L.L.P.

(57) ABSTRACT

An improved system and method are disclosed for reliable virtual bi-directional data stream (RVBDDS) connections. In one example, two communication devices create and exchange streaming data packets that are encapsulated in connection-less transport layer packets. The streaming data packets contain information used in managing the RVBDDS connection between the two devices.

23 Claims, 32 Drawing Sheets

U.S. PATENT DOCUMENTS

| | | |
|---|---|---|
| 6,850,769 B2 | 2/2005 | Grob et al. |
| 6,898,413 B2 | 5/2005 | Yip et al. |
| 6,912,278 B1 | 6/2005 | Hamilton |
| 6,940,826 B1 | 9/2005 | Simard et al. |
| 6,963,555 B1 | 11/2005 | Brenner, II et al. |
| 6,975,718 B1 | 12/2005 | Pearce et al. |
| 6,987,756 B1 | 1/2006 | Ravindranath et al. |
| 6,999,575 B1 | 2/2006 | Sheinbein |
| 6,999,932 B1 | 2/2006 | Zhou |
| 7,006,508 B2 | 2/2006 | Bondy et al. |
| 7,010,109 B2 | 3/2006 | Gritzer et al. |
| 7,013,155 B1 | 3/2006 | Ruf et al. |
| 7,079,529 B1 | 7/2006 | Khuc |
| 7,080,158 B1 | 7/2006 | Squire |
| 7,092,385 B2 | 8/2006 | Gallant et al. |
| 7,117,526 B1 | 10/2006 | Short |
| 7,123,710 B2 | 10/2006 | Ravishankar |
| 7,184,415 B2 | 2/2007 | Chaney et al. |
| 7,185,114 B1 * | 2/2007 | Hariharasubrahmanian . 709/250 |
| 7,272,377 B2 | 9/2007 | Cox et al. |
| 7,302,496 B1 | 11/2007 | Metzger |
| 7,304,985 B2 | 12/2007 | Sojka et al. |
| 7,345,999 B2 | 3/2008 | Su et al. |
| 7,346,044 B1 | 3/2008 | Chou et al. |
| 7,353,252 B1 | 4/2008 | Yang et al. |
| 7,353,255 B2 | 4/2008 | Acharya et al. |
| 7,412,374 B1 | 8/2008 | Seiler et al. |
| 7,457,279 B1 | 11/2008 | Scott et al. |
| 7,477,282 B2 | 1/2009 | Firestone et al. |
| 7,487,248 B2 | 2/2009 | Moran et al. |
| 7,512,652 B1 | 3/2009 | Appelman et al. |
| 7,542,472 B1 | 6/2009 | Gerendai et al. |
| 7,564,843 B2 * | 7/2009 | Manjunatha et al. ......... 370/389 |
| 7,570,743 B2 | 8/2009 | Barclay et al. |
| 7,574,523 B2 | 8/2009 | Traversat et al. |
| 7,590,758 B2 | 9/2009 | Takeda et al. |
| 7,613,171 B2 | 11/2009 | Zehavi et al. |
| 7,623,476 B2 | 11/2009 | Ravikumar et al. |
| 7,623,516 B2 | 11/2009 | Chaturvedi et al. |
| 7,656,870 B2 | 2/2010 | Ravikumar et al. |
| 7,664,495 B1 | 2/2010 | Bonner et al. |
| 7,769,881 B2 | 8/2010 | Matsubara et al. |
| 7,774,495 B2 | 8/2010 | Pabla et al. |
| 7,778,187 B2 | 8/2010 | Chaturvedi et al. |
| 7,782,866 B1 | 8/2010 | Walsh et al. |
| 7,917,584 B2 | 3/2011 | Arthursson |
| 8,009,586 B2 | 8/2011 | Chaturvedi et al. |
| 8,065,418 B1 | 11/2011 | Abuan et al. |
| 2001/0050923 A1 * | 12/2001 | Park et al. ...................... 370/474 |
| 2002/0031212 A1 | 3/2002 | O'Neil et al. |
| 2002/0037000 A1 | 3/2002 | Park et al. |
| 2002/0038282 A1 | 3/2002 | Montgomery |
| 2002/0042769 A1 | 4/2002 | Gujral et al. |
| 2002/0062285 A1 | 5/2002 | Amann et al. |
| 2002/0064167 A1 | 5/2002 | Khan et al. |
| 2002/0080719 A1 | 6/2002 | Parkvall et al. |
| 2002/0087887 A1 | 7/2002 | Busam et al. |
| 2002/0097150 A1 | 7/2002 | Sandelman et al. |
| 2002/0120757 A1 | 8/2002 | Sutherland et al. |
| 2002/0124096 A1 * | 9/2002 | Loguinov et al. ............. 709/230 |
| 2002/0143548 A1 | 10/2002 | Korall et al. |
| 2002/0150110 A1 | 10/2002 | Inbar et al. |
| 2002/0166053 A1 | 11/2002 | Wilson |
| 2002/0173303 A1 | 11/2002 | Shibutani |
| 2002/0176404 A1 | 11/2002 | Girard |
| 2002/0178087 A1 | 11/2002 | Henderson et al. |
| 2002/0184310 A1 | 12/2002 | Traversat et al. |
| 2003/0009565 A1 | 1/2003 | Arao |
| 2003/0031210 A1 | 2/2003 | Harris |
| 2003/0035441 A1 | 2/2003 | Cheng et al. |
| 2003/0043764 A1 | 3/2003 | Kim et al. |
| 2003/0044020 A1 | 3/2003 | Aboba et al. |
| 2003/0046056 A1 | 3/2003 | Godoy et al. |
| 2003/0046585 A1 | 3/2003 | Minnick |
| 2003/0061025 A1 | 3/2003 | Abir |
| 2003/0061481 A1 | 3/2003 | Levine et al. |
| 2003/0072485 A1 | 4/2003 | Guerin et al. |
| 2003/0076815 A1 | 4/2003 | Miller et al. |
| 2003/0078858 A1 | 4/2003 | Angelopoulos et al. |
| 2003/0088676 A1 | 5/2003 | Smith et al. |
| 2003/0105812 A1 | 6/2003 | Flowers, Jr. et al. |
| 2003/0110047 A1 | 6/2003 | Santosuosso |
| 2003/0115251 A1 | 6/2003 | Fredrickson et al. |
| 2003/0126213 A1 | 7/2003 | Betzler |
| 2003/0135569 A1 | 7/2003 | Khakoo et al. |
| 2003/0137939 A1 | 7/2003 | Dunning et al. |
| 2003/0158722 A1 | 8/2003 | Lord |
| 2003/0163525 A1 | 8/2003 | Hendriks et al. |
| 2003/0163697 A1 | 8/2003 | Pabla et al. |
| 2003/0172145 A1 | 9/2003 | Nguyen |
| 2003/0174707 A1 | 9/2003 | Grob et al. |
| 2003/0177186 A1 | 9/2003 | Goodman et al. |
| 2003/0177422 A1 | 9/2003 | Tararoukhine et al. |
| 2003/0187650 A1 | 10/2003 | Moore et al. |
| 2003/0202480 A1 | 10/2003 | Swami |
| 2003/0214955 A1 | 11/2003 | Kim |
| 2003/0217171 A1 | 11/2003 | Von Stuermer et al. |
| 2003/0217318 A1 | 11/2003 | Choi |
| 2003/0220121 A1 | 11/2003 | Konishi et al. |
| 2003/0229715 A1 * | 12/2003 | Baratakke et al. ............ 709/245 |
| 2004/0005877 A1 | 1/2004 | Vaananen |
| 2004/0024879 A1 | 2/2004 | Dingman et al. |
| 2004/0034776 A1 | 2/2004 | Fernando et al. |
| 2004/0034793 A1 | 2/2004 | Yuan |
| 2004/0039781 A1 | 2/2004 | LaVallee et al. |
| 2004/0044517 A1 | 3/2004 | Palmquist |
| 2004/0052234 A1 | 3/2004 | Ameigeiras et al. |
| 2004/0062267 A1 * | 4/2004 | Minami et al. ................. 370/463 |
| 2004/0068567 A1 | 4/2004 | Moran et al. |
| 2004/0100973 A1 | 5/2004 | Prasad |
| 2004/0103212 A1 | 5/2004 | Takeuchi et al. |
| 2004/0128554 A1 | 7/2004 | Maher, III et al. |
| 2004/0133689 A1 | 7/2004 | Vasisht |
| 2004/0139225 A1 | 7/2004 | Takahashi |
| 2004/0139228 A1 | 7/2004 | Takeda et al. |
| 2004/0139230 A1 | 7/2004 | Kim |
| 2004/0143678 A1 | 7/2004 | Chari et al. |
| 2004/0148434 A1 | 7/2004 | Matsubara et al. |
| 2004/0153858 A1 | 8/2004 | Hwang |
| 2004/0158471 A1 | 8/2004 | Davis et al. |
| 2004/0162871 A1 | 8/2004 | Pabla et al. |
| 2004/0203834 A1 | 10/2004 | Mahany |
| 2004/0213184 A1 | 10/2004 | Hu et al. |
| 2004/0228279 A1 | 11/2004 | Midtun et al. |
| 2004/0240399 A1 | 12/2004 | Corrao et al. |
| 2004/0249953 A1 | 12/2004 | Fernandez et al. |
| 2004/0260952 A1 | 12/2004 | Newman et al. |
| 2004/0267527 A1 | 12/2004 | Creamer et al. |
| 2004/0267938 A1 | 12/2004 | Shoroff et al. |
| 2004/0268257 A1 | 12/2004 | Mudusuru |
| 2005/0004982 A1 | 1/2005 | Vernon et al. |
| 2005/0008024 A1 | 1/2005 | Newpol et al. |
| 2005/0015502 A1 * | 1/2005 | Kang et al. .................... 709/228 |
| 2005/0033843 A1 | 2/2005 | Shahi et al. |
| 2005/0033985 A1 | 2/2005 | Xu et al. |
| 2005/0050227 A1 | 3/2005 | Michelman |
| 2005/0071481 A1 | 3/2005 | Danieli |
| 2005/0086309 A1 | 4/2005 | Galli et al. |
| 2005/0091407 A1 | 4/2005 | Vaziri et al. |
| 2005/0105524 A1 | 5/2005 | Stevens et al. |
| 2005/0119005 A1 | 6/2005 | Segal et al. |
| 2005/0120073 A1 | 6/2005 | Cho |
| 2005/0130650 A1 | 6/2005 | Creamer et al. |
| 2005/0132009 A1 | 6/2005 | Solie |
| 2005/0136911 A1 | 6/2005 | Csapo et al. |
| 2005/0138119 A1 | 6/2005 | Saridakis |
| 2005/0138128 A1 | 6/2005 | Baniel et al. |
| 2005/0143105 A1 | 6/2005 | Okamoto |
| 2005/0144288 A1 | 6/2005 | Liao |
| 2005/0187957 A1 | 8/2005 | Kramer et al. |
| 2005/0195802 A1 | 9/2005 | Klein et al. |
| 2005/0198499 A1 | 9/2005 | Salapaka et al. |
| 2005/0201357 A1 | 9/2005 | Poyhonen |
| 2005/0201485 A1 * | 9/2005 | Fay ................. 375/295 |
| 2005/0208947 A1 | 9/2005 | Bahl |
| 2005/0220017 A1 | 10/2005 | Brand et al. |
| 2005/0246193 A1 | 11/2005 | Roever et al. |

| Publication No. | Date | Inventor |
|---|---|---|
| 2005/0249196 A1 | 11/2005 | Ansari et al. |
| 2005/0254440 A1 | 11/2005 | Sorrell |
| 2005/0270992 A1 | 12/2005 | Sanzgiri et al. |
| 2005/0286519 A1 | 12/2005 | Ravikumar et al. |
| 2006/0002355 A1 | 1/2006 | Baek et al. |
| 2006/0062180 A1 | 3/2006 | Sayeedi et al. |
| 2006/0069775 A1* | 3/2006 | Artobello et al. .............. 709/225 |
| 2006/0072506 A1 | 4/2006 | Sayeedi et al. |
| 2006/0120375 A1 | 6/2006 | Ravikumar et al. |
| 2006/0121902 A1 | 6/2006 | Jagadeesan et al. |
| 2006/0121986 A1 | 6/2006 | Pelkey et al. |
| 2006/0148516 A1 | 7/2006 | Reddy et al. |
| 2006/0165029 A1* | 7/2006 | Melpignano et al. ......... 370/328 |
| 2006/0168643 A1 | 7/2006 | Howard et al. |
| 2006/0171534 A1 | 8/2006 | Baughman |
| 2006/0182100 A1 | 8/2006 | Li et al. |
| 2006/0183476 A1 | 8/2006 | Morita et al. |
| 2006/0187926 A1 | 8/2006 | Imai et al. |
| 2006/0195402 A1 | 8/2006 | Malina et al. |
| 2006/0203750 A1 | 9/2006 | Ravikumar et al. |
| 2006/0205436 A1 | 9/2006 | Liu et al. |
| 2006/0218624 A1 | 9/2006 | Ravikumar et al. |
| 2006/0230166 A1 | 10/2006 | Philyaw |
| 2006/0246903 A1 | 11/2006 | Kong et al. |
| 2006/0258289 A1 | 11/2006 | Dua |
| 2007/0016921 A1 | 1/2007 | Levi et al. |
| 2007/0019545 A1 | 1/2007 | Alt et al. |
| 2007/0025270 A1 | 2/2007 | Sylvain |
| 2007/0078785 A1 | 4/2007 | Bush et al. |
| 2007/0082671 A1 | 4/2007 | Feng et al. |
| 2007/0110043 A1 | 5/2007 | Girard |
| 2007/0111794 A1 | 5/2007 | Hogan et al. |
| 2007/0116224 A1 | 5/2007 | Burke et al. |
| 2007/0130253 A1 | 6/2007 | Newson et al. |
| 2007/0136459 A1 | 6/2007 | Roche et al. |
| 2007/0165629 A1 | 7/2007 | Chaturvedi et al. |
| 2007/0190987 A1 | 8/2007 | Vaananen |
| 2007/0206563 A1 | 9/2007 | Silver et al. |
| 2007/0253435 A1 | 11/2007 | Keller et al. |
| 2007/0260359 A1 | 11/2007 | Benson et al. |
| 2007/0274276 A1 | 11/2007 | Laroia et al. |
| 2007/0297430 A1 | 12/2007 | Nykanen et al. |
| 2008/0005328 A1 | 1/2008 | Shively et al. |
| 2008/0019285 A1 | 1/2008 | John et al. |
| 2008/0032695 A1 | 2/2008 | Zhu et al. |
| 2008/0069105 A1 | 3/2008 | Costa et al. |
| 2008/0080392 A1 | 4/2008 | Walsh et al. |
| 2008/0091813 A1 | 4/2008 | Bodlaender |
| 2008/0123685 A1 | 5/2008 | Varma et al. |
| 2008/0130639 A1 | 6/2008 | Costa-Requena et al. |
| 2008/0168440 A1 | 7/2008 | Regnier et al. |
| 2008/0192756 A1 | 8/2008 | Damola et al. |
| 2008/0235362 A1 | 9/2008 | Kjesbu et al. |
| 2008/0235511 A1 | 9/2008 | O'Brien et al. |
| 2008/0250408 A1 | 10/2008 | Tsui et al. |
| 2008/0273541 A1 | 11/2008 | Pharn |
| 2008/0320096 A1 | 12/2008 | Szeto |
| 2009/0003322 A1 | 1/2009 | Isumi |
| 2009/0006076 A1 | 1/2009 | Jindal |
| 2009/0052399 A1 | 2/2009 | Silver et al. |
| 2009/0055473 A1 | 2/2009 | Synnergren |
| 2009/0088150 A1 | 4/2009 | Chaturvedi et al. |
| 2009/0136016 A1 | 5/2009 | Gornoi et al. |
| 2009/0156217 A1 | 6/2009 | Bajpai |
| 2009/0182815 A1 | 7/2009 | Czechowski et al. |
| 2009/0192976 A1 | 7/2009 | Spivack et al. |
| 2009/0234967 A1 | 9/2009 | Yu et al. |
| 2009/0240821 A1 | 9/2009 | Juncker et al. |
| 2009/0257433 A1 | 10/2009 | Mutikainen et al. |
| 2009/0300673 A1 | 12/2009 | Bachet et al. |
| 2009/0327516 A1 | 12/2009 | Amishima et al. |
| 2010/0011108 A1 | 1/2010 | Clark et al. |
| 2010/0011111 A1 | 1/2010 | Vizaei |
| 2010/0049980 A1 | 2/2010 | Barriga et al. |
| 2010/0077023 A1 | 3/2010 | Eriksson |
| 2010/0107205 A1 | 4/2010 | Foti |
| 2010/0223047 A1 | 9/2010 | Christ |
| 2010/0279670 A1 | 11/2010 | Ghai et al. |
| 2010/0299150 A1 | 11/2010 | Fein et al. |
| 2010/0299313 A1 | 11/2010 | Orsini et al. |
| 2010/0312832 A1 | 12/2010 | Allen et al. |
| 2010/0312897 A1 | 12/2010 | Allen et al. |
| 2011/0040836 A1 | 2/2011 | Allen et al. |
| 2011/0099612 A1 | 4/2011 | Lee et al. |
| 2011/0122864 A1 | 5/2011 | Cherifi et al. |
| 2011/0145687 A1 | 6/2011 | Grigsby et al. |
| 2011/0314134 A1 | 12/2011 | Foti |
| 2012/0263144 A1 | 10/2012 | Nix |

FOREIGN PATENT DOCUMENTS

| | | |
|---|---|---|
| EP | 1638275 A2 | 3/2006 |
| EP | 1848163 A1 | 10/2007 |
| EP | 1988697 A1 | 11/2008 |
| EP | 1988698 A1 | 11/2008 |
| JP | 2005-94600 | 4/2005 |
| JP | 2007-043598 | 2/2007 |
| KR | 10-2005-0030548 | 3/2005 |
| WO | WO 03/079635 | 9/2003 |
| WO | WO 2004/063843 | 7/2004 |
| WO | WO 2005/009019 | 1/2005 |
| WO | 2006064047 A1 | 6/2006 |
| WO | WO 2006/075677 A1 | 7/2006 |

OTHER PUBLICATIONS

PCT: International Preliminary Report on Patentability of PCT/US2007/068820; Dec. 31, 2008; 8 pgs.
PCT: International Preliminary Report on Patentability of PCT/US2007/068823; Nov. 27, 2008; 8 pgs.
PCT: International Preliminary Report on Patentability of PCT/US2006/047841; Nov. 6, 2008; 7 pgs.
PCT: International Preliminary Report on Patentability of PCT/US2007/002424; Aug. 7, 2008; 6 pgs.
PCT: International Preliminary Report on Patentability of PCT/US2006/040312; May 2, 2008; 5 pgs.
PCT: International Preliminary Report on Patentability of PCT/IB2005/000821; Oct. 19, 2006; 10 pgs.
PCT: International Search Report and Written Opinion for PCT/US2011/024870; Oct. 26, 2011; 12 pages.
J. Rosenberg et al. "Session Traversal Utilities for NAT (STUN)", draft-ietf-behave-rfc3489bis-06, Mar. 5, 2007.
PCT: International Search Report and Written Opinion for PCT/US2011/028685; Nov. 9, 2011; 10 pages.
PCT: International Search Report and Written Opinion for PCT/US2011/029954; Nov. 24, 2011; 8 pages.
PCT: International Search Report and Written Opinion for PCT/US2011/024891; Nov. 25, 2011; 9 pages.
PCT: International Search Report and Written Opinion for PCT/US2011/031245; Dec. 26, 2011; 13 pages.
Wireless Application Protocol—Wireless Transport Layer Security Specification, Version Feb. 18, 2000, Wireless Application Forum, Ltd. 2000; 99 pages.
PCT: International Search Report and Written Opinion for PCT/US2011/040864; Feb. 17, 2012; 8 pages.
PCT: International Search Report and Written Opinion for PCT/US2011/041565; Jan. 5, 2012; 7 pages.
PCT: International Search Report and Written Opinion for PCT/US2011/031246; Dec. 27, 2011; 8 pages.
PCT: International Search Report and Written Opinion for PCT/US2011/049000; Mar. 27, 2012; 10 pages.
PCT: International Search Report and Written Opinion for PCT/US2011/051877; Apr. 13, 2012; 7 pages.
PCT: International Search Report and Written Opinion for PCT/US2011/055101; May 22, 2012; 9 pages.
Balamurugan Karpagavinayagam et al. (Monitoring Architecture for Lawful Interception in VoIP Networks, ICIMP 2007, Aug. 24, 2008).
NiceLog User's Manual 385A0114-08 Rev. A2, Mar. 2004.
WISPA: Wireless Internet Service Providers Association; WISPA-CS-IPNA-2.0; May 1, 2009.
PCT: International Preliminary Report on Patentability of PCT/US2011/024870; Aug. 30, 2012; 7 pgs.
RFC 5694 ("Peer-to-Peer (P2P) Architecture: Definition, Taxonomies, Examples, and Applicability", Nov. 2009).

Mahy et al., The Session Initiation Protocol (SIP) "Replaces" Header, Sep. 2004, RFC 3891, pp. 1-16.
PCT: International Preliminary Report on Patentability of PCT/US2011/024891; Aug. 30, 2012; 6 pgs.
T. Dierks & E. Rescorla, The Transport Layer Security (TLS) Protocol (Ver. 1.2, Aug. 2008) retrieved at http://tools.ietf.org/htmllrfc5246. Relevant pages provided.
J. Rosenberg et al., SIP: Session Initiation Protocol (Jun. 2008) retrieved at http://tools.ietf.org/html/rfc3261. Relevant pages provided.
Philippe Bazot et al., Developing SIP and IP Multimedia Subsystem (IMS) Applications (Feb. 5, 2007) retrieved at redbooks IBM form number: SG24-7255-00. Relevant pages provided.
PCT: International Preliminary Report on Patentability of PCT/US2011/028685; Oct. 4, 2012; 6 pgs.
PCT: International Preliminary Report on Patentability of PCT/US2011/031245; Oct. 26, 2012; 9 pgs.
PCT: International Preliminary Report on Patentability of PCT/US2011/029954; Oct. 11, 2012; 5 pgs.
PCT: International Preliminary Report on Patentability of PCT/US2011/031246; Nov. 8, 2012; 5 pgs.
Rosenberg, J; "Interactive Connectivity Establishment (ICE): A Protocol for Network Address Translator (NAT) Traversal for Offer/Answer Protocols"; Oct. 29, 2007; I ETF; I ETF draft of RFC 5245, draft-ietf-mmusic-ice-19; pp. 1-120.
Blanchet et al; "IPv6 Tunnel Broker with the Tunnel Setup Protocol (TSP)"; May 6, 2008; IETF; IETF draft of RFC 5572, draftblanchet-v6ops-tunnelbroker-tsp-04; pp. 1-33.
Cooper et al; "NAT Traversal for dSIP"; Feb. 25, 2007; IETF; IETF draft draft-matthews-p2psip-dsip-nat-traversal-00; pp. 1-23.
Cooper et al; "The Effect of NATs on P2PSIP Overlay Architecture"; IETF; IETF draft draft-matthews-p2psip-nats-and-overlays-01.txt; pp. 1-20.
Srisuresh et al; "State of Peer-to-Peer(P2P) Communication Across Network Address Translators(NATs)"; Nov. 19, 2007; I ETF; I ETF draft for RFC 5128, draft-ietf-behave-p2p-state-06.txt; pp. 1-33.
PCT: International Search Report and Written Opinion for PCT/US2012/046026; Oct. 18, 2012; 6 pages.
Dunigan, Tom, "Almost TCP over UDP (atou)," last modified Jan. 12, 2004; retrieved on Jan. 18, 2011 from <http://www.csm.ornl.gov/~dunigan/net100/atou.html> 18 pgs.
Chathapuram, "Security in Peer-To-Peer Networks", Aug. 8, 2001, XP002251813.
International Search Report and Written Opinion of the International Searching Authority from PCT/IB2005/000821, dated Aug. 5, 2005.
International Search Report and Written Opinion of the International Searching Authority from PCT/US2006/032791, dated Dec. 18, 2006.
International Search Report and Written Opinion of the International Searching Authority from PCT/US2006/040312, dated Mar. 2, 2007.
International Search Report and Written Opinion of the International Searching Authority from PCT/US2006/047841, dated Sep. 12, 2008.
International Search Report and Written Opinion of the International Searching Authority from PCT/US2007/002424, dated Aug. 14, 2007.
International Search Report and Written Opinion of the International Searching Authority from PCT/US2007/068820, dated Jun. 11, 2008.
International Search Report and Written Opinion of the International Searching Authority from PCT/US2007/068821, dated Jun. 14, 2008.
International Search Report and Written Opinion of the International Searching Authority from PCT/US2007068823, dated Jun. 1, 2008.
Jeff Tyson, "How Instant Messaging Works", www.verizon.com/learningcenter, Mar. 9, 2005.
Rory Bland, et al,"P2P Routing" Mar. 2002.
Rosenberg, "STUN—Simple Traversal of UDP Through NAT", Sep. 2002, XP015005058.
Salman A. Baset, et al, "An Analysis of the Skype Peer-To-Peer Internet Telephony Protocol", Department of Computer Science, Columbia University, New York, NY, USA, Sep. 15, 2004.
Singh et al., "Peer-to Peer Internet Telephony Using SIP", Department of Computer Science, Columbia University, Oct. 31, 2004, XP-002336408.
Sinha, S. and Oglieski, A., A TCP Tutorial, Nov. 1998 (Date posted on Internet: Apr. 19, 2001) [Retrieved from the Internet <URL:http//www.ssfnet.org/Exchange/tcp/tcpTutorialNotes.html>].
Pejman Khadivi, Terence D. Todd and Dongmei Zhao, "Handoff trigger nodes for hybrid IEEE 802.11 WLAN/cellular networks," Proc. of IEEE International Conference on Quality of Service in Heterogeneous Wired/Wireless Networks, pp. 164-170, Oct. 18, 2004.
International Search Report and Written Opinion of the International Searching Authority from PCT/US2008/078142, dated Mar. 27, 2009.
International Search Report and Written Opinion of the International Searching Authority from PCT/US2008/084950, dated Apr. 27, 2009.
Hao Wang, Skype VoIP service-architecture and comparison, In: INFOTECH Seminar Advanced Communication Services (ASC), 2005, pp. 4, 7, 8.
Seta, N.; Miyajima, H.; Zhang, L;; Fujii, T., "All-SIP Mobility: Session Continuity on Handover in Heterogeneous Access Environment," Vehicular Technology Conference, 2007. VTC 2007-Spring. IEEE 65th, Apr. 22-25, 2007, pp. 1121-1126.
International Search Report and Written Opinion of the International Searching Authority from PCT/US2008/075141, dated Mar. 5, 2009.
Qian Zhang; Chuanxiong Guo; Zihua Guo; Wenwu Zhu, "Efficient mobility management for vertical handoff between WWAN and WLAN," Communications Magazine, IEEE, vol. 41. issue 11, Nov. 2003, pp. 102-108.
Isaacs, Ellen et al., "Hubbub: A sound-enhanced mobile instant messenger that supports awareness and opportunistic interactions," Proceedings of the SIGCHI Conference on Human Factors in Computing Systems; vol. 4, Issue No. 1; Minneapolis, Minnesota; Apr. 20-25, 2002; pp. 179-186.
PCT: International Preliminary Report on Patentability of PCT/US2008/084950; Jun. 1, 2010; 5 pgs.

* cited by examiner

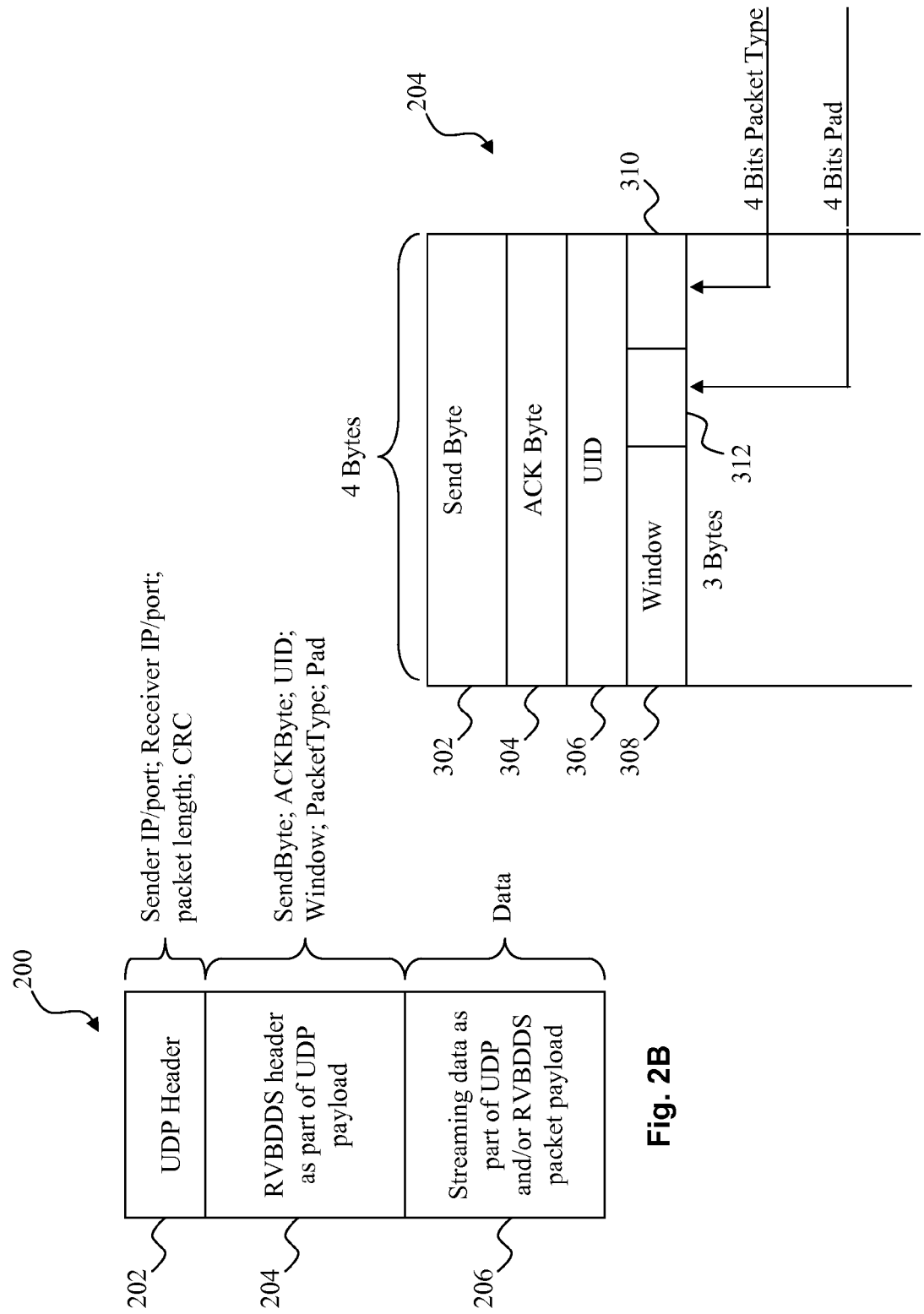

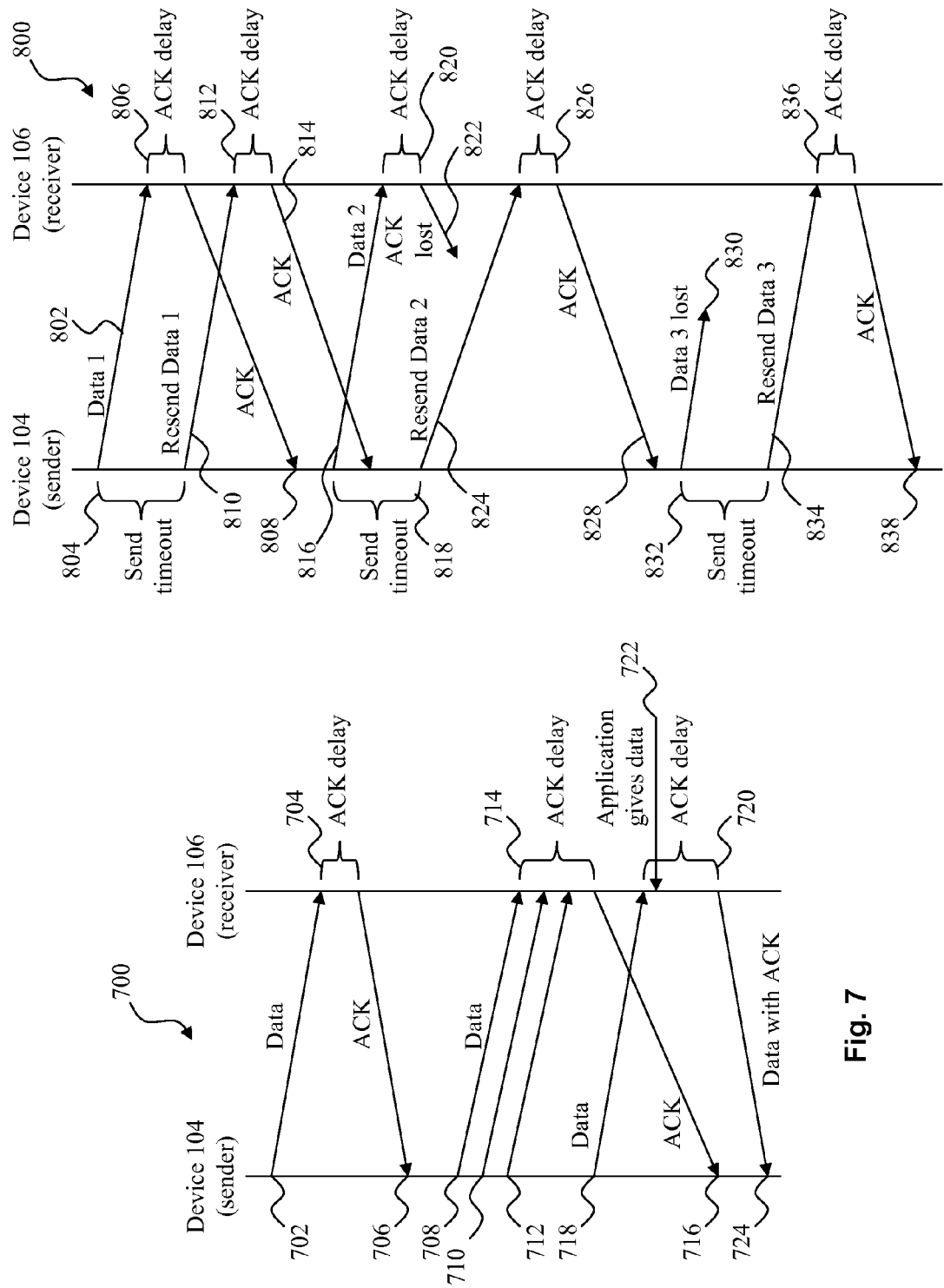

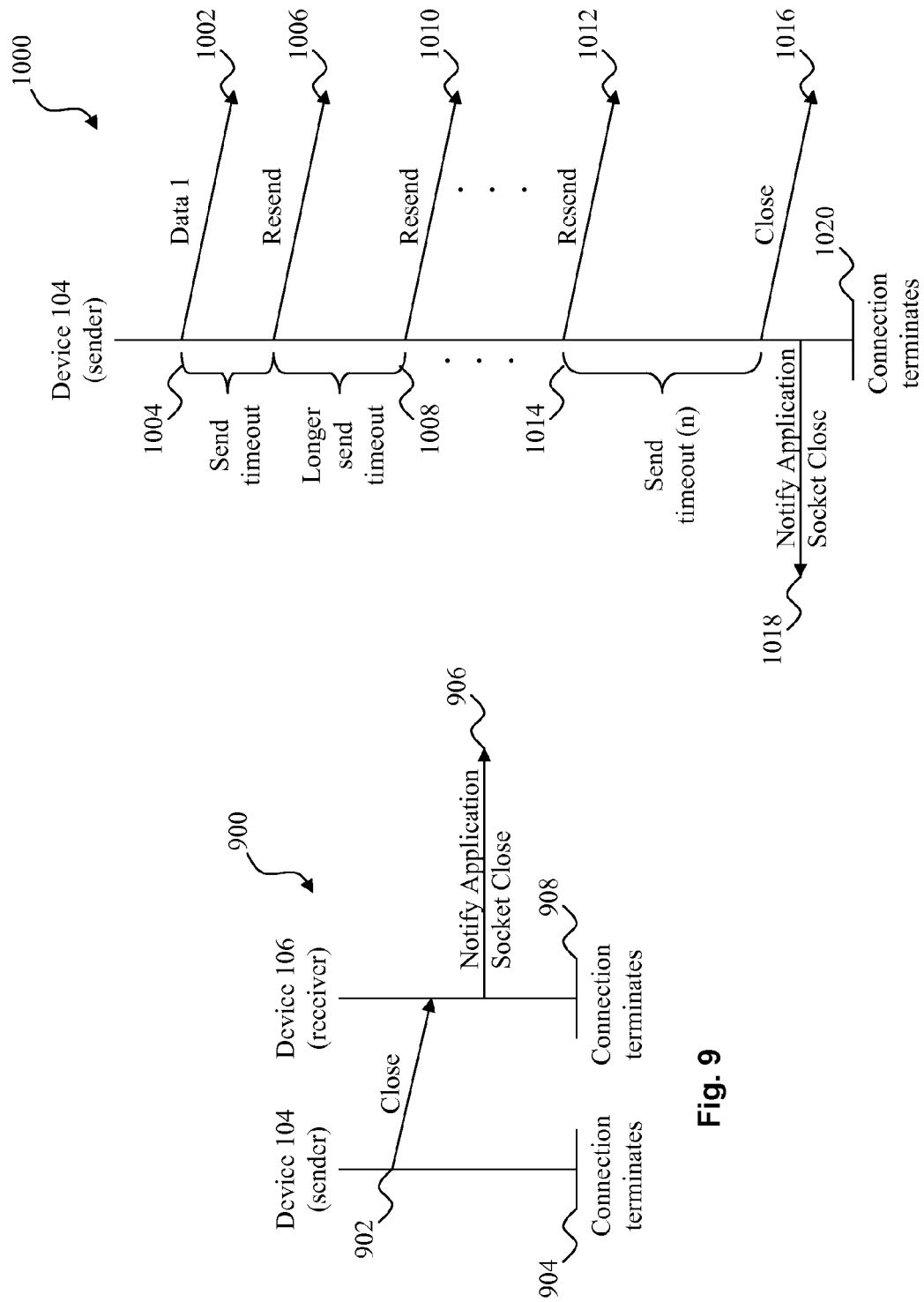

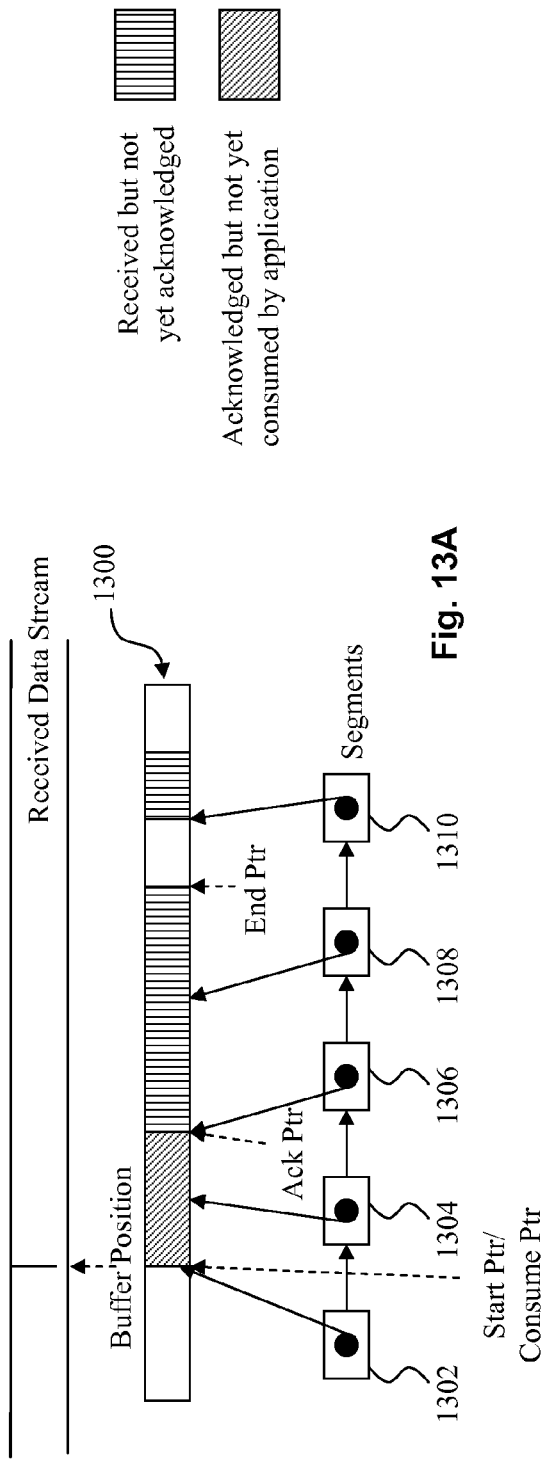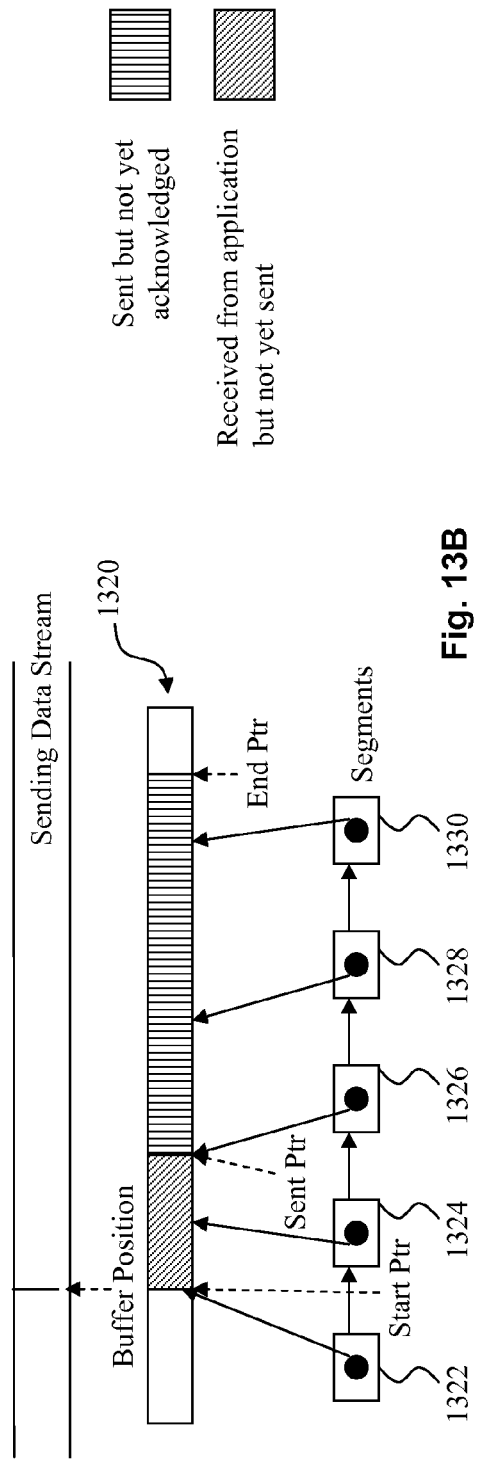

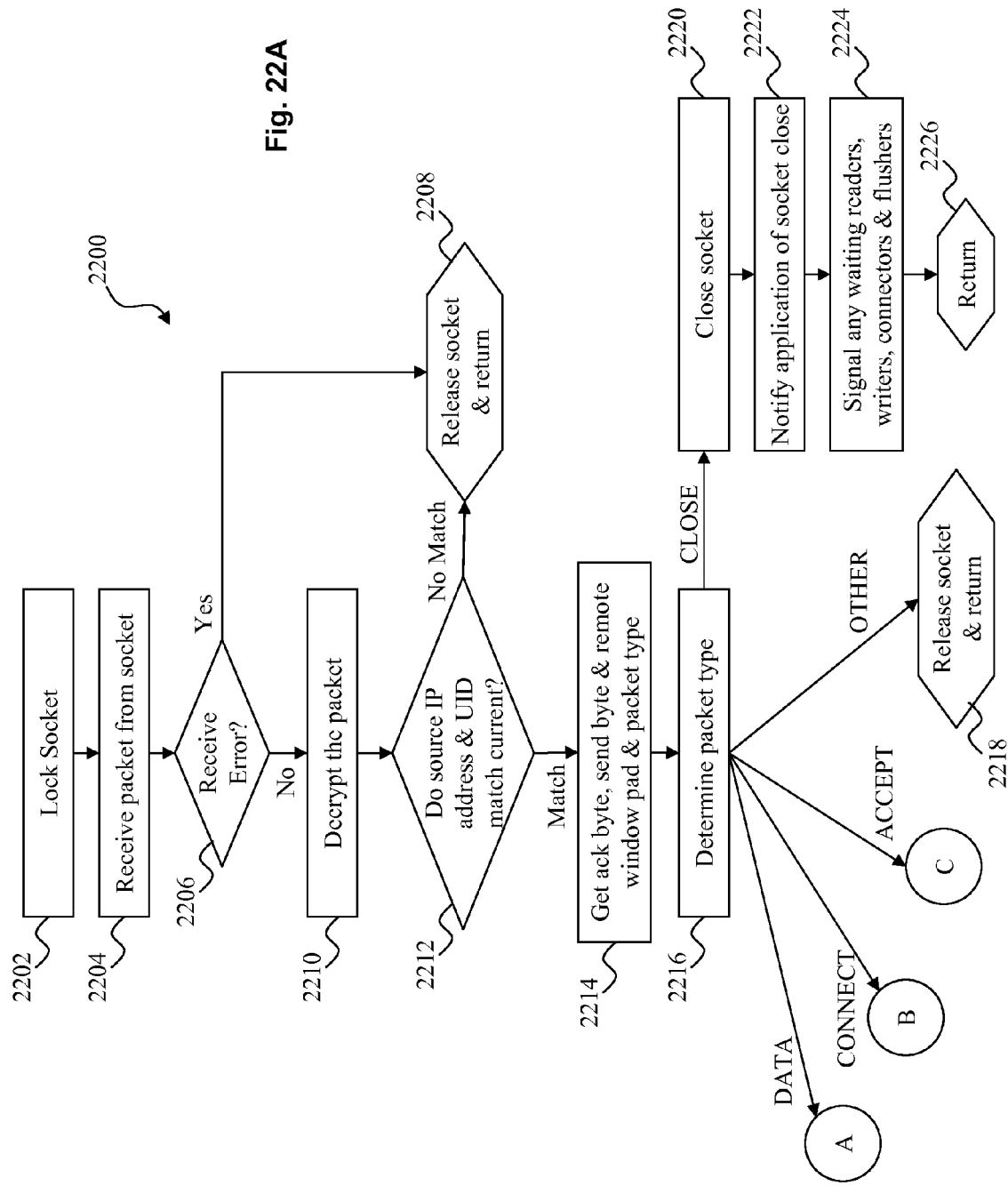

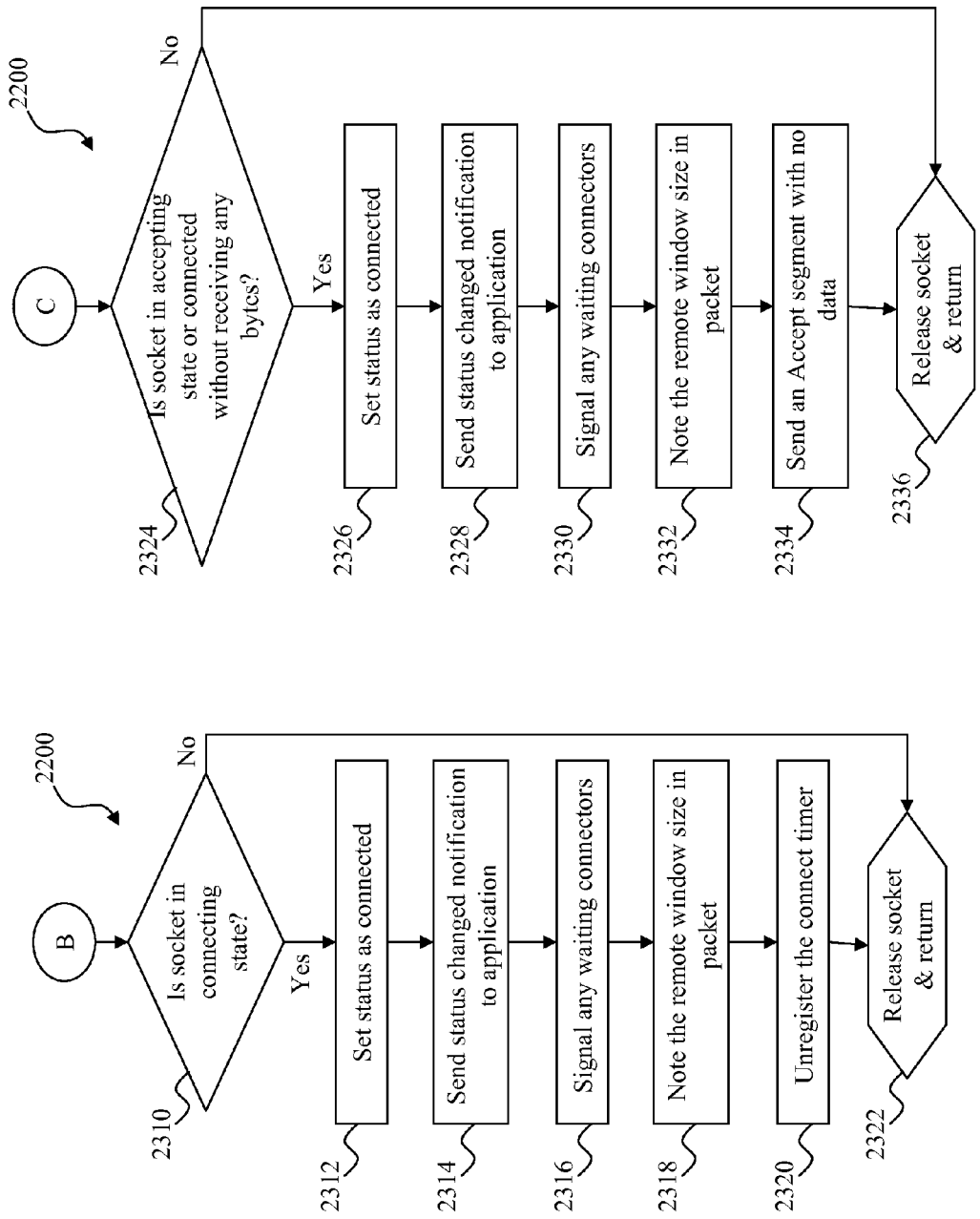

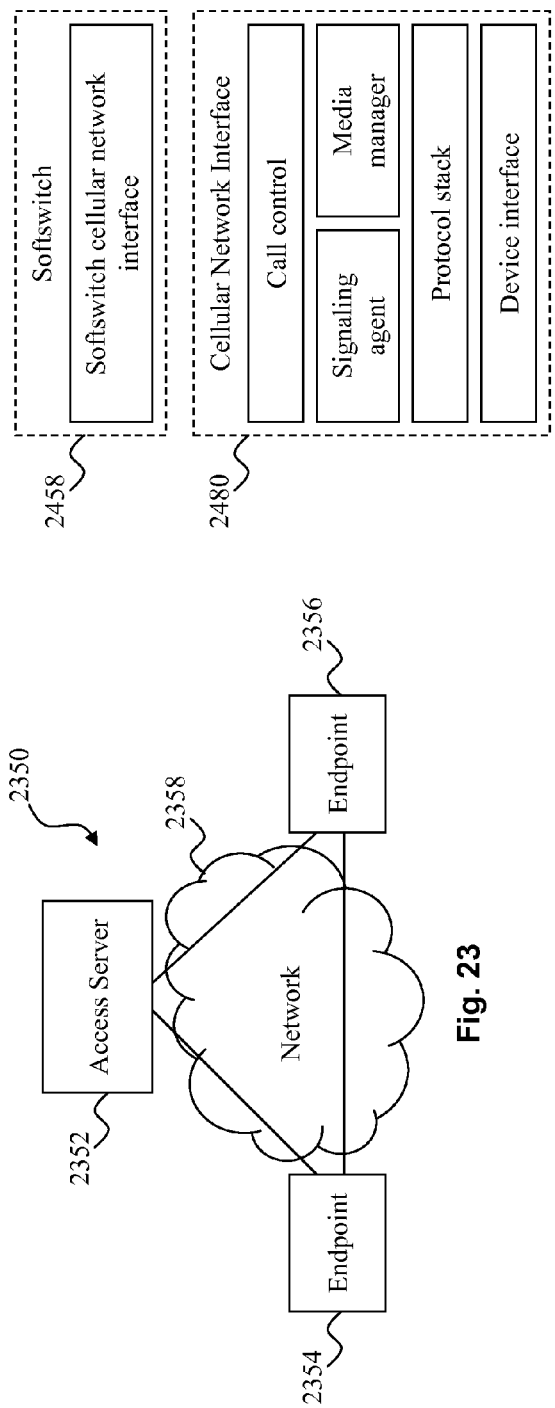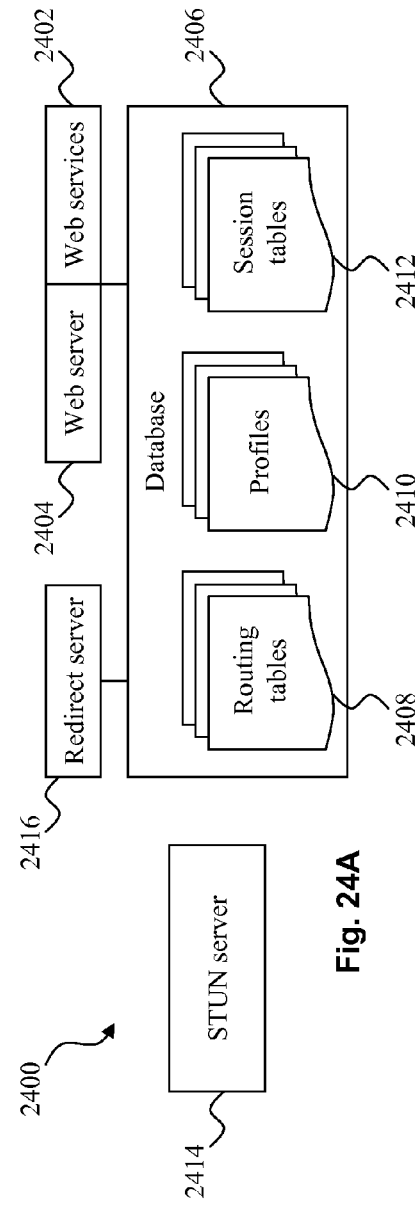

SYSTEM AND METHOD FOR RELIABLE VIRTUAL BI-DIRECTIONAL DATA STREAM COMMUNICATIONS WITH SINGLE SOCKET POINT-TO-MULTIPOINT CAPABILITY

INCORPORATION BY REFERENCE

The present application incorporates by reference in their entirety U.S. Pat. No. 7,656,870, filed on Mar. 15, 2005, and entitled SYSTEM AND METHOD FOR PEER-TO-PEER HYBRID COMMUNICATIONS; U.S. Pat. No. 7,570,636, filed on Aug. 30, 2005, and entitled SYSTEM AND METHOD FOR TRAVERSING A NAT DEVICE FOR PEER-TO-PEER HYBRID COMMUNICATIONS; U.S. patent application Ser. No. 12/705,925, filed on Feb. 15, 2010, and entitled SYSTEM AND METHOD FOR STRATEGIC ROUTING IN A PEER-TO-PEER ENVIRONMENT; and U.S. patent application Ser. No. 12/728,024, filed on Mar. 19, 2010, and entitled SYSTEM AND METHOD FOR PROVIDING A VIRTUAL PEER-TO-PEER ENVIRONMENT.

BACKGROUND

Current packet-based communication systems generally use particular protocols to communicate. However, such protocols may not be useful in addressing certain issues in systems such as hybrid peer-to-peer systems. Accordingly, an improved method and system are needed to address such issues.

BRIEF DESCRIPTION OF THE DRAWINGS

For a more complete understanding, reference is now made to the following description taken in conjunction with the accompanying Drawings in which:

FIG. 2B is a simplified diagram of one embodiment of a packet that may be used with an RVBDDS connection of FIG. 1.

FIG. 3 is a simplified diagram of one embodiment of a streaming data packet that may be encapsulated within the packet of FIG. 2B.

FIG. 7 is a timing diagram illustrating one embodiment of various sequences in which one device of FIG. 1 successfully sends data to another device using an RVBDDS connection.

FIG. 8 is a timing diagram illustrating one embodiment of various sequences in which one device of FIG. 1 unsuccessfully attempts to send data to another device using an RVBDDS connection.

FIG. 9 is a timing diagram illustrating one embodiment of a sequence in which one device of FIG. 1 terminates an RVBDDS connection.

FIG. 10 is a timing diagram illustrating one embodiment of a sequence in which one device of FIG. 1 terminates an RVBDDS connection due to network problems or other issues external to the device.

FIG. 13A is a simplified diagram of one embodiment of a receive buffer that may be used by a device of FIG. 1.

FIG. 13B is a simplified diagram of one embodiment of a send buffer that may be used by a device of FIG. 1.

FIGS. 22A-22G are flowcharts of one embodiment of a method that the method of FIG. 20 may use to handle messages.

FIG. 23 is a simplified network diagram of one embodiment of a hybrid peer-to-peer system within which the communication devices of FIG. 1 may operate.

FIG. 24A illustrates one embodiment of an access server architecture that may be used within the system of FIG. 23.

FIG. 24C illustrates one embodiment of components within the endpoint architecture of FIG. 24B that may be used for cellular network connectivity.

DETAILED DESCRIPTION

Figure 1:
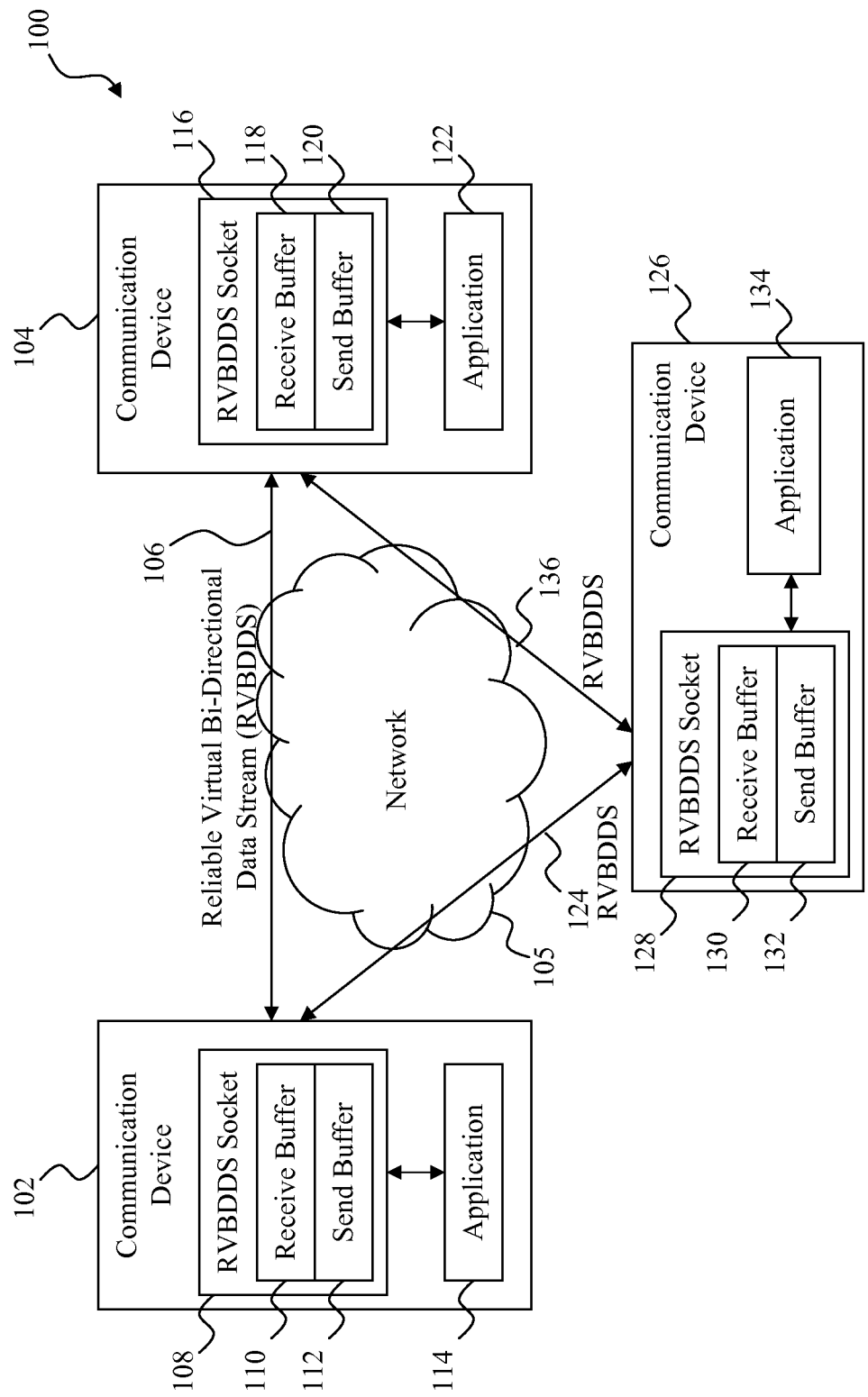
FIG. 1 is a simplified diagram of one embodiment of an environment that illustrates devices that are coupled via reliable virtual bi-directional data stream (RVBDDS) connections.

The present disclosure is directed to a system and method for reliable virtual bi-directional data stream communications. It is understood that the following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Referring to FIG. 1, in one embodiment, an environment 100 is illustrated with two communication devices 102 and 104 coupled by a reliable virtual bi-directional data stream (referred to herein as RVBDDS) connection 106 through a network 105. Examples of such communication devices include cellular telephones (including smart phones), personal digital assistants (PDAs), netbooks, tablets, laptops, desktops, workstations, and any other computing device that can communicate with another computing device using a wireless and/or wireline communication link. Such communications may be direct (e.g., via a peer-to-peer network, an ad hoc network, or using a direct connection), indirect, such as through a server or other proxy (e.g., in a client-server model), or may use a combination of direct and indirect communications.

The network 105 may be a single network or may represent multiple networks, including networks of different types. For example, the device 102 may be coupled to the device 104 via a network that includes a cellular link coupled to a data packet network, or via a data packet link such as a wide local area network (WLAN) coupled to a data packet network. Accordingly, many different network types and configurations may be used to couple the communication devices 102 and 104.

Exemplary network, system, and connection types include the internet, WiMax, local area networks (LANs) (e.g., IEEE 802.11a and 802.11g wi-fi networks), digital audio broadcasting systems (e.g., HD Radio, T-DMB and ISDB-TSB), terrestrial digital television systems (e.g., DVB-T, DVB-H, T-DMB and ISDB-T), WiMax wireless metropolitan area networks (MANs) (e.g., IEEE 802.16 networks), Mobile Broadband Wireless Access (MBWA) networks (e.g., IEEE 802.20 networks), Ultra Mobile Broadband (UMB) systems, Flash-OFDM cellular systems, and Ultra wideband (UWB) systems. Furthermore, the present disclosure may be used with communications systems such as Global System for Mobile communications (GSM) and/or code division multiple access (CDMA) communications systems. Connections to such networks may be wireless or may use a line (e.g., digital subscriber lines (DSL), cable lines, and fiber optic lines).

The present disclosure is directed to creating and maintaining RVBDDS communications with single socket point-to-multipoint capabilities. In the present embodiment, the devices 102 and 104 are peer-to-peer endpoints and the RVBDDS connection 106 may be used for communications between the peer-to-peer endpoints. Examples of such endpoints are described in U.S. Pat. No. 7,656,870, filed on Mar. 15, 2005, and entitled SYSTEM AND METHOD FOR PEER-TO-PEER HYBRID COMMUNICATIONS, which is incorporated by reference herein in its entirety. Such endpoints may use various NAT traversal and routing processes, such as are described in U.S. Pat. No. 7,570,636, filed on Aug. 30, 2005, and entitled SYSTEM AND METHOD FOR TRAVERSING A NAT DEVICE FOR PEER-TO-PEER HYBRID COMMUNICATIONS; and U.S. patent application Ser. No. 12/705,925, filed on Feb. 15, 2010, and entitled SYSTEM AND METHOD FOR STRATEGIC ROUTING IN A PEER-TO-PEER ENVIRONMENT, both of which are incorporated herein by reference in their entirety.

An RVBDDS connection may also be used for devices that do not operate in a peer-to-peer manner, such as those operating in traditional client-server architectures. For example, the devices 102 and 104 may be a client 102 and a server 104, and the RVBDDS connection may be established between the client and the server. Accordingly, while many of the following embodiments are described with respect to peer-to-peer endpoints and some embodiments include features directed to peer-to-peer environments, it is understood that they are not limited to a peer-to-peer environment and the functionality described herein may be readily adapted to client-server architectures and any other network architectures where communications may benefit from the RVBDDS functionality described herein.

The RVBDDS connection is a virtual connection because packets sent between the two devices 102 and 104 are not connection-based in the traditional sense. More specifically, communications between the devices 102 and 104 may be accomplished using predefined and publicly available (i.e., non-proprietary) communication standards or protocols (e.g., those defined by the Internet Engineering Task Force (IETF) or the International Telecommunications Union-Telecommunications Standard Sector (ITU-T)), and/or proprietary protocols. For example, signaling communications (e.g., session setup, management, and teardown) may use a protocol such as the Session Initiation Protocol (SIP), while data traffic may be communicated using a protocol such as the Real-time Transport Protocol (RTP). In the present example, a communication session between the devices 102 and 104 is connection-less (e.g., uses a connection-less transport protocol such as the user datagram protocol (UDP)). The RVBDDS connection is based on a communication protocol that uses information in a first packet to provide RVBDSS attributes and then encapsulates the first packet in a second packet to provide connection-less attributes for the actual transmission. This enables RVBDDS connections to accomplish tasks such as traversing a network address translation (NAT) device (not shown in FIG. 1) associated with one or more of the devices 102 and 104 because RVBDDS is based on a connection-less protocol (e.g., UDP) and both the devices 102 and 104 can initiate outbound messages as will be described below.

With continued reference to FIG. 1, the device 102 includes an RVBDDS socket 108 that, in the present example, maintains a receive buffer 110 (for inbound data) and a send buffer 112 (for outbound data). An application 114 on the device 102 sends data to and receives data from the socket 108. Similarly, the device 104 includes an RVBDDS socket 116 that, in the present example, maintains a receive buffer 118 and a send buffer 120. An application 122 on the device 104 sends data to and receives data from the socket 116.

It is understood that each RVBDDS socket 108 and 116 may be implemented in various ways. For example, the RVBDDS socket 108 may be a socket object that is instantiated by the device 102. The socket object may in turn control and/or communicate with one or more buffer objects (e.g., depending on whether a buffer object is a single buffer or includes both the receive buffer 110 and the send buffer 112, or whether more buffers are present). For example, although shown as part of the sockets 108 and 116, the buffers 110, 112, 118, and 120 may be separate from the sockets themselves. The socket object may also control and/or communicate with a timer object that manages various timers needed for the socket object to function. Accordingly, while details of particular implementations are discussed herein, it is understood that the RVBDDS socket 108 may be implemented in many different ways as long as the underlying functionality needed for the RVBDDS connection 106 is present.

Although the RVBDDS connection 106 is shown between the two devices 102 and 104, the RVBDDS socket 108 is capable of point-to-multipoint connections as illustrated by an RVBDDS connection 124 between the device 102 and a device 126. The device 126 includes an RVBDDS socket 128 that, in the present example, maintains a receive buffer 130 and a send buffer 132. An application 134 on the device 126 sends data to and receives data from the socket 128.

Although shown as separate connections for purposes of illustration, it is understood that the RVBDDS connections 106 and 124 are virtual connections and the point-to-multipoint capability may be provided by multicast or broadcast functionality via the RVBDDS socket 108. For example, the application 114 may be communicating with the applications 122 and 134. Using the RVBDDS socket 108, the application 114 may multicast or broadcast packets to both of the applications 122 and 134. As will be described below, each device 102, 104, and 126 is associated with a unique identifier that identifies that device as the source of packets sent to the other devices. For example, the device 102 is associated with a unique identifier that is inserted into each packet sent by the device 102 and used by the devices 104 and 126 to identify the device 102 as the source of any packets (including point-to-multipoint packets) sent from the device 102 to the devices 104 and 126. Although not described in detail herein, the RVBDDS sockets 116 and 128 are also point-to-multipoint sockets and other RVBDDS connections may exist (e.g., an RVBDDS connection 136 between the devices 104 and 126).

Figure 2A:
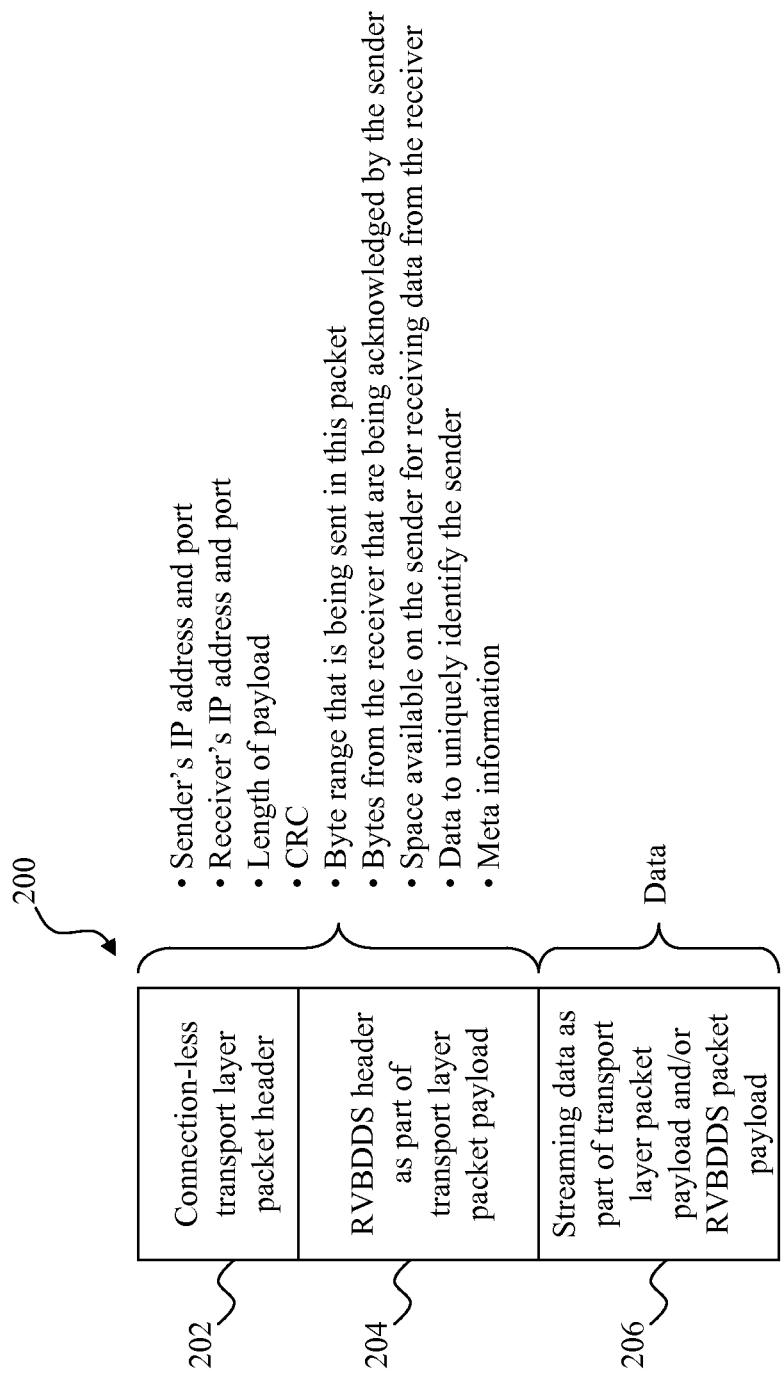
FIG. 2A is a simplified diagram of one embodiment of a packet that may be used with an RVBDDS connection of FIG. 1.

Referring to FIGS. 2A, 2B, and 3, embodiments of a packet 200 are provided that may be used for an RVBDDS connection such as the RVBDDS connection 106 of FIG. 1. For purposes of convenience, the terms "packet" and "segment" are generally used in the following embodiments with a packet representing header information and possibly data sent to or received from a device and a segment representing data sent to or received from an application. Therefore, some or all of a segment or multiple segments may be contained in a packet. However, it is understood that these terms are used for purposes of convenience and are not intended to be limiting. For example, a segment is sent between devices (after encapsulation) and some embodiments may refer to the sending of a segment without discussing the process of inserting the segment into a packet.

With specific reference to FIG. 2A, one embodiment of the packet 200 includes a header and payload data. In the present example, the packet 200 is a connection-less transport layer packet that contains a portion 202 that is the transport layer packet header, a portion 204 that is an RVBDDS packet header, and a portion 206 that contains data corresponding to the data stream of the RVBDDS connection 106 between the devices 102 and 104. The RVBDDS packet header 204 and data portion 206 are contained in the payload of the UDP packet 200. The data portion 206 may be separate from the RVBDDS packet header 204 or may be contained within a payload portion associated with the RVBDDS packet header 204 (e.g., the portions 204 and 206 may form a single RVBDDS packet).

The header information includes the sender's IP address and port (which may not help in identifying the sender but provides the address to reach the sender) and the receiver's IP address and port. The header information further includes a length of the payload, a cyclic redundancy check (CRC) to ensure packet correctness, and a range (e.g., a byte range) that is being sent in this packet (as the length of the data is known, a single number may be used to indicate the position in the stream of the starting byte in the payload). The header also includes data (e.g., in bytes) from the receiver that are being acknowledged by the sender and space available on the sender for receiving data from the receiver, which may be accomplished by sending the position in the stream of the last byte available in the sender's receive buffer. The header also contains data to uniquely identify the sender (multiple senders may have the same IP/port) and meta information about the type of control packet being sent and any padding information.

With specific reference to FIG. 2B, a more specific embodiment of the packet 200 is illustrated with RVBDDS implemented with UDP as the connection-less transport layer. Because some of the previously described header information is already available in the network packet header (in this case the UDP header), the following fields are not carried in the RVBDDS packet: sender's IP address and port, receiver's IP address and port, length of the packet, and CRC to ensure packet correctness.

Accordingly, in the present example, the packet 200 is a UDP packet (e.g., a datagram) that contains a portion 202 that is the UDP header, a portion 204 that is an RVBDDS packet header carrying RVBDDS information, and a portion 206 that contains data corresponding to the data stream of the RVBDDS connection 106 between the devices 102 and 104. The RVBDDS packet header 204 and data portion 206 are contained in the payload of the UDP packet 200. The data portion 206 may be separate from the RVBDDS packet header 204 or may be contained within a payload portion associated with the RVBDDS packet header 204 (e.g., the portions 204 and 206 may form a single RVBDDS packet).

It is understood that many different packet formats may be used, regardless of whether UDP or another transport protocol is used. For example, the RVBDDS packet header 204 may be rearranged, stored elsewhere in the UDP packet 200 (including within unused or empty UDP header fields), stored elsewhere relative to the data portion 206, etc. Accordingly, the UDP packet 200 is only one example of many possible ways of implementing an encapsulation of the RVBDDS packet header 204 and data portion 206.

Referring to FIG. 3, one embodiment of the RVBDDS packet header 204 is illustrated. The RVBDDS packet header 204 includes a send byte (SendByte) field 302, an acknowledgement (ACK) byte (ACKByte) field 304, a unique user identifier (UID) field 306, a window field 308, a packet type (PacketType) field 310, and a pad field 312. Although bytes (e.g., send byte) are used for purposes of example, it is understood that other embodiments may not use bytes.

The send byte field 302 contains a value SendByte representing a location (e.g., a starting byte number) in the send stream for the segment contained in the data portion 206. The ACK byte field 304 contains a value ACKByte representing a location (e.g., a byte) in the receive stream up to which all data has been received. It is noted that some segments may have been received beyond the ACKByte, but since bytes immediately following the ACKByte have not been received, the segments will not be acknowledged. The UID field 306 contains a value that uniquely identifies this RVBDDS connection between the first and second devices and is used, for example, for port mapping a connection in a peer-to-peer environment. The window field 308 contains a value representing an amount of space (e.g., an available number of bytes) left in the receiving device's buffer (e.g., the receive buffer 118 of the device 104 of FIG. 1) for more data (assuming the ACKByte is the last byte received by the receiving device).

The packet type field 310 may have the following values:

TABLE 1

| Value | Packet Type |
|-------|-------------|
| 0 | Data |
| 1 | Connect |
| 2 | Accept |
| 3 | Close |
| 4 | Punch |

The packet type Data indicates that the RVBDDS packet header 204 contains data for the stream. The packet type Connect indicates that the device 102 or 104 sending the packet requests a connection with the other device. The packet type Accept indicates that a connection request received from another device has been accepted. The packet type Close indicates that the device 102 or 104 sending the packet is closing the connection. The packet type Punch is used to indicate that the RVBDDS packet header 204 is being used as a keep alive message to maintain a pinhole through a device such as a NAT device.

As will be described later, ACKs may be sent with data and, in such cases, a pure ACK packet may use the packet type Data and the length of the UDP packet may be used to indicate whether the packet actually carries data or not (i.e., whether the packet only contains an ACK or contains both an ACK and data). If the packet does not carry data, then the send byte field may be ignored. Usage of each of the packet types will be described in following examples. It is understood that the packet types may have other values and that other packet types may be used.

The pad field 312 contains a value representing any needed padding. For example, if the number of bytes in the packet is a multiple of 4, the value in the pad field 312 would be set to pad the data to make it a multiple of 4. In the present example, the ACK byte field 304 and the window field 308 are populated for all packets, while some fields may not need to be populated (e.g., the send byte field 302 when the packet is a pure ACK packet).

It is understood that the RVBDDS header 204 is only one example of many possible ways of implementing a header having the information described with respect to FIG. 3. Accordingly, the length, organization, and other parameters may be varied while maintaining the information carried by the fields of the RVBDDS header 204.

It is understood that the diagrams (including flow charts) described herein illustrate various exemplary functions and operations that may occur within various communication environments. It is understood that these diagrams are not exhaustive and that various steps may be excluded from the diagrams to clarify the aspect being described. For example, it is understood that some actions, such as network authentication processes and notifications, may have been performed prior to the first step of a diagram by one or both of the devices 102 and 104. Such actions may depend on the particular type and configuration of each communication device 102 and 104, including how network access is obtained (e.g., cellular or WLAN access). Other actions may occur between illustrated steps or simultaneously with illustrated steps, including network messaging for call maintenance (including handoffs), communications with other devices (e.g., email, text messages, and/or voice calls (including conference calls)), and similar actions.

Figure 4:
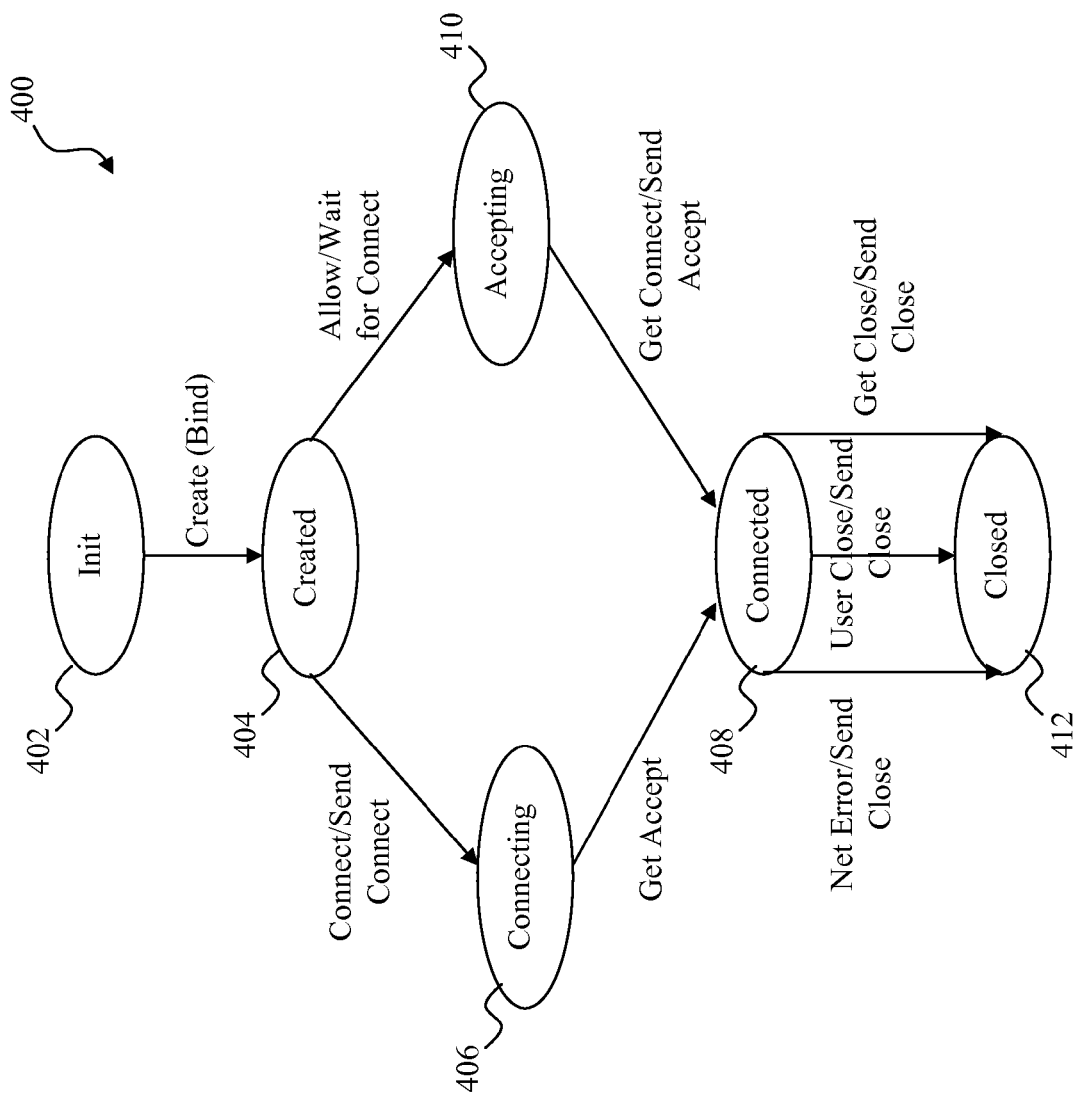
FIG. 4 is a protocol state diagram illustrating one embodiment of state transitions that may occur in a device of FIG. 1 for an RVBDDS connection.

Referring to FIG. 4, in one embodiment, a protocol state diagram 400 illustrates state transitions that may occur in a device that is establishing and/or terminating a peer-to-peer connection using a packet such as the packet 200 of FIG. 2A or FIG. 2B. The state diagram 400 illustrates both the device requesting the connection and the device receiving the connection request. For purposes of example, the device 102 is the requesting device and the device 104 is the device receiving the request.

From the perspective of the device 102, the device 102 enters an initialization (init) state 402 from which the device 102 creates and binds a socket prior to entering a created state 404. For example, the device 102 may create the RVBDDS socket 108 and allocate any needed resources for the socket. In the present embodiment, the device 102 creates the RVBDSS socket 108 as a UDP socket because the packets to be sent and received are encapsulated as all or part of the UDP payload. The device 102 may then bind the RVBDDS socket 108, which associates the socket with a local port number and IP address.

Once in the created state 404, the device 102 is ready for a connection with another device. The device 102 sends a connection request to the device 104 and enters a connecting state 406, in which the device 102 waits for a response from the device 104. In the present example, the device 102 receives an acceptance from the device 104 prior to timing out and enters a connected state 408.

From the perspective of the device 104, the device 104 enters the initialization (init) state from which the device 104 creates and binds a socket prior to entering the created state 404. For example, the device 104 may create the RVBDDS socket 116 and allocate any needed resources for the socket. In the present embodiment, the device 104 creates the RVBDSS socket 116 as a UDP socket. The device 104 may then bind the RVBDDS socket 116, which associates the socket with a local port number and IP address.

While in the created state, the device 104 waits for an incoming connection request. Once the request from the device 102 is received, the device 104 allows the request and moves to an accepting state 410. From the accepting state 410, the device 104 sends an acceptance to the device 102 and moves to the connected state 408.

Both devices 102 and 104 remain in the connected state 408 while using the RVBDDS connection 106. The connected state 408 may end upon the occurrence of one or more close events, such as a network error, a user of the device 102 or 104 signaling a close, or the receipt of a close message from the other device. In the present example, the device 102 transitions to a closed state 412 after sending a close message to the device 104 after the close event occurs. The device 104 also transitions to the closed state 412.

Figures 5, 6:
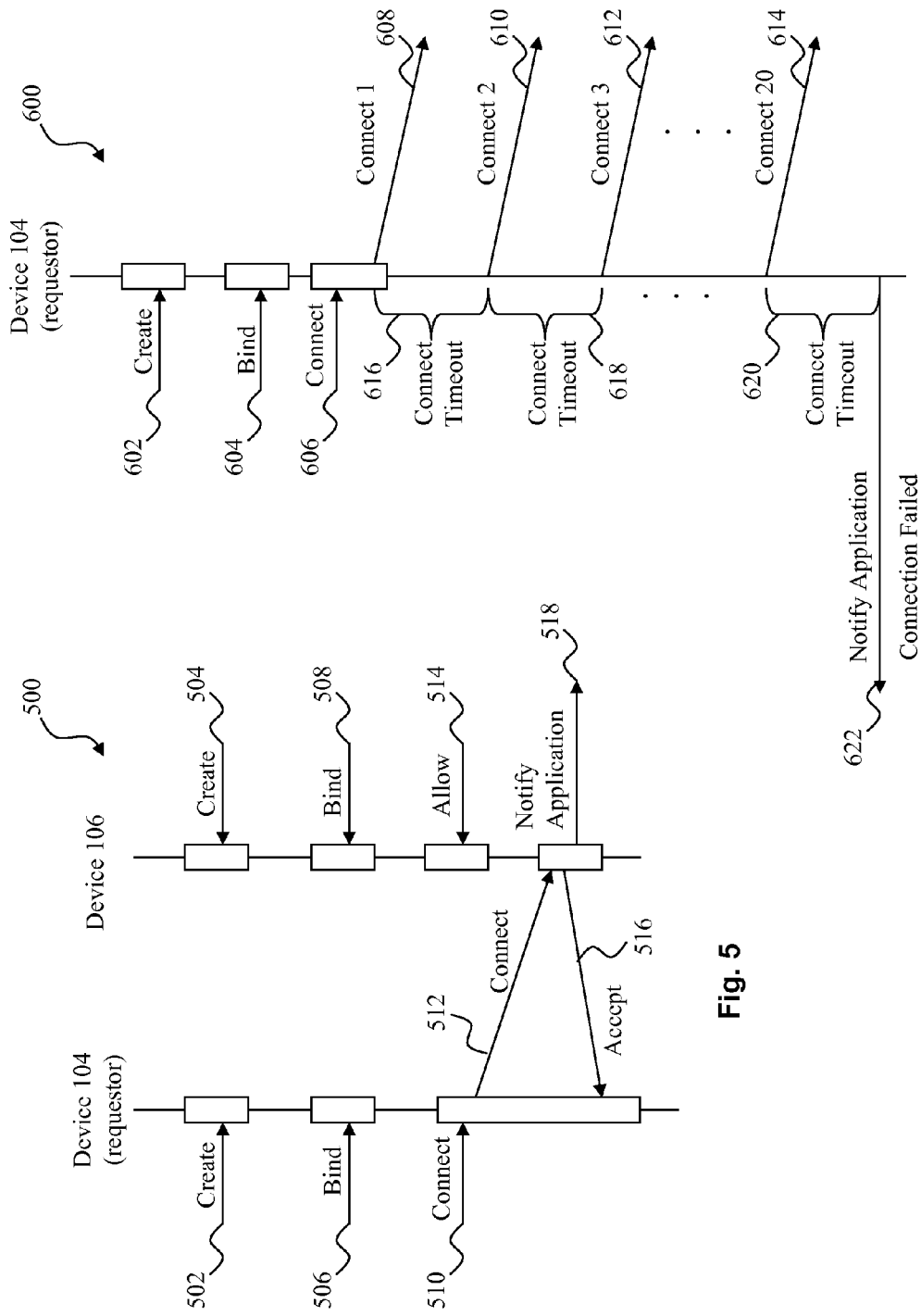
FIG. 5 is a timing diagram illustrating one embodiment of a sequence in which one device of FIG. 1 successfully connects to another device for an RVBDDS connection.
FIG. 6 is a timing diagram illustrating one embodiment of a sequence in which one device of FIG. 1 unsuccessfully attempts to connect to another device for an RVBDDS connection.

Referring to FIG. 5, a timing diagram 500 illustrates one embodiment of a sequence in which the device 102 (the requestor) successfully connects to the device 104. The device 102 creates a socket (e.g., the socket 108) and binds to that socket in steps 502 and 506, and the device 104 creates a socket (e.g., the socket 116) and binds to that socket in steps 504 and 508. In step 510, the device 102 initiates a connection and sends a connection request to the device 104 in step 512. The device 104 allows the connection in step 514 and sends an acceptance to the device 102 in step 516.

In the present example, the device 102 illustrates a blocking connect call from the application 114. The device 104 illustrates a non-blocking allow, where the application 122 is informed that the connection has been made through a notification. Accordingly, the device 104 notifies the application 122 that the connection has been made in step 518, while no such notification occurs on the device 102.

Referring to FIG. 6, a timing diagram 600 illustrates one embodiment of a sequence in which the device 102 is unsuccessful in connecting to the device 104 (not shown). The device 102 creates the socket 108 and binds to that socket in steps 602 and 604. In step 606, the device 102 initiates a connection and sends a connection request to the device 104 in step 608. As shown in FIG. 6, the device 102 does not receive a response to the connection request of step 608 and the connection request times out after the expiration of a timeout period 616. In the present example, the device 102 sends a total of twenty connection requests with the first connection request 608, a second connection request 610 that times out after the expiration of a timeout period 618, a third connection request 612, and a twentieth connection request 614 that times out after the expiration of a timeout period 620. Each connection request times out before a response to that particular request is received from the device 104. Accordingly, after the last connection request 614 times out, the application 114 is notified of the failure to connect in step 622.

It is understood that the number of connection requests may be changed, with less than or more than twenty connection requests being used. Furthermore, although the timeout periods are indicated as equal in the present example, they may be varied. For example, the timeout periods may lengthen as the connection requests are sent, with later timeout periods being longer than earlier timeout periods.

Referring to FIG. 7, a timing diagram 700 illustrates one embodiment of a sequence in which the device 102 successfully sends data to the device 104. In FIG. 7, three different data transfer situations occur, each resulting in an ACK.

In the first data transfer scenario of FIG. 7, the device 102 sends data (e.g., a single packet 200) to the device 104 in step 702. Receipt of the data by the device 104 starts an ACK delay period 704. In the present example, the ACK delay period 704 is twenty-five milliseconds, but it is understood that other periods of time may be used. After the expiration of the ACK delay period 704, the device 104 sends an ACK to the device 102 in step 706.

In the second data transfer scenario of FIG. 7, the device 102 sends data (e.g., a single packet 200) to the device 104 in step 708. Receipt of the data by the device 104 starts an ACK delay period 714. In the present example, the ACK delay period 714 is twenty-five milliseconds, but it is understood that other periods of time may be used. The device 102 sends additional data to the device 104 in steps 710 and 712 that is received by the device 104 during the ACK delay period 714. It is understood the data of steps 710 and 712 may be sent by the device 102 prior to the beginning of or during the ACK delay period 714. After the expiration of the ACK delay period 714, the device 104 sends a single ACK to the device 102 in step 716 acknowledging receipt of the data received in steps 708, 710, and 712.

In the third data transfer scenario of FIG. 7, the device 102 sends data (e.g., a single packet 200) to the device 104 in step 718. The data may be sent before or during an existing ACK delay period (e.g., the ACK delay period 714) and not received until after the ACK delay period has expired. Receipt of the data by the device 104 starts an ACK delay period 720. In the present example, the ACK delay period 720 is twenty-five milliseconds, but it is understood that other periods of time may be used. Prior to the expiration of the ACK delay period 720, the device 104 receives application data from the application 122 in step 722. The device 104 may then send both the application data and the ACK to the device 102 in step 724 when the ACK delay period 720 expires, which means that a separate ACK need not be sent. Although step 724 is shown as occurring after the expiration of the ACK delay period 720, it is understood that step 724 may occur upon receipt of the application data in step 722 (i.e., without waiting for the expiration of the ACK delay period 720).

Referring to FIG. 8, a timing diagram 800 illustrates one embodiment of a sequence in which errors occur when the device 102 is attempting to send data to the device 104. In FIG. 8, three different data transfer situations with errors occur.

In the first data transfer scenario of FIG. 8, the device 102 sends data (e.g., a single packet 200) to the device 104 in step 802. Sending the data by the device 102 starts a send timeout period 804 and receipt of the data by the device 104 starts an ACK delay period 806. Once the ACK delay period 806 ends, an ACK is sent in step 808. Because the ACK is not received before the end of the send timeout period 804, the data sent in step 802 is resent in step 810. Receipt of the resent data by the device 104 starts another ACK delay period 812 and, at the expiration of the ACK delay period, another ACK is sent from the device 104 to the device 102 in step 814. However, as the previous ACK of step 808 has now been received by the device 102, the ACK of step 814 is ignored. Although not shown, it is understood that the resending of the data in step 810 may start another send timeout period, but the ACK of step 808 is received prior to the expiration of such a send timeout period and so the data is not resent again. In some embodiments, a second send timeout period may not occur if, for example, the device 102 is configured to resend only once.

In the second data transfer scenario of FIG. 8, the device 102 sends data (e.g., a single packet 200) to the device 104 in step 816. Sending the data by the device 102 starts a send timeout period 818 and receipt of the data by the device 104 starts an ACK delay period 820. Once the ACK delay period 820 ends, an ACK is sent in step 822, but is lost (i.e., does not reach the device 102). Because the ACK is not received before the end of the send timeout period 818, the data sent in step 816 is resent in step 824. Receipt of the resent data by the device 104 starts another ACK delay period 826 and, at the expiration of the ACK delay period, another ACK is sent from the device 104 to the device 102 in step 828. The ACK of step 828 is received by the device 102. Although not shown, it is understood that the resending of the data in step 824 may start another send timeout period, but the ACK of step 828 is received prior to the expiration of such a send timeout period and so the data is not resent again. In some embodiments, a second send timeout period may not occur if, for example, the device 102 is configured to resend only once.

In the third data transfer scenario of FIG. 8, the device 102 sends data (e.g., a single packet 200) to the device 104 in step 830. Sending the data by the device 102 starts a send timeout period 832. In the present example, the data sent in step 830 is lost (i.e., does not reach the device 104) and the send timeout period 832 ends without receiving an ACK from the device 104, which never received the data. Accordingly, in step 834, the device 102 resends the data. Receipt of the data by the device 104 starts an ACK delay period 836. Once the ACK delay period 836 ends, an ACK is sent in step 838.

Referring to FIG. 9, a timing diagram 900 illustrates one embodiment of a connection termination. In the present example, the device 102 initiates the termination, but it is understood that either side (e.g., either of the devices 102 and 104) may initiate the termination.

In step 902, the device 102 sends a close packet to the device 104 to notify the device 104 that the connection is being terminated. The close packet is not acknowledged by the device 104. Although shown as occurring after other events, the device 102 terminates the connection in step 904 once it sends the close packet as it does not wait for an acknowledgement. In step 906, the device 104 notifies the application 122 using the connection that the connection is being terminated. In step 908, the device 104 terminates the connection.

In FIG. 10, a timing diagram 1000 illustrates one embodiment of a sequence in which a device (e.g., the device 102) terminates a connection because of network problems or other issues external to the device. The device 102 attempts to resend data multiple times until a send timeout exceeds a maximum value. The device 102 then stops resending, sends a close to the other device, notifies the application 114 that the connection has closed, and terminates the connection.

Accordingly, the device 102 sends data (e.g., a single packet 200) to the device 104 in step 1002. Sending the data by the device 102 starts a send timeout period 1004. The device 102 does not receive an acknowledgement for the data of step 1002 and the send data timeout 1004 expires. The device 102 resends the data in step 1006. Resending the data by the device 102 in step 1006 starts a send timeout period 1008, which is longer than the previous send timeout period 1004. The device 102 does not receive an acknowledgement for the resent data of step 1006 and the send data timeout 1008 expires.

In the present example, the device 102 resends the data until it receives an ACK (which does not occur in this example) or the send timeout period exceeds a maximum value "n." The send timeout period is increased each time the data is resent until the send timeout(n) occurs. Accordingly, a final resend is illustrated as occurring in step 1012, which starts the final resend timeout period 1014. Upon expiration of the send timeout period 1014, the device 102 sends a close packet to the device 104 in step 1016. In step 1018, the device 102 notifies the application 114 using the connection that the connection is being terminated and closes the socket. In step 1020, the connection is terminated. It is understood that the send timeout period may be increased, decreased, or held at a single time interval. For example, a maximum number of timeouts may be tracked, rather than a maximum time interval.

In the timing diagrams, it is understood that one or both devices 102 and 104 may be blocking or non-blocking. Accordingly, while some embodiments describe notifying the corresponding application 114 or 122, it is understood that such notifications depend on whether the sockets 108 and 116 are blocking or non-blocking and may not always occur.

Figure 11:
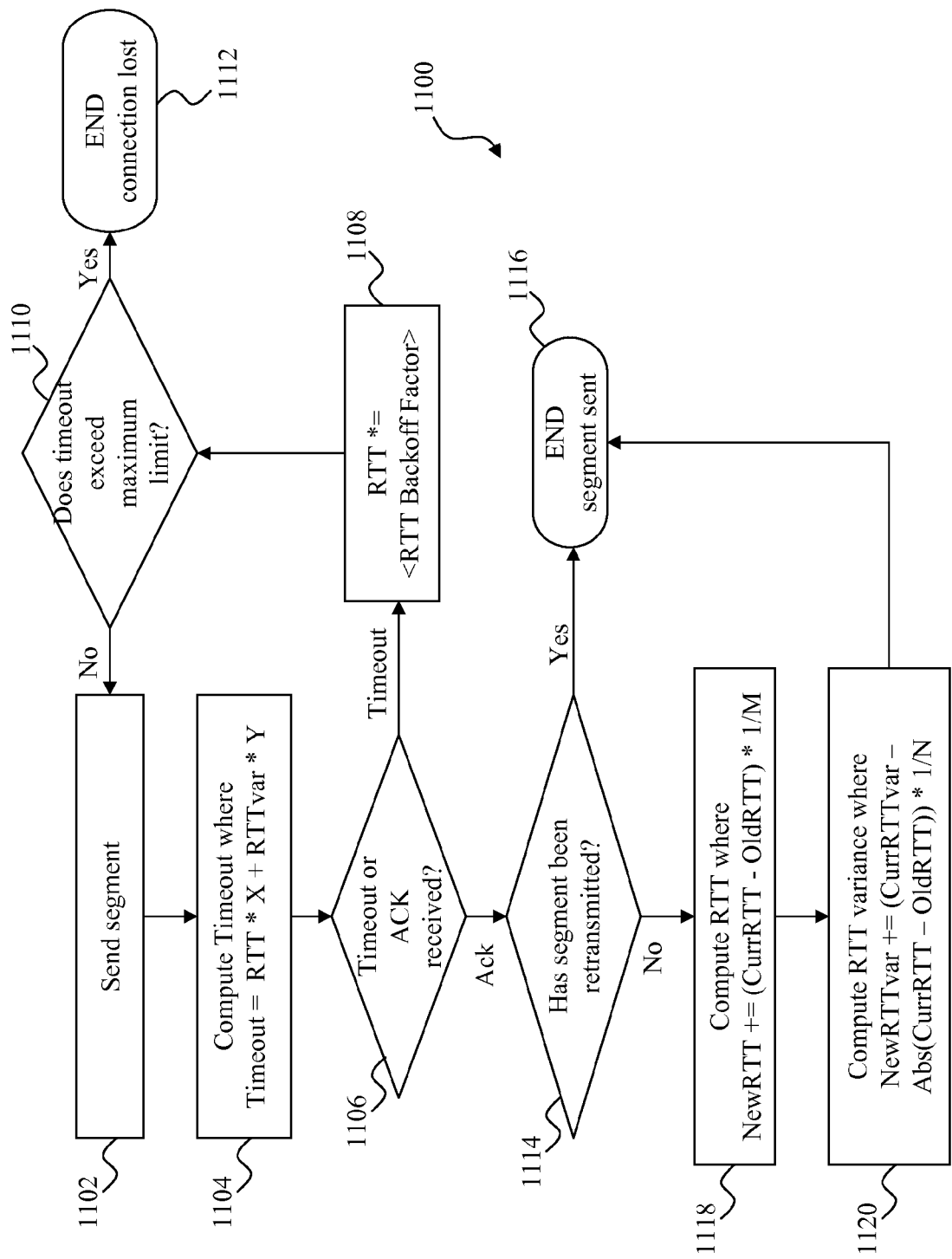
FIG. 11 is a flowchart of one embodiment of a method by which a device of FIG. 1 can send a single packet, including how a Round Trip Time (RTT) may be computed and used to control resending the packet.
Figure 14:
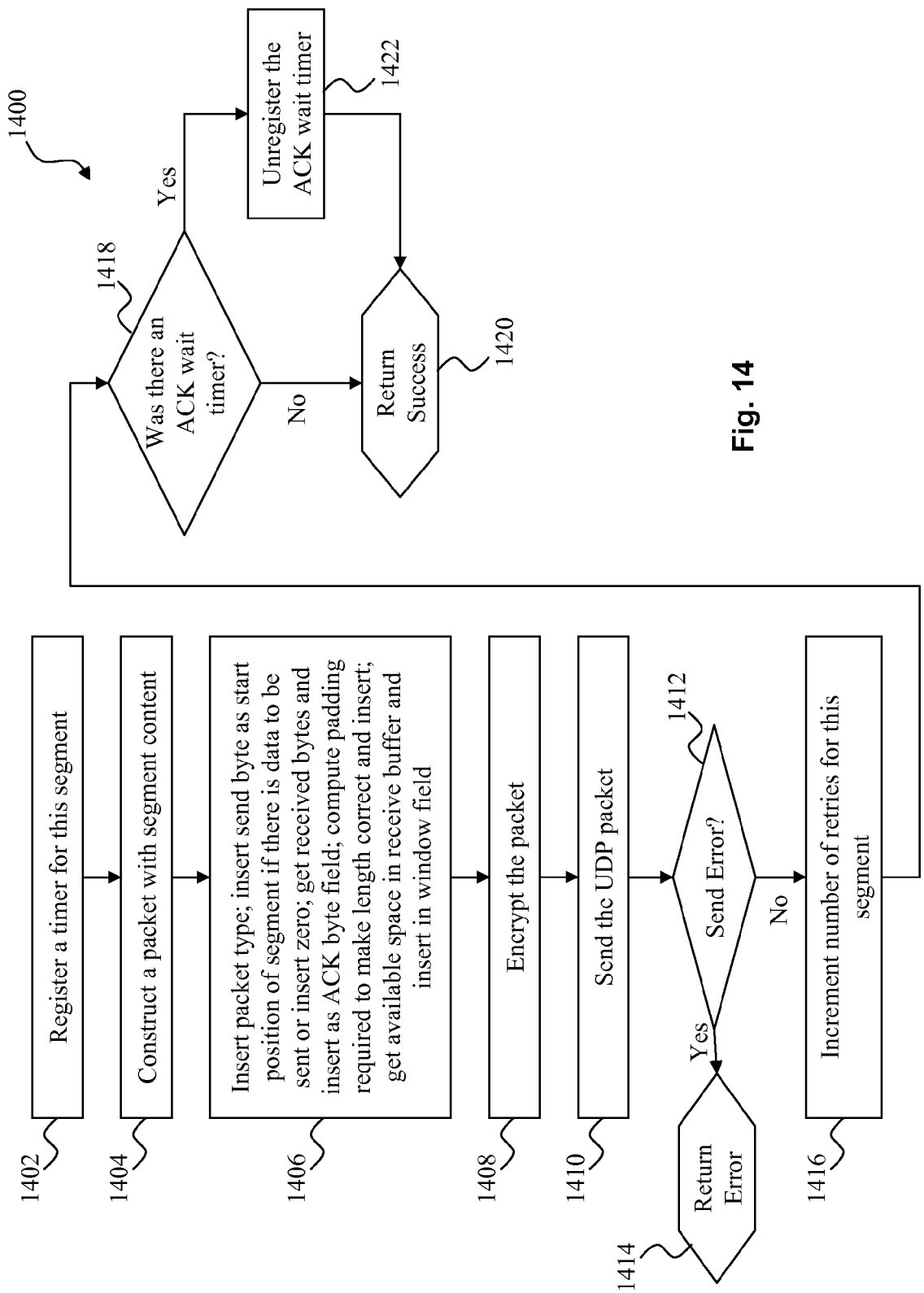
FIG. 14 is a flowchart of one embodiment of a method by which a device of FIG. 1 can send a single segment of data.

The embodiments from FIG. 11 until FIG. 14 describe examples of various implementation details. These embodiments may be described using abstract asynchronous examples for purposes of simplicity, although it is understood that an actual implementation may have application threads reading and writing from the socket and a separate socket thread which handles timing. These embodiments describe Round Trip Time (RTT)/timeout computation and retries, congestion window calculation, silly window syndrome avoidance and delayed ACKs, a circular buffer implementation, timer management, encryption/punching/NAT issues, blocking/non-blocking actions and notification, and system configuration variables that may be used to modify the performance of the RVBDDS connection.

Referring to FIG. 11, a flow chart illustrates one embodiment of a method 1100 showing the sending of a single packet (e.g., a single packet 200), including how a RTT may be computed and used to control resending the packet. The transmission of a single packet is a basic operation in implementing the RVBDDS packet header 204. The transmission of multiple packets, which is discussed later in greater detail, is based on the size of a remote window and a congestion window. In the transmission of a single packet, the packet is sent and the sender (e.g., the device 102) waits for an acknowledgement. If the acknowledgement is not received within a timeout period, the packet is retransmitted. After a certain number of retries without receiving an acknowledgement, the connection is terminated.

The computation of the RTT plays an important role in the method 1100. The RTT is first computed on a per packet basis and is computed only if retransmission has not occurred for a packet. If retransmission has occurred, the method 1100 is unable to determine which of the sent packets (e.g., the original packet or a retransmission of that packet) corresponds to the acknowledgement. The computation of RTT is designed to respond to longer term changes happening due to network conditions. However, to prevent RTT from changing rapidly with every transient delay that occurs to sent packet, the RTT is modified gradually.

Accordingly, in step 1102, the device 102 sends a single packet 200. In step 1104, a timeout (e.g., a send timeout as described earlier) is computed as:

$$\text{Timeout} = RTT*X + RTT\text{var}*Y$$

where RTT is a previously computed RTT value (see step 1118), RTTvar is a previously computed RTT variance value (see step 1120), X is a multiple of the RTT, and Y is a percentage. More specifically, even if the RTT variance is close to zero, it may be desirable to have the timeout as some multiple of RTT. This multiple is provided by X, which is 1.5 in the present example. When there is significant RTT variance, it may be desirable to have the timeout cover a large percentage of the statistical bell curve where the packets may fall. This percentage is provided by Y, which is three (3) in the present example. It is understood that the value of one or both of X and Y may be higher or lower and are not limited to the values provided in this example. By varying the timeout in this manner, the method 1100 attempts to adjust to changing conditions. A timeout that is longer than needed may result in not detecting packet loss quickly enough to respond in an efficient manner. A timeout that is not long enough may result in retransmitting packets unnecessarily.

After computation of the timeout in step 1104, the method 1100 continues to step 1106, where a determination is made as to whether a timeout has occurred or an ACK has been received for the packet sent in step 1102. If a timeout has occurred, the method 1100 moves to step 1108, where the current RTT is calculated as $$RTT* = <RTT \text{ Backoff Factor}>$$

where the RTT Backoff Factor is used to lengthen the timeout. More specifically, retransmissions occur when the timeout is exceeded. An algorithm (e.g., the Karn algorithm) may be used to back off the RTT value exponentially and allow the RTT value to gradually fall back to a network normal value. When packets are being dropped because of network problems, the retranmissions can contribute to further acerbate the problem. To avoid this, it may be desirable to quickly back off the timer. Accordingly, every time there is a timeout, the method backs off the RTT by the RTT Backoff Factor, which is two (2) in the present example. It is understood that this value may be higher or lower and is not limited to the value provided in this example.

After applying the RTT Backoff Factor, the method 1100 continues to step 1110, where a determination is made as to whether the timeout exceeds a maximum interval of time (i.e., a maximum timeout factor). For example, the maximum allowed timeout may be set to sixteen seconds. If the timeout exceeds sixteen seconds, the method 1100 moves to step 1112 and ends without retransmitting the packet. The device 102 may consider the connection closed when this occurs. If the timeout does not exceed sixteen seconds, the method 1100 returns to step 1102 and resends the packet. Accordingly, the number of retransmissions is controlled by the maximum timeout factor.

Referring again to step 1106, if an ACK has been received, the method 1100 continues to step 1114. In step 1114, a determination is made as whether the packet has been retransmitted. If the packet has been retransmitted, the method 1100 moves to step 1116, where the method ends. If the packet has not been retransmitted, the method 1100 continues to step 1118, where a new RTT value is computed as $$NewRTT+=(CurrRTT-OldRTT)*1/M$$

where NewRTT is the new value of RTT, CurrRTT is the current value of RTT, OldRTT is the previous value of RTT, and M is the RTT variation factor. Higher values of M will cause the RTT value to change more slowly and lower values will cause the RTT value to change more quickly. In the present example, M is eight (8), but it is understood that this value may be higher or lower and is not limited to the value provided in this example. It is noted that a predefined value of RTT, such as 100 ms, may be used initially and the RTT values may then evolve from there.

Once the new value of RTT has been computed, the method 1100 moves to step 1120, where a new RTT variance value is computed as $$NewRTTvar+=(CurrRTTvar-(Abs(CurrRTT-OldRTT)*1/N$$

where NewRTTvar is the new variance value of RTT, CurrRTTvar is the current variance value of RTT, CurrRtt is the RTT computed for this segment, OldRTT is the previous value of RTT, and N is the RTT variance variation factor. Higher values of N will cause the RTT variance value to change more slowly and lower values will cause the RTT variance value to change more quickly. In the present example, N is four (4), but it is understood that this value may be higher or lower and is not limited to the value provided in this example. After computing the RTT variance value, the method 1100 continues to step 1116.

Although the method 1100 is described with respect to a single packet, it is noted that the device 102 may be configured to handle multiple packets in a simultaneous and asynchronous manner. Furthermore, it is noted that timeouts associated with the establishment of a connection may be handled by the device 102 differently from timeout associated with sent data. For example, as opposed to the varying interval of the timeout described with respect to the data packet of the method 1100, a connect packet may have a fixed timeout (e.g., five seconds (by default)) and may be consistently resent (e.g., once every 5 seconds up to a maximum of twenty times (by default)). This difference in handling may be because, when attempting to establish a connection, the RTT is unknown.

Figure 12:
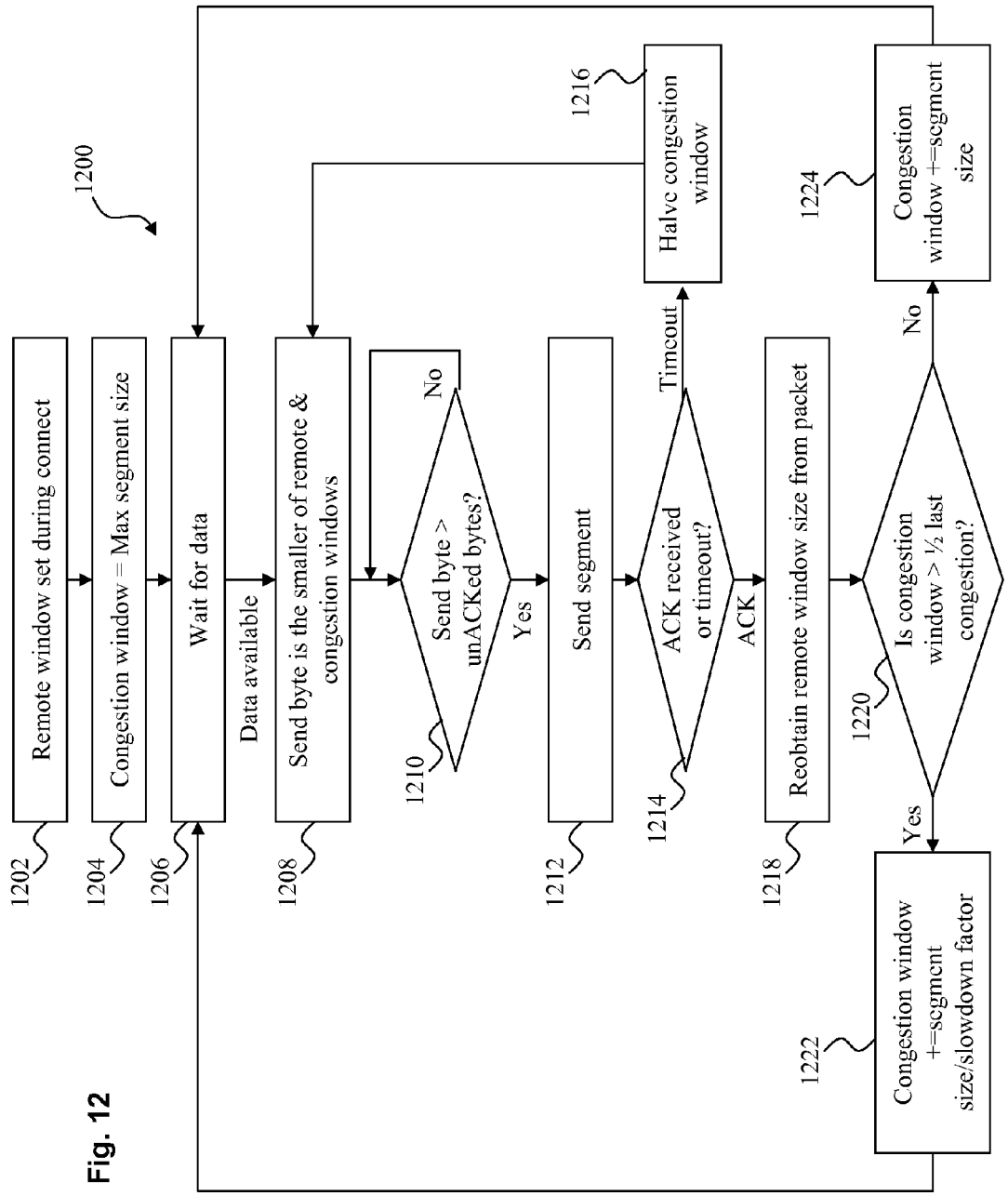
FIG. 12 is a flowchart of one embodiment of a method by which a device of FIG. 1 can calculate a congestion window and determine how many bytes may be sent.

Referring to FIG. 12, a flow chart illustrates one embodiment of a method 1200 showing how a congestion window may be calculated and determining how many bytes may be sent by a device (e.g., the device 102). Generally, the buffer available in the network is different for each connection between two devices (e.g., between the devices 102 and 104) and also varies with time as router utilizations vary across the route taken by a connection. Accordingly, the number of bytes sent by the device 102 may be adjusted based on changing conditions.

Generally, the method 1200 limits the number of bytes that the device 102 (as sender) may transmit at any time to the minimum of the congestion window as computed by the device 102 and the window size available at the device 104 (as receiver). The window size available at the device 104 is updated on the device 102 every time the device 102 receives a window size advertisement from the device 104. Bytes that have been sent by the device 102 but for which the device 102 has not received an acknowledgement are subtracted from this window size. Every time the device 102 sends data, this value is reduced until another window advertisement is received from the device 104.

In step 1202, the remote window size is obtained by the device 102 from the device 104 during the establishment of the connection between the device 102 and the device 104 and noted by the device 102. In step 1204, the congestion window is set as the maximum segment size (e.g., one segment). In step 1206, the device 102 waits for data to send (e.g., from the application 114 of FIG. 1).

In step 1208, the send byte size (e.g., the number of bytes that may be sent at any one time by the device 102) is set as the smaller of the congestion window as computed by the device 102 (the sender) and the remote window size available at the device 104 (the receiver). In step 1210, a determination is made as to whether the send byte size is greater than the number of unacknowledged bytes. If not, the method 1200 returns to step 1210 until the send byte size is greater than the number of acknowledged bytes. If the send byte size is greater than the number of acknowledged bytes, the method 1200 continues to step 1212, where the segment is sent.

In step 1214, a determination is made as to whether an ACK has been received from the device 104. If a timeout occurs prior to the receipt of an ACK, the method 1200 moves to step 1216, where the congestion window is reduced prior to returning to step 1208. This reduction may be exponential (e.g., by a factor of two as illustrated) or may be accomplished using other non-exponential values. If an ACK is received, the method 1200 obtains the current remote window size from the packet containing the ACK.

In step 1220, a determination is made as to whether the congestion window is greater than fifty percent of the size of the congestion window the last time congestion occurred. If not, the method 1200 moves to step 1224 and increases the congestion window by this segment's size. Accordingly, each time the device 102 receives ACKs for a set of segments, it increases the congestion window by one more segment. In other words, the device 102 increases the congestion window by the number of bytes for which ACKs have been received. If the congestion window is greater than fifty percent of the size of the congestion window the last time congestion occurred, the method 1200 moves to step 1222 and increases the congestion window by one segment size as divided by a slowdown factor. The slowdown factor is a number that will be higher when the congestion window is farther away from the previous high value (e.g., its value when it was last halved). The slowdown factor may tend to be one or less than one when it is farther away from the previous high value and may be a higher value (e.g., eight) when it is relatively close. It is noted that this prevents an oscillating situation that may otherwise occur when the maximum size possible for the congestion window is reached, halved a few times, and then increased to the same size repeatedly. After either of steps 1222 or 1224, the method 1200 returns to step 1206 and waits for more data to send.

In another embodiment, issues such as silly window syndrome may be handled as follows. If the device 102 (sender) transmits the data faster than the device 104 (receiver) consumes it, the buffer at the device 104 will get filled. Then, if the application at the device 104 reads one byte at a time, each of those reads will result in a window advertisement. This results in the device 102 sending just one byte to the device 104. This one byte at a time transmission can reach a steady state that is extremely inefficient in the use of the network bandwidth and is called the silly window syndrome.

The device 102 can run into a similar problem as the sender. If the application on the device 102 writes data one byte at a time and if the device 102 has already sent all the data, the device 102 may send one packet for every byte that it receives from the application. This will result in the same problem.

Another inefficient use of the network comes in the acknowledgements sent by the device 104 as the receiver. Often applications that receive some data will send back some data immediately. In such a case, a separate acknowledgement is not necessary. Also, when the device 102 as sender is sending a bunch of packets, there is no need to acknowledge each packet separately. Instead, multiple packets can be acknowledged by a single acknowledgement.

These and other problems that result in the inefficient use of the network may be addressed through one or more of the following three mechanisms. First, the device 102 as sender may be configured to determine when the data to be sent is smaller than a certain size, such as half a segment. When this occurs, the device 102 does not immediately send the data even if there is window size available. Instead, the device 102 starts a timer that allows the device to gather more data (if received) and send the data only when the timer expires or adequate data is gathered. It is understood that the data sent when the timer expires may be the same data that was initially too small to send, but the timer provides additional time prior to sending the data.

Second, the device 104 as the receiving side may be configured to not send small window advertisements. Instead, the device 104 only sends window advertisements that are larger than half the receiver's buffers.

Third, the device 104 as the receiver may be configured to not acknowledge the receipt of a packet immediately. Instead of acknowledging a received packet immediately, the device 104 starts a timer (if a send timer is not already active on the device 102). Other packets that are received by the device 104 prior to the expiration of the timer are also not acknowledged. Instead, the device 104 sends a single acknowledgement for all of the packets when the timer expires. The single acknowledgement may be sent along with any data that is ready to be sent.

Referring to FIGS. 13A and 13B, embodiments of a receive buffer 1300 (e.g., the receive buffer 110 of FIG. 1) and a send buffer 1320 (e.g., the send buffer 112 of FIG. 1), respectively, are illustrated. Each buffer 1300 and 1320 may be implemented using a Buffer Object or another data construct and are circular buffers in the present example, although it is understood that other buffer types may be used. A socket on a device (e.g., the socket 108 on the device 102) maintains both a receive buffer 1300 and a send buffer 1320.

In FIG. 13A, data is illustrated as either received but not yet acknowledged, or acknowledged but not yet consumed by the application. In FIG. 13B, data is illustrated as either sent but not yet acknowledged, or received from the application but not yet sent.

The following pointers and positions may be used by one or both of the receiving and sending buffers 1300 and 1320 as shown below in table 2:

TABLE 2

| | |
|---|---|
| Start Pointer (Ptr) | On both the receiving and sending sides, the position where the data starts. |
| Buffer Position | On both the receiving and sending sides, the byte position in the stream for the byte at the Start Ptr. Other than this, the rest of the pointers are pointers into the buffer and not the absolute position in the stream. |
| ACK Pointer | On the receiving side, this points to the position in the buffer up to which the data has been acknowledged back to the sender. |
| Consume Pointer | On the receiving side, the position in the buffer up to which data has been consumed. This may be ahead of the ACK Ptr (i.e., received data may have been given to the application but not yet been acknowledged). |
| Send Pointer | On the sending side, the position in the buffer up to which data has been sent. |
| End Pointer | On both the receiving and sending sides, the byte up to which there is contiguously valid data. On the receiving side, there may be discontinuous data beyond this. |

Each buffer 1300 and 1320 may also maintain a list of segments. For example, the buffer 1300 may maintain a list of segments 1302, 1304, 1306, 1308, and 1310. The buffer 1320 may maintain a list of segments 1322, 1324, 1326, 1328, and 1330. Each segment is identified by a start pointer into the respective buffer 1300 or 1320 and a size. The send buffer 1320 may also maintain other data associated with a segment, such as the number of retries attempted for this segment and the timer identifier (ID) associated with the retries. This enables the device 102 to determine which segment is to be retransmitted when a timer expires.

In another embodiment, timer management may be accomplished as follows. The device 102 includes a Timer Object for timer management. The Timer Object also handles the main select loop associated with the socket, which operates as follows. The Timer Object maintains a delta list of timers and always passes the timeout as given by the first item in the delta list to the select. When it comes out of the select, it will check which timers have fired and call them in order. If the select returned because of data in the socket, it will notify the socket object appropriately. The Timer Object may also provide primitives to add a timer and remove a timer. Adding a timer will return a unique ID for the timer. This ID will be passed in the HandleTimer call that is called in the socket when the timer expires.

In another embodiment, encryption, punching and NAT issues may be handled as follows. For purposes of example, all packets may be encrypted using standard encryption methods. A pin-hole in a NAT device (e.g., a NAT router) may be maintained by sending periodic punch packets. For example, the device 102 may be associated with a NAT router. Since the NAT router may change the port number of the device 102 (i.e., the sender), the UID is checked and the copy of the other side's address may be changed to reflect the new port number. There may also be an option to punch a different address from that of the receiver, which may be used if there is a UDP reflector involved in the packet transport. Examples of such NAT traversal techniques are described in previously incorporated U.S. Pat. No. 7,570,636, filed on Aug. 30, 2005, and entitled SYSTEM AND METHOD FOR TRAVERSING A NAT DEVICE FOR PEER-TO-PEER HYBRID COMMUNICATIONS. Such processes enable the RVBDSS connection to support various needs in peer-to-peer communication.

In another embodiment, blocking/non-blocking actions and notification may be handled as follows. The RVBDDS socket supports both blocking and non-blocking modes of operation. In the blocking mode of operation, the calls Connect, Allow, Read, and Write are all made blocking and will only return on successful completion or failure. A notifier may be used to notify the user of various events in the socket. Examples of such events are when the socket status changes to one of the following statuses: CLOSED, CREATED, CONNECTING, ACCEPTING, or CONNECTED, when there is space for writing more data in the socket, and when there is data for being read in the socket. In the non-blocking mode, the application will need to use these notifications to know the status of the operations.

The RVBDDS implementation includes variables that may be changed to modify the behavior of the RVBDDS connection. Examples of such variables are illustrated below in Table 3 as follows.

TABLE 3

| Configuration Constant | Description | Default Value |
| --- | --- | --- |
| MAX_CONNECT_RETRIES | This is the maximum number of times that a Connect message will be sent by the client. | 20 |
| SILLY_WINDOW_DELAY | The time by which ACKs and small packet send will be delayed to wait for more data/ACK to send. | 25 msecs |
| STARTING_RTT | This is the starting value for RTT. | 100 msecs |
| CONNECT_TIMEOUT | The timeout value for connect messages. | 500 msecs |
| PUNCH_TIMEOUT | The time between punches. | 10000 msecs |
| RVBDDS_MAX_TIMEOUT | The maximum timeout value. When the timeout reaches this value, the connection will be considered broken. | 16000 msecs |
| RVBDDS_MIN_TIMEOUT | This is the minimum timeout value to be used. Even if RTT and RTTvar fall so low that the timeout computes to something less that this, the minimum timeout value will not be less than this. Note this is to be greater than the SILLY_WINDOW_DELAY since acknowledgements may be delayed by at least this much by the other side. | 40 msecs |
| RTT_CHANGE_FACTOR | This controls the rate at which RTT changes. | 8 |
| RTTVAR_CHANGE_FACTOR | This controls the rate at which RTT variance changes. | 4 |
| TIMEOUT_RTT_FACTOR | This is the multiple of RTT used in computing the timeout. | 1.5 |
| TIMEOUT_VAR_FACTOR | This is the multiple of RTT variance used in computing the timeout. | 3 |
| TIMEOUT_BACKOFF | This is the factor by which the timeout is backed off if there is a packet loss. | 2 |
| CONGESTION_BACKOFF | This is the factor by which the congestion window is backed off if there is a packet loss. | 2 |
| WINDOW_INCREASE_FACTOR | The window increase will be slowed down by this factor when in the congestion avoidance phase. | 8 |

Beginning with FIG. 14, the following embodiments describe examples of various implementation details in a time synchronous manner as events occur in a single thread.

Referring to FIG. 14, a flow chart illustrates one embodiment of a method 1400 showing how a single segment of data may be sent. It is noted that the method 1400 may be used in multiple places. For example, the method 1400 may be used with step 1102 of FIG. 11.

In step 1402, a timer is registered with the current value of timeout for the segment to be sent. For example, the timer may be registered with the previously described Timer Object. This timer will be inserted into a sorted timer list at the correct location. The sorted timer list may keep absolute time values and associated data and may be sorted by the time value. A unique ID will also be allocated for this timer. As will be described in a later embodiment, such unique timer IDs are used to determine which timer has expired (i.e., fired). This timer ID is stored in the segment.

In step 1404, a packet is constructed with the content of the segment. In the present example, the packet constructed in step 1404 is the UDP packet 200 of FIG. 2B, but it is understood that the RVBDDS packet header 204 may be constructed before the UDP packet 200 in some embodiments. In step 1406, a number of actions are taken to provide the UDP packet 200 with the information for the RVBDDS packet header 204 as illustrated in FIG. 3. It is understood that each action described with respect to step 1406 may be a separate step in the method 1400.

In the present example, the actions of step 1406 include inserting the packet type (e.g., Data, Connect, Accept, Close, or Punch). The send byte is inserted as the start position of the segment if there is data to be sent or another value (e.g., zero) is inserted if there is no data to be sent. The byte up to which all data has been received is obtained and inserted as the ACK byte. Any padding bytes needed to ensure the packet is the correct length are inserted and the number of padded bytes is inserted into the Pad field. The amount of available space in the receive buffer is obtained and inserted into the window field.

In step 1408, the packet is encrypted and, in step 1410, the packet is sent. In step 1412, a determination is made as to whether a send error has occurred. If a send error has occurred, the method 1400 continues to step 1414, where an error is returned. If no send error has occurred, the number of retries for this segment is incremented in step 1416.

In step 1418, a determination is made as to whether there is an ACK wait timer active. If no ACK wait timer is active, the method 1400 returns success. If there is an ACK wait timer active, the timer is unregistered in step 1422 because every data packet carries an acknowledgement and there is no need to separately send another acknowledgement.

Figure 15:
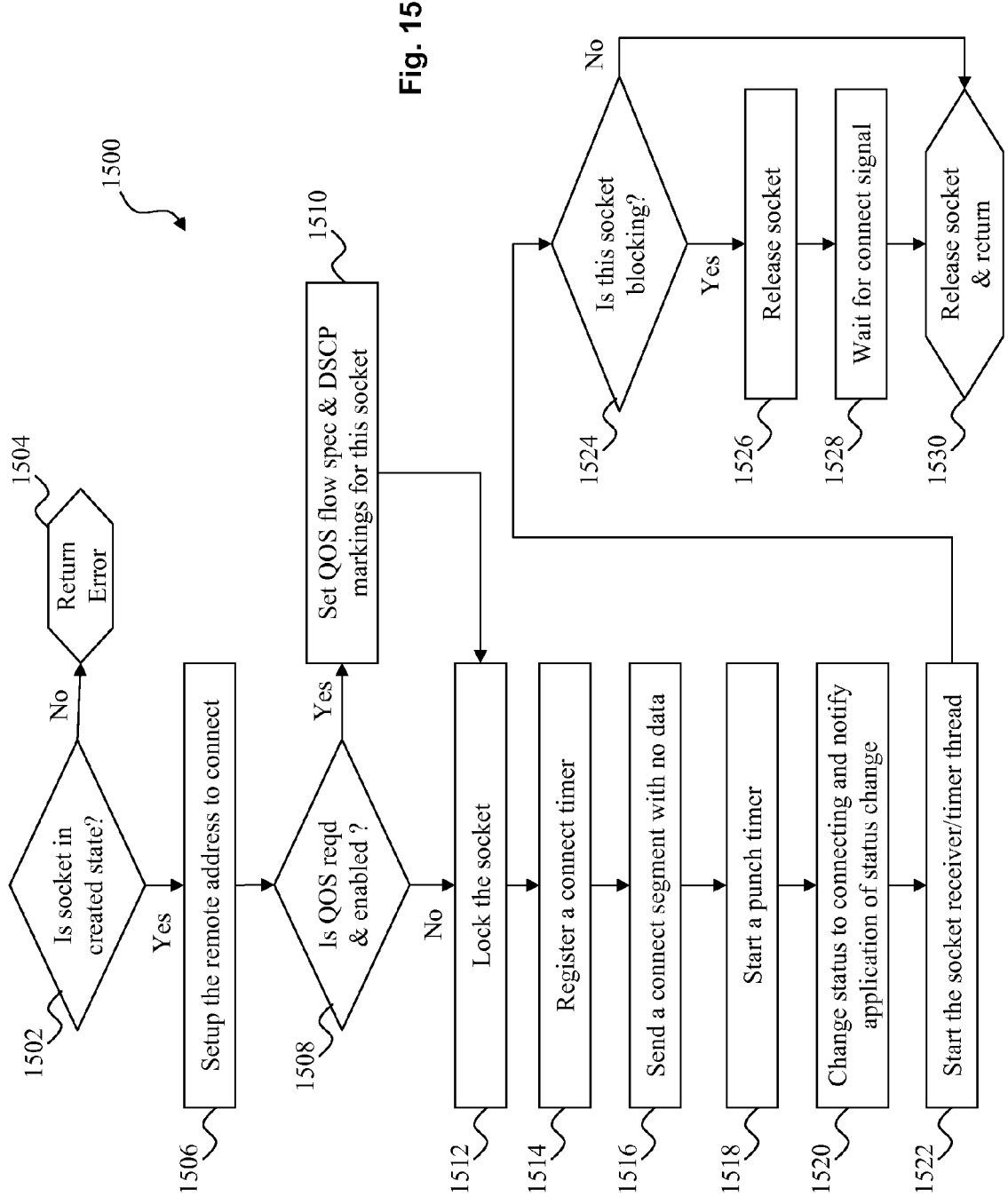
FIG. 15 is a flowchart of one embodiment of a method by which a device of FIG. 1 attempts to connect to another device via an RVBDDS socket.

Referring to FIG. 15, a flow chart illustrates one embodiment of a method 1500 showing steps that occur when an application on the device 102 (e.g., the application 114 of FIG. 1 as a client application) attempts to connect to the device 104 (e.g., to the application 122 as a server application) on the RVBDDS socket 108.

In step 1502, a determination is made as to whether the socket is in a created state on the device 102. If no socket has been created, the method 1500 moves to step 1504 and returns an error. If a socket has been created, the method 1500 moves to step 1506 and sets up the remote address (e.g., binds the socket) to which the device 102 is to connect. In step 1508, a determination is made as to whether quality of service (QoS) is required and enabled for the socket. Whether QoS is required may depend, for example, upon the application 114. Whether QoS is enabled may depend on the particular installation (e.g., whether QoS is provided by the device 102). If QoS is both required and enabled, the method 1500 moves to step 1510 and QoS is established. In the present example, establishing QoS entails enabling DiffSery Code Point (DSCP) markings on the packets for this flow via GQOS on Windows. However, it is understood that other QoS methods may be used.

If QoS is not required or enabled, or after step 1510, the method 1500 moves to step 1512, where the socket is locked. In step 1514, a connect timer is registered and, in step 1516, a connect packet is sent with no data. In step 1518, a punch timer is started. In step 1520, the status is changed to "connecting" (e.g., state 406 of FIG. 4) and the application 114 is notified of the status change. In step 1522, a socket receiver/timer thread (as will be described in a later embodiment) is started.

In step 1524, a determination is made as to whether the socket is blocking. If the socket is not blocking, the method 1500 continues to step 1530, where the socket is released and the method 1500 returns. If the socket is blocking, the method 1500 moves to step 1526, where the socket is released, and from step 1526 to step 1528, where the method 1500 waits for a connect signal. After an Accept packet is received by the socket, the socket will be unblocked and the method 1500 will move from step 1528 to step 1530.

Figure 16:
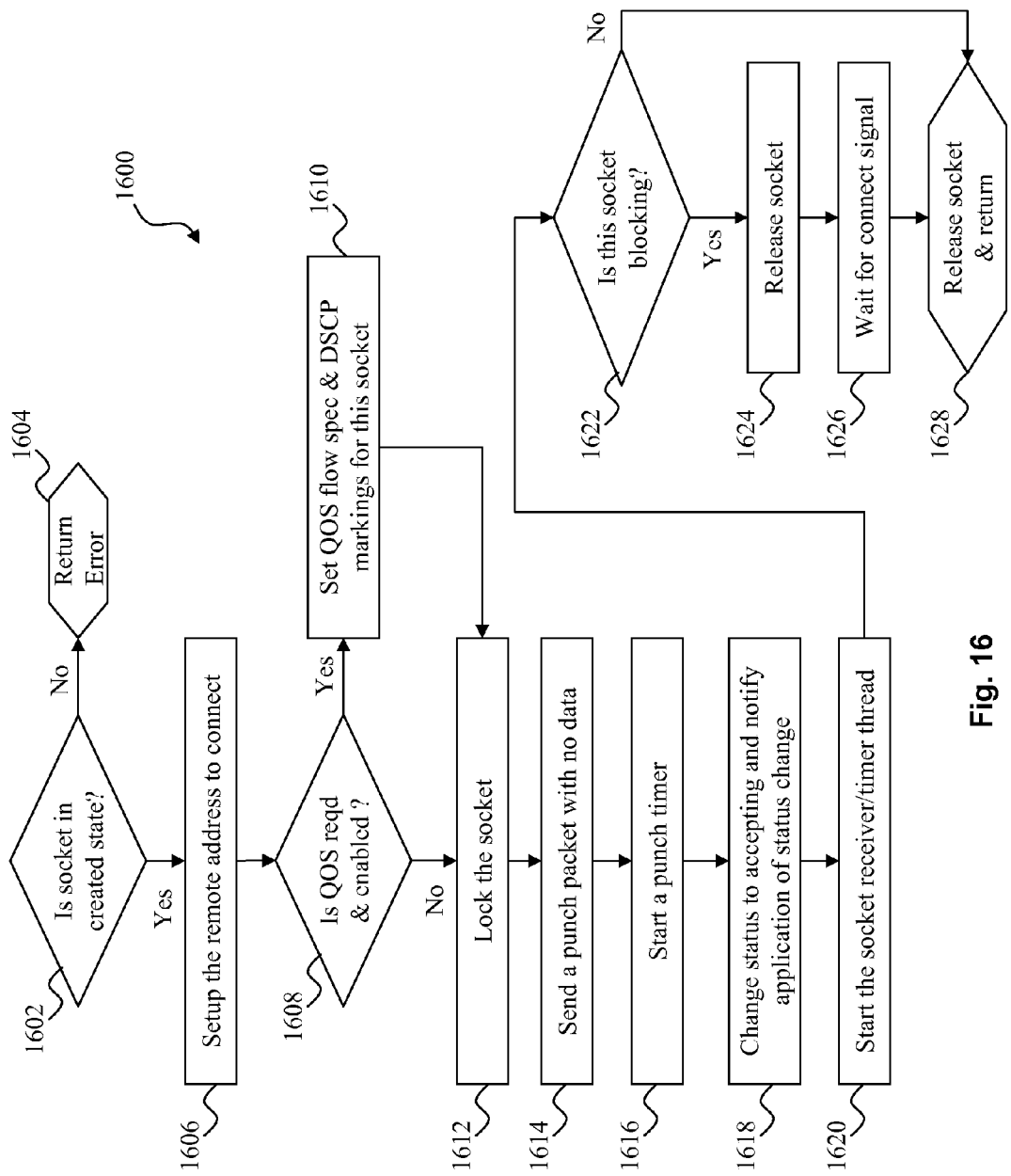
FIG. 16 is a flowchart of one embodiment of a method by which a device of FIG. 1 attempts to accept a connection request from another device via an RVBDDS socket.

Referring to FIG. 16, a flow chart illustrates one embodiment of a method 1600 illustrating steps that occur when an application on the device 104 (e.g., the application 122 of FIG. 1 as a server application) attempts to accept a connection request from the device 102 (e.g., from the application 114 as a client application) on the RVBDDS socket 116.

In step 1602, a determination is made as to whether the socket is in a created state on the device 104. If no socket has been created, the method 1600 moves to step 1604 and returns an error. If a socket has been created, the method 1600 moves to step 1606 and sets up the remote address (e.g., binds the socket) to which the device 104 is to connect. In step 1608, a determination is made as to whether quality of service (QoS) is required and enabled for the socket. Whether QoS is required may depend, for example, upon the application 122. Whether QoS is enabled may depend on the particular installation (e.g., whether QoS is provided by the device 104). If QoS is both required and enabled, the method 1600 moves to step 1610 and QoS is established. In the present example, establishing QoS entails enabling DiffSery Code Point (DSCP) markings on the packets for this flow via GQOS on Windows. However, it is understood that other QoS methods may be used.

If QoS is not required or enabled, or after step 1610, the method 1600 moves to step 1612, where the socket is locked. In step 1614, a punch packet is sent with no data and, in step 1616, a punch timer is started. It is noted that the device 104 (as the accepting side) should first issue a punch packet because a NAT device associated with device 104 (as shown in previous embodiments) might require pinholing. In such cases where pinholing is required, the device 102 (as the remote side) will only be able to reach the device 104 via the socket if a punch has occurred.

In step 1618, the status is changed to "accepting" (e.g., state 410 of FIG. 4) and the application 122 is notified of the status change. In step 1620, a socket receiver/timer thread (as will be described in a later embodiment) is started.

In step 1622, a determination is made as to whether the socket is blocking. If the socket is not blocking, the method 1600 continues to step 1628, where the socket is released and the method 1600 returns. If the socket is blocking, the method 1600 moves to step 1624, where the socket is released, and from step 1624 to step 1626, where the method 1600 waits for a connect signal. After a packet is received by the socket indicating that the connection has been established, the socket will be unblocked and the method 1600 will move from step 1626 to step 1628.

Figure 17A:
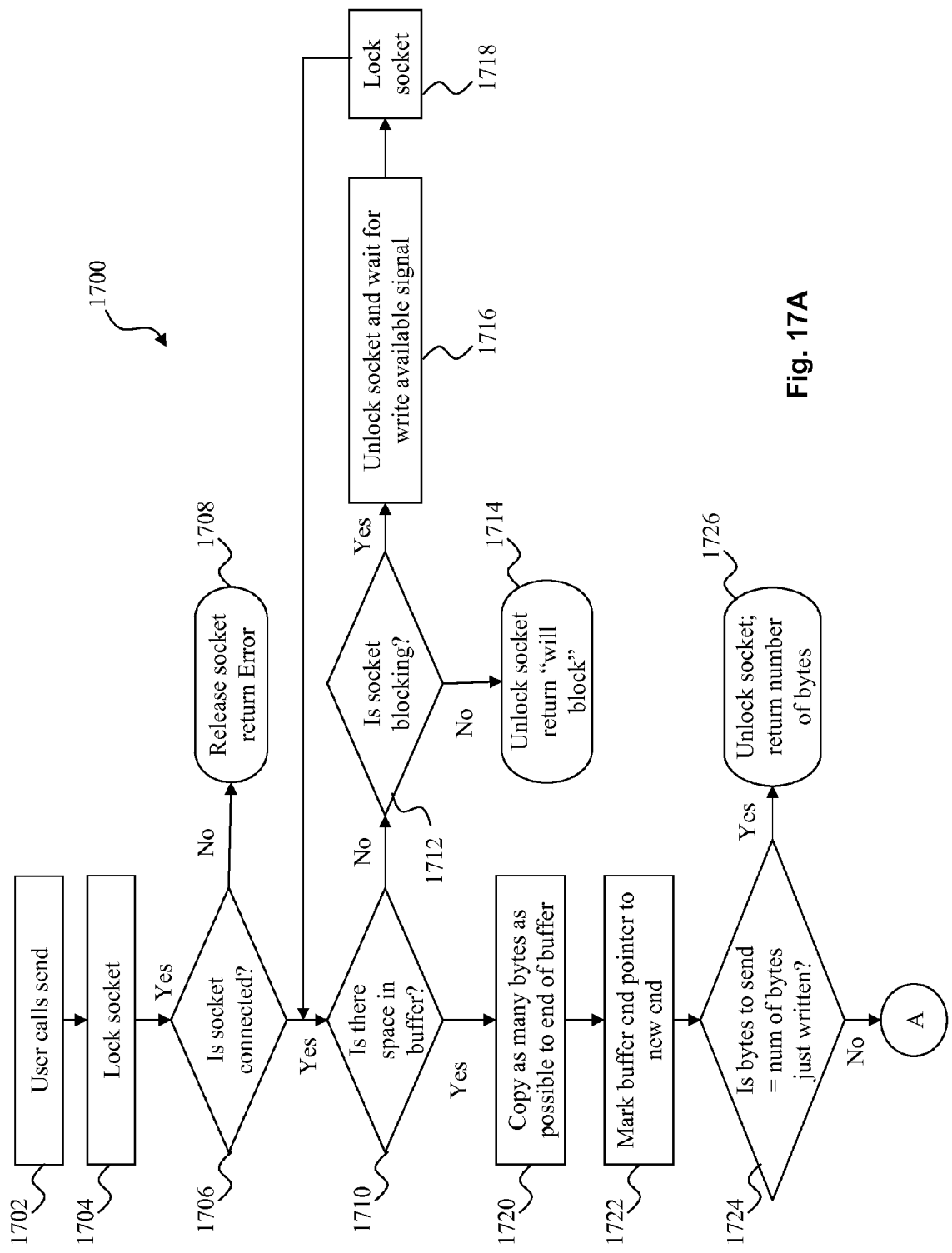
FIGS. 17A and 17B are flowcharts of one embodiment of a method by which a device of FIG. 1 attempts to send data on an RVBDDS socket.
Figure 17B:
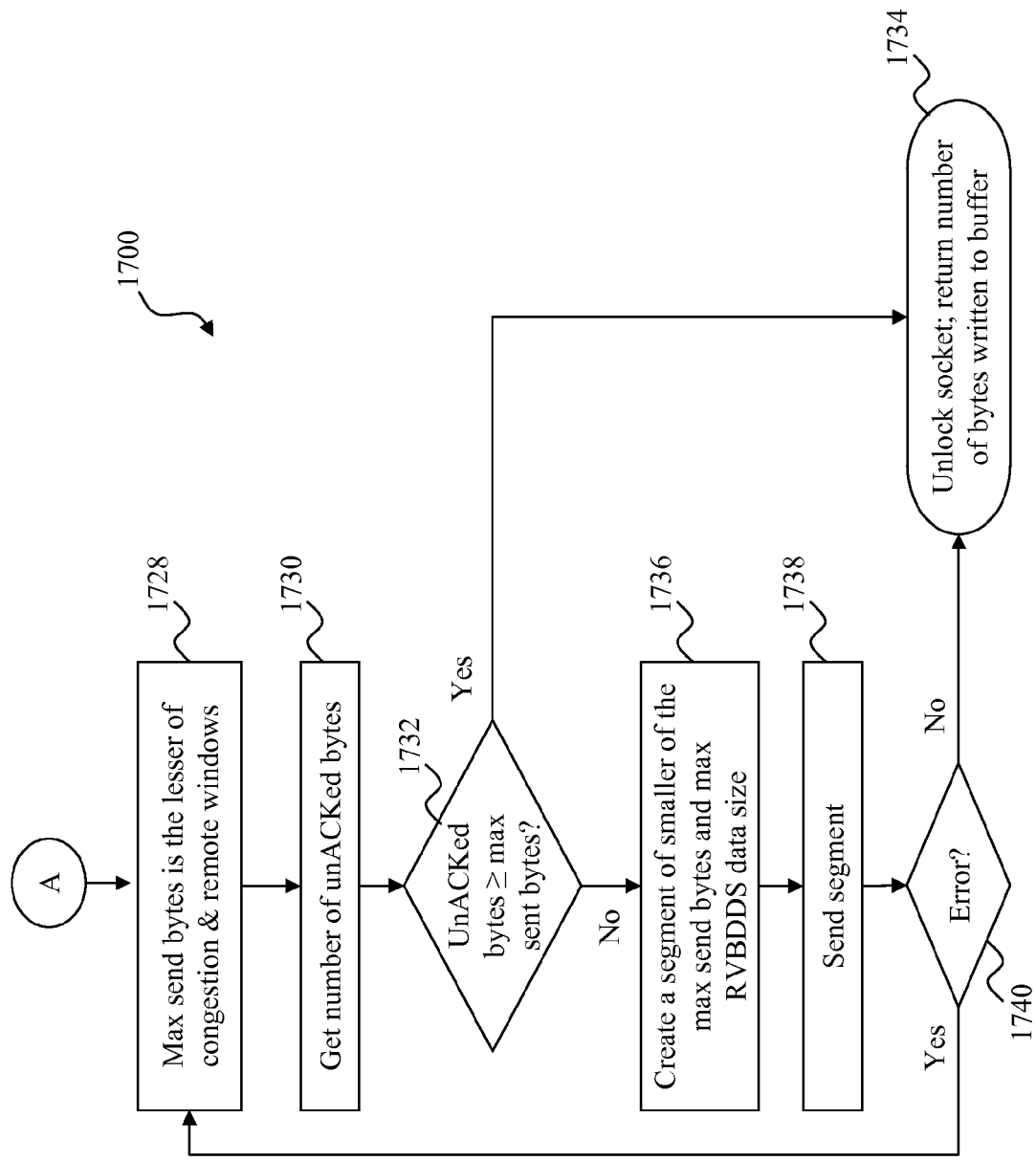

Referring to FIGS. 17A and 17B, a flow chart illustrates one embodiment of a method 1700 showing steps that occur when an application on the device 102 (e.g., the application 114 of FIG. 1) attempts to send data on the RVBDDS socket 108.

In step 1702, the application 114 calls a send function to indicate that it is sending (or wants to send) data. In step 1704, the socket is locked. In step 1708, a determination is made as to whether the socket is connected (e.g., in the connected state 408 of FIG. 4). If the socket is not connected, the method 1700 moves to step 1708, where the socket is released and an error is returned.

If the socket is connected, the method 1700 moves to step 1710, where a determination is made as to whether there is space in the send buffer 112. If there is no space in the send buffer 112, the method 1700 moves to step 1712, where a determination is made as to whether the socket is blocking. If the socket is not blocking, the method 1700 moves to step 1714, where the socket is unlocked and "will block" is returned. If the socket is blocking, the method 1700 moves to step 1716, where the socket is unlocked and the method 1700 waits for a signal that write is available (e.g., that there is space in the socket). Once the write available signal is received, the socket is locked in step 1718 and the method 1700 returns to step 1710.

In step 1720, once there is space available in the send buffer 112 as determined in step 1710, as many bytes as possible are copied into the send buffer until the send buffer is full. In step 1722, the end pointer of the send buffer 112 is set to point at the new end location. In step 1724, a determination is made as to whether the number of bytes to be sent is the same as the number of bytes just written to the send buffer 112. It is noted that this implies that there were already bytes in the send buffer 112 that were available to be sent but could not be sent for some reason (e.g., the remote window is full or the congestion window is full). Therefore, there is no reason to attempt to send bytes now and, when these windows free up, the data will be sent. Accordingly, if the number of bytes is the same, the method 1700 continues to step 1726, where the socket is unlocked and the number of bytes is returned. If the number of bytes is not the same, the method 1700 continues to step 1728 (FIG. 17B).

In step 1728, the maximum number of send bytes is the lesser of the congestion window and the remote window as described previously with respect to FIG. 12. In step 1730, the number of unacknowledged bytes is obtained. As previously described, these are the bytes that have been sent but acknowledgements have not been received (e.g., the bytes from the start pointer to the sent pointer in the send buffer 112).

In step 1732, a determination is made as to whether the number of unacknowledged bytes is greater or equal to the maximum number of bytes that can be sent. If the number of unacknowledged bytes is greater or equal to the maximum number of bytes that can be sent, the method 1700 moves to step 1734, where the socket is unlocked and the number of bytes written to the buffer is returned. If the number of unacknowledged bytes is not greater or equal to the maximum number of bytes that can be sent, the method 1700 moves to step 1736, where a packet is created using the smaller of the maximum number of bytes that can be sent and the maximum segment size. In step 1738, the packet containing the segment is sent. In step 1740, a determination is made as to whether an error has occurred. If an error has not occurred, the method 1700 returns to step 1728. If an error has occurred, the method 1700 moves to step 1734, where the socket is unlocked and the number of bytes written to the buffer is returned.

Figure 18:
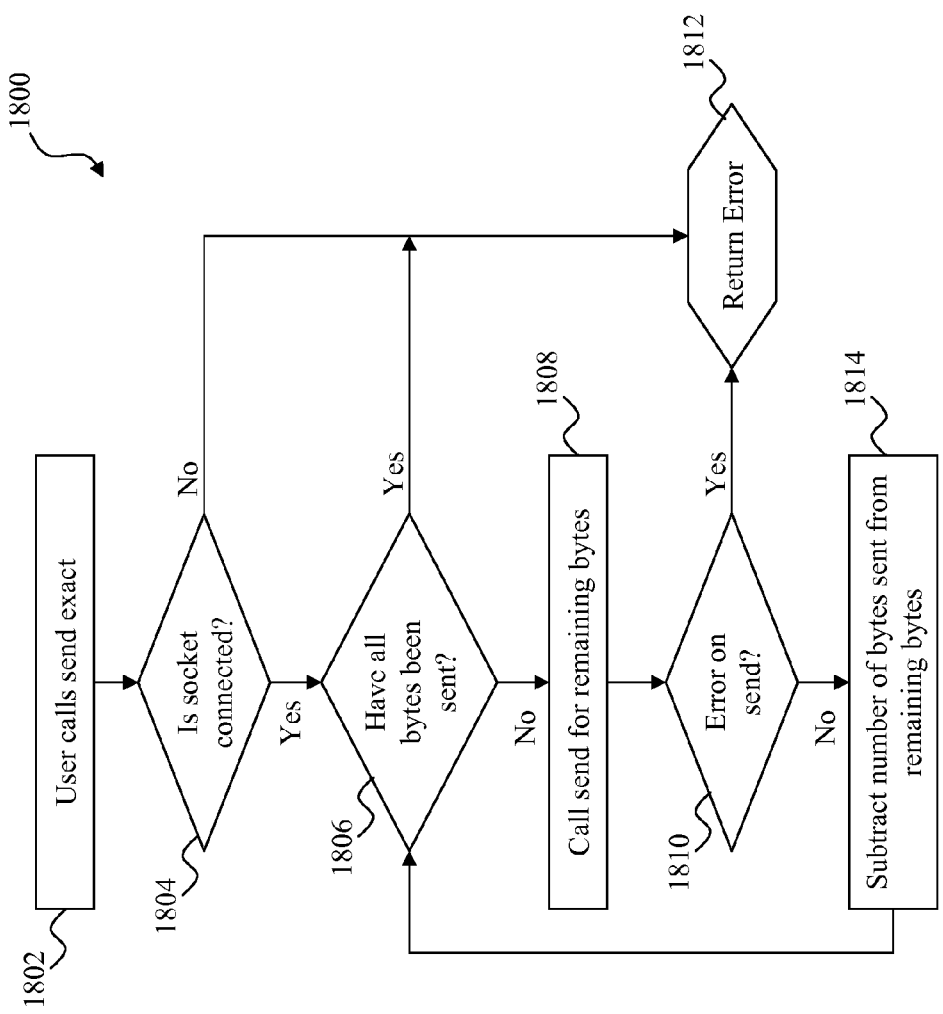
FIG. 18 is a flowchart of one embodiment of a method by which a device of FIG. 1 attempts to send an exact amount of data on an RVBDDS socket.

Referring to FIG. 18, a flow chart illustrates one embodiment of a method 1800 showing steps that occur when an application on the device 102 (e.g., the application 114 of FIG. 1) attempts to send data on the RVBDDS socket 108. In the previous embodiment of FIGS. 17A and 17B, the method 1700 described a scenario in which the exact number of bytes that the application 114 requested to be sent may not have been sent. The present embodiment describes a scenario in which an exact number of bytes is to be sent. It is noted that the method 1800 works only with a blocking socket.

In step 1802, the application 114 calls a send exact function to indicate that it is sending (or wants to send) an exact amount of data. In step 1804, a determination is made as to whether the socket is connected (e.g., in the connected state 408 of FIG. 4). If the socket is not connected, the method 1800 moves to step 1812, where an error is returned.

If the socket is connected, the method 1800 moves to step 1806, where a determination is made as to whether all of the bytes that are to be sent have been sent. If all of the bytes have been sent, the method 1800 moves to step 1812. If all of the bytes have not been sent, the method 1800 moves to step 1808, where send is called for the remaining bytes. In step 1810, a determination is made as to whether there was an error on send. If there was an error on send, the method 1800 moves to step 1812. If there was not an error on send, the method 1800 moves to step 1814, where the number of bytes that have been sent are subtracted from the number of bytes that remain to be sent. The method 1800 then returns to step 1806.

Figure 19:
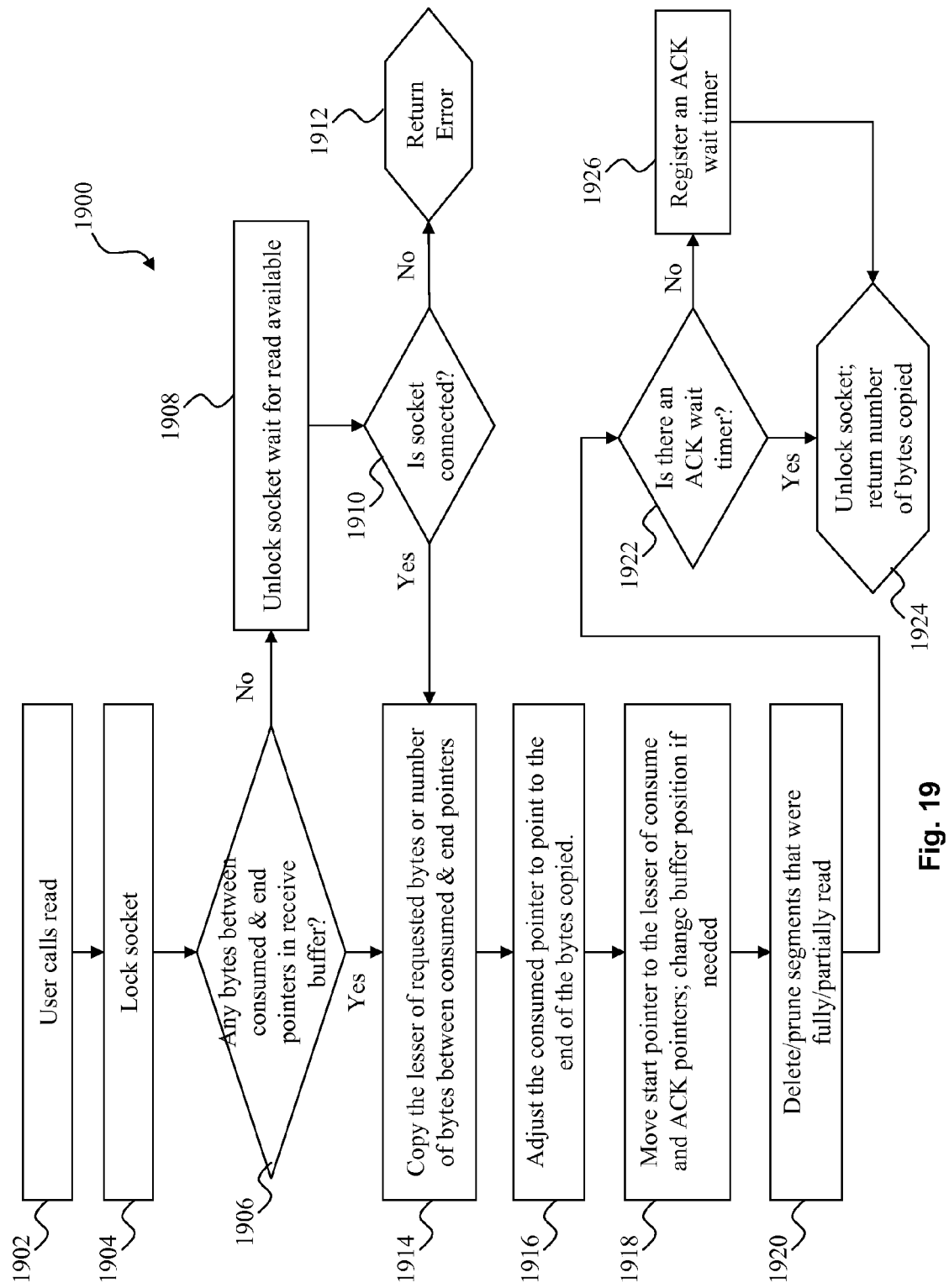
FIG. 19 is a flowchart of one embodiment of a method by which a device of FIG. 1 attempts to read data from an RVBDDS socket.

Referring to FIG. 19, a flow chart illustrates one embodiment of a method 1900 showing steps that occur when an application on the device 102 (e.g., the application 114 of FIG. 1) attempts to read data from the RVBDDS socket 108.

In step 1902, the application 114 calls a read function to indicate that it is reading (or wants to read) data. In step 1904, the socket is locked. In step 1908, a determination is made as to whether there are any bytes positioned between the consume pointer and the end pointer in the receive buffer 110. This provides the number of contiguous bytes remaining that can be given to the application 114. If there are no bytes, the method 1900 continues to step 1908, where it unlocks the socket and waits for a read available event indicating that there is data to be read. In step 1910, once the method 1900 has woken up with the read available signal, the method 1900 moves to step 1910, where a determination is made as to whether the socket is still connected (e.g., in the connected state 408 of FIG. 4). If the socket is not connected, the method 1900 moves to step 1912, where the socket is released and an error is returned. If the socket is connected or if there are bytes available between the consume pointer and the end pointer as determined in step 1906, the method 1900 moves to step 1914.

In step 1914, the lesser of the requested bytes (e.g., the number of bytes requested by the application 114) or the number of bytes between the consumer pointer and the end pointer are copied. In step 1916, the consume pointer is moved to point to the location marking the end of the bytes that were copied. In step 1918, the start pointer is moved to point to the lesser of the consume pointer and the ACK pointer. Bytes may also be moved within the receive buffer 110 as room becomes available. Such movement may not always occur, however, because only data that has been both consumed and acknowledged is removed from the receive buffer 110. This is because there may be bytes that have been consumed by the application 114 that have not yet been acknowledged because an ACK wait timer for this data has not yet expired. Furthermore, a portion of the data may have been acknowledged but not all of the acknowledged data may have been consumed because the application 114 has not issued a read for this data. Accordingly, data may not be moved within the receive buffer 110 until both events have occurred.

In step 1920, segments that have been fully read may be deleted and the final segment from which data may have been partially read may be pruned. The pruning occurs because an application may read arbitrary bytes instead of the bytes as they were sent/received, which once again is not necessarily the way the bytes were originally written by the application. More specifically, in a typical streaming application, the sizes of chunks in reading the bytes on the receiving side need not match the size of the chunks that were written by the sending side. For example, the application on the sending side might write 2200 bytes to the RVBDDS connection. Internally, the RVBDDS connection may send this out to the network as two packets of sizes 1400 bytes and 800 bytes to the stream. On the receiving side, the application may first read a header of 12 bytes and recognize that there is data of size 2185 bytes and padding of 3 bytes. So the sequence of writes to the network on the sending side would have been for 1400 bytes and 800 bytes, while the receiving side would have issued reads of size 12 bytes, 2185 bytes and 3 bytes. Because of this disparity, segments in the queue may not be removed in their entirety and partial segments are left in the buffer when they are partially read.

In step 1922, a determination is made as to whether there is an ACK wait timer that is active. If there is an ACK wait timer, the method 1900 continues to step 1924, where the socket is unlocked and the number of copied bytes is returned. If there is not an ACK wait timer, the method 1900 moves to step 1926, where an ACK wait timer is registered. It is noted that sending an acknowledgement also sends a window advertisement. The window advertisement needs to be sent because the start pointer has potentially moved and the receive buffer 4006 may have more space to receive additional bytes. Accordingly, the remote window advertisements may be piggybacked with the acknowledgements. The method 1900 then proceeds to step 1924.

Figure 20:
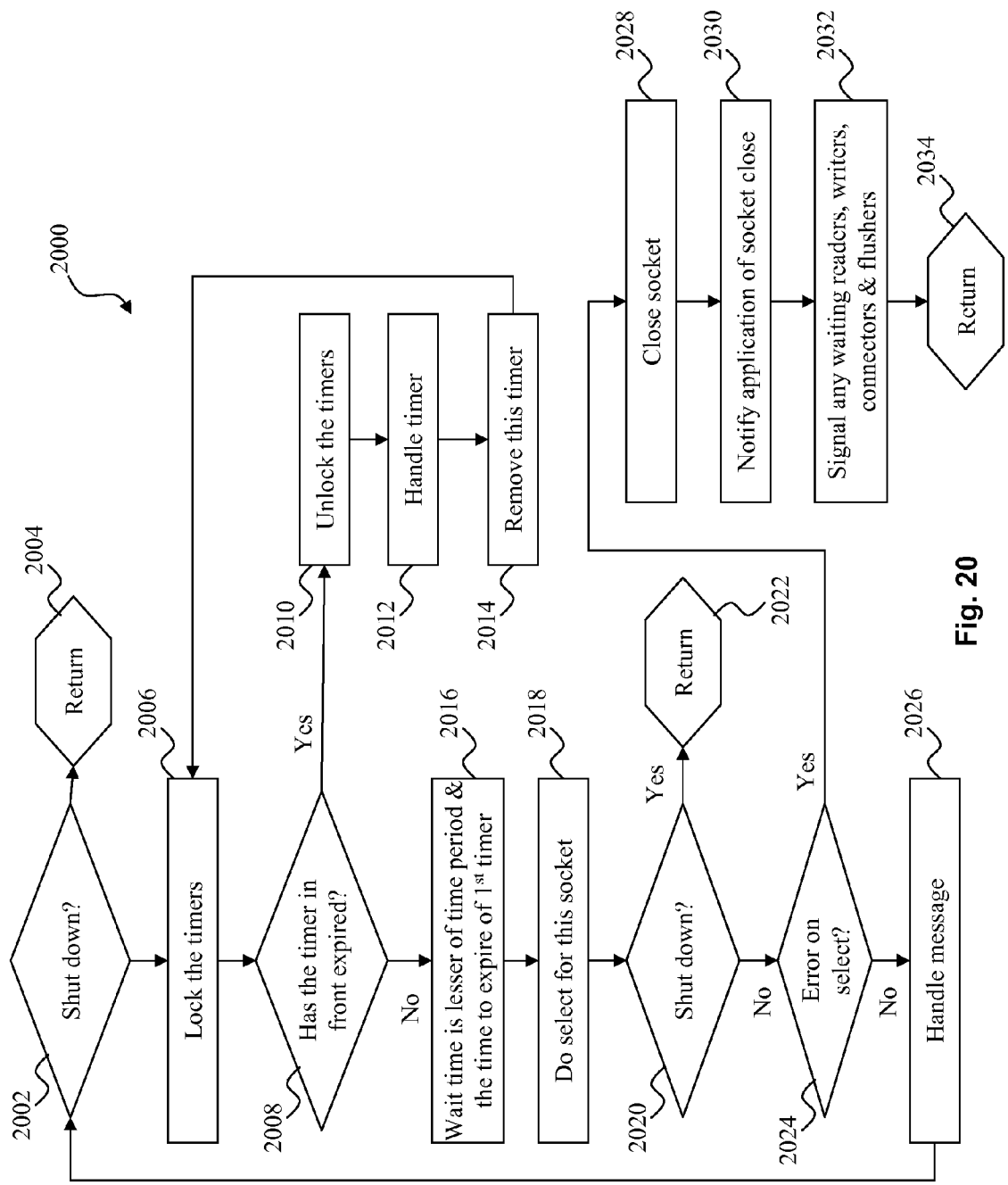
FIG. 20 is a flowchart of one embodiment of a method by which a device of FIG. 1 handles data and timers corresponding to an RVBDDS socket.

Referring to FIG. 20, a flow chart illustrates one embodiment of a method 2000 showing steps that may be used by a thread that handles receiving data from the socket 108 (FIG. 1) and handles the timers described herein. It is understood that multiple threads may be used to provide the functionality described with respect to the method 2000. In the present embodiment, this thread is where the majority of the actions related to the socket 108 occur.

In step 2002, a determination is made as to whether the socket should be closed. If the socket should be closed, the method 2000 moves to step 2004 and returns. If the socket should not be closed, the method 2000 continues to step 2006.

Figure 21A:
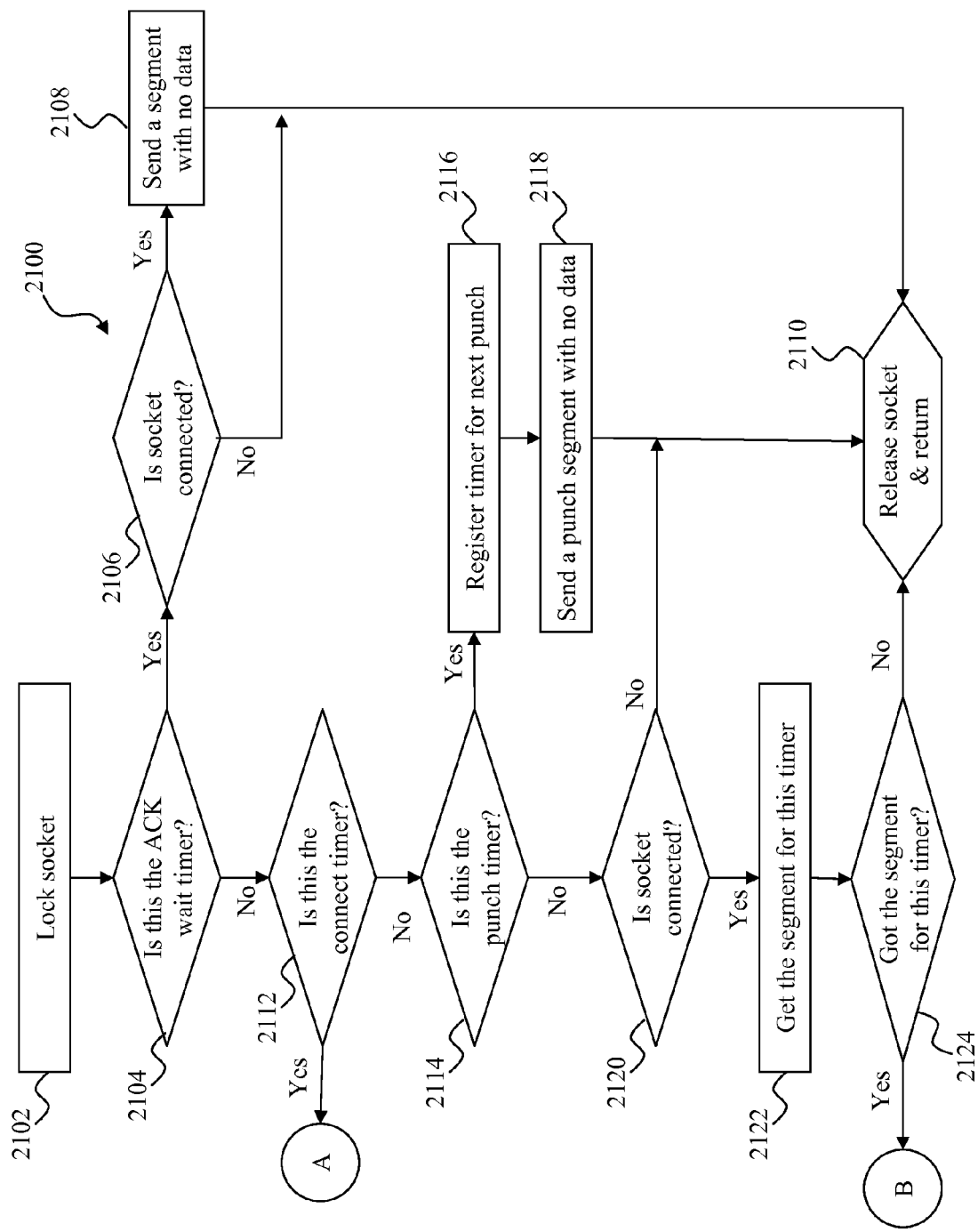
FIGS. 21A-21C are flowcharts of one embodiment of a method that the method of FIG. 20 may use to handle timers.

In step 2006, the timers are locked. In step 2008, a determination is made as to whether the timer in the front of the timer list has expired. If the timer has expired, the method 2000 moves to step 2010, where the timers are unlocked. While handling timers (step 2012), additional timers may be added or deleted and so the timer list is unlocked before handling the timer. In step 2012, the timer that has expired is handled, as will be described in a later embodiment (FIG. 21A). In step 2014, this timer is removed from the timer list and the method 2000 returns to step 2006. The timer is removed only after handling it to prevent a situation from occurring where this timer ID is used for a new timer before method 2000 is finished handling the timer (e.g., before coming out of a function that handles the timer). If the timer in the front of the timer list has not expired as determined by step 2008, the method 2000 moves to step 2016.

In step 2016, a wait time is set as the lesser of a predefined time period (e.g., ten milliseconds) and the time remaining before the first timer expires. In step 2018, a select is performed for the socket 108. The select will block the socket for the wait time set in step 2016 while waiting for I/O activity on the socket 108. Select may end upon the occurrence of various events, such as the expiration of the wait time, the detection of I/O activity on the socket 108, or the detection of an error. Such an error may be because the socket 108 has been closed and therefore the socket to select is not valid.

In step 2020, a determination is made as to whether the socket should be closed. If the socket should be closed, the method 2000 moves to step 2022 and returns. If the socket should not be closed, the method 2000 continues to step 2024. In step 2024, a determination is made as to whether an error on select occurred (e.g., if an error occurred in step 2018). If no error on select occurred, the method 2000 moves to step 2026, where a message is handled, as will be described in a later embodiment (FIG. 22A). The method 2000 then returns to step 2002. If an error on select did occur as determined in step 2024, the method 2000 continues to step 2028.

In step 2028, the socket 108 is closed and, in step 2030, the application 114 is notified that the socket is closed. In step 2032, waiting readers, writers, connectors, and flushers are signaled that the socket is closed and, in step 2034, the method 2000 returns.

Figure 21B:
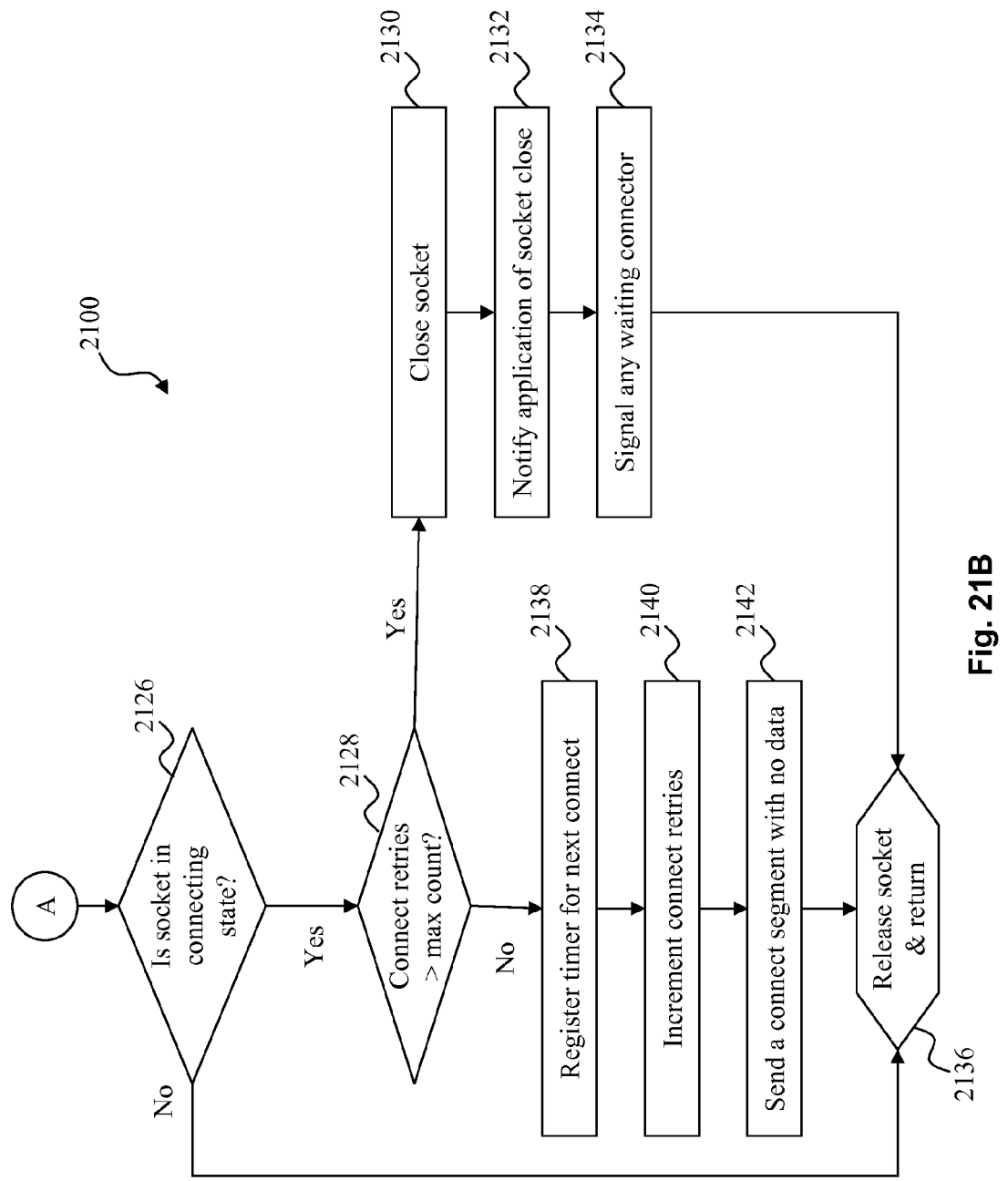
Figure 21C:
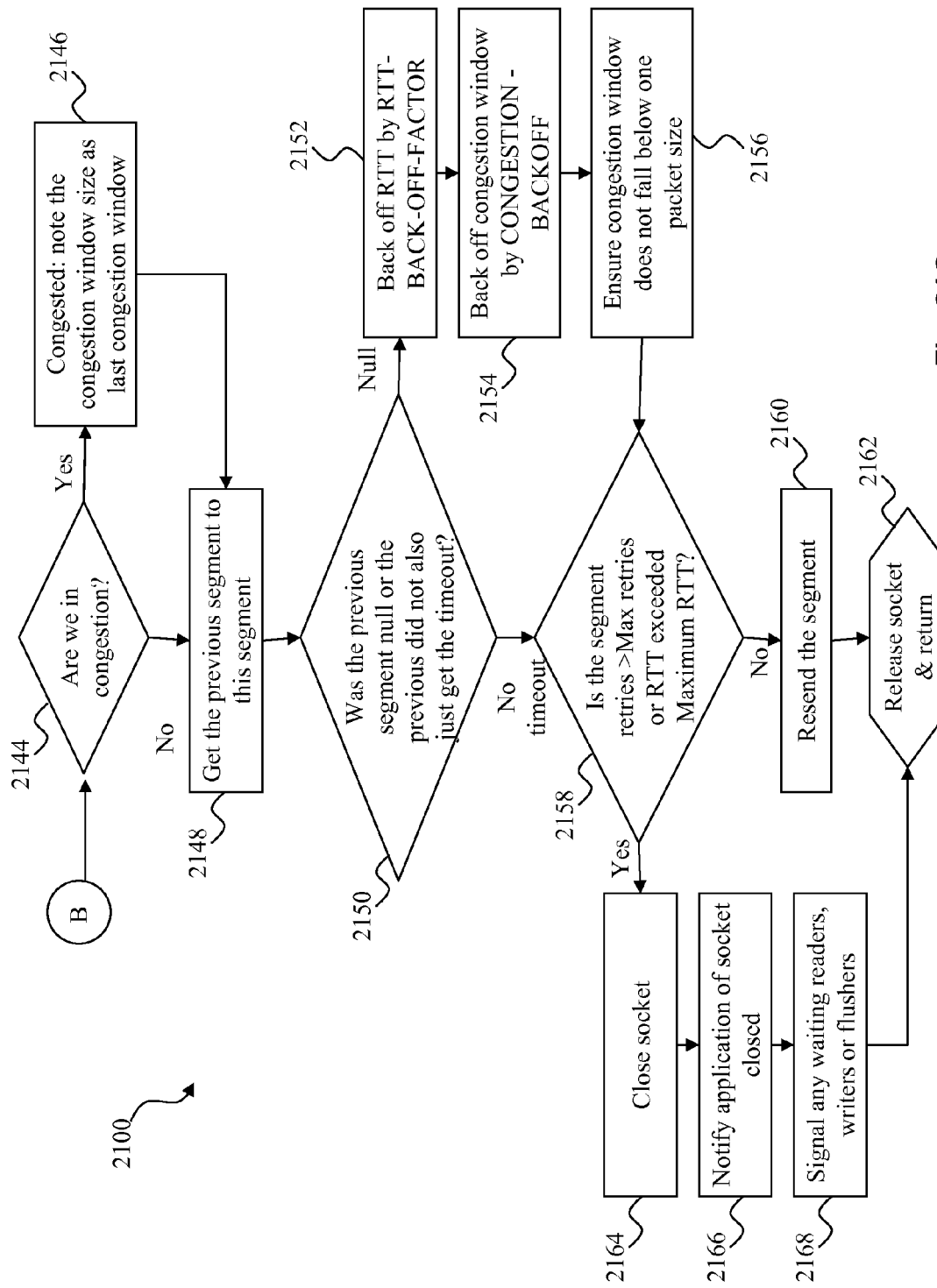

Referring to FIGS. 21A-21C, a flow chart illustrates one embodiment of a method 2100 showing steps that may be used to handle timers by the method of FIG. 20. For example, the method 2100 may be used for step 2012 of FIG. 20.

The present embodiment uses several types of timers. For example, when a Connect message is sent, a connect timer is created to wait for the connect response. Punch messages are sent periodically to keep the NAT pinhole open and these use a punch timer. As described previously, acknowledgements may not be sent immediately. Instead, an acknowledgement timer may be used and the acknowledgement is sent only when the timer expires. One benefit of the acknowledgement timer is that if a number of segments are received in a short span of time, a single acknowledgement is sent for the segments instead of one for each. Another benefit is that typically the data received will be immediately given to a waiting read from the application 114, which frees up part of the space occupied by this received data. This small wait period enables the advertisement of a larger window size.

The above three timers (i.e., connect, punch, and ACK timers) are all single instance timers, meaning that there is only one of each of these timers for a single socket. Other timers are generally segment timers, with each segment that is sent having an associated segment timer.

In step 2102, the socket 108 is locked. In step 2104, a determination is made as to whether the timer at the front of the timer list (i.e., the timer being handled), is the ACK timer. If the timer is the ACK timer, the method 2100 moves to step 2106, where a determination is made as to whether the socket is connected. If the socket is not connected, the method 2100 moves to step 2110, where the socket is released and the method returns. If the socket is connected, the method 2100 sends a segment with no data (e.g., an ACK packet) and then moves to step 2110. If the timer is not the ACK timer as determined in step 2104, the method 2100 moves to step 2112.

In step 2112, a determination is made as to whether the timer is the connect timer. If the timer is the connect timer, the method 2100 moves to step 2126 (FIG. 21B). In step 2126, a determination is made as to whether the socket is in a connecting state. If the socket is not in a connecting state, the method 2100 moves to step 2136, where the socket is released and the method returns. If the socket is in a connecting state, the method moves to step 2128, where a determination is made as to whether the number of connection retries exceeds a maximum value (e.g., whether the maximum number of retry attempts have been made). If the number of connection retries exceeds the maximum value, the method 2100 moves to step 2130, where the socket is closed. In step 2132, the application 114 is notified of the socket closure. In step 2134, any waiting connectors are signaled and the method 2100 then moves to step 2136, where the socket is released and the method returns. If the number of connection retries does not exceed the maximum value, the method 2100 moves to step 2138.

In step 2138, the timer is registered for the next connection attempt. In step 2140, the connection retry value is incremented and, in step 2142, a connect packet is sent with no data. The method 2100 then moves to step 2136, where the socket is released and the method returns.

Returning again to FIG. 21A, if the timer is not the connect timer as determined in step 2112, the method 2100 continues to step 2114. In step 2114, a determination is made as to whether the timer is the punch timer. If the timer is the punch timer, the method 2100 moves to step 2116, where the timer is registered for the next punch. In step 2118, a punch packet is sent with no data. The method 2100 then moves to step 2110, where the socket is released and the method returns. If the timer is not the punch timer, the method 2100 moves to step 2120.

At this point, the method 2100 has determined that the timer is not the ACK, connect, or punch timer). Accordingly, in step 2120, a determination is made as to whether the socket is connected. If the socket is not connected, the method 2100 moves to step 2110, where the socket is released and the method returns. If the socket is connected, the method 2100 moves to step 2122, where the segment associated with this timer is retrieved in step 2122. This step gets the segment from the segment list for the receive buffer 110.

In step 2124, a determination is made as to whether the segment for this timer was retrieved. If the segment was not retrieved, the method 2100 moves to step 2110, where the socket is released and the method returns. If the segment was retrieved, the method 2100 moves to step 2144 (FIG. 21C).

In step 2144, a determination is made as to whether congestion is occurring. In the present example, a variable (e.g., a Boolean variable) may be used to track whether a congestion phase is currently occurring. This phase may be entered when the first packet is dropped and exited when a valid acknowledgement is received. If congestion is occurring, the method 2100 moves to step 2146, where the congestion window size is noted as the last congestion window. The last congestion window is recorded so that as the congestion phase ends and nears this earlier point, the rate of increase in the window size can be slowed. The method 2100 then moves to step 2148. If congestion is not occurring as determined in step 2144, the method 2100 also moves to step 2148.

In step 2148, the segment previous to the current segment is retrieved. In step 2150, a determination is made as to whether the previous segment was null or whether the segment did not receive a timeout. For example, if several segments timeout in sequence, the timeout may be because the first packet in the sequence did not reach the other side (and so was not acknowledged). Because the first packet was not acknowledged, the other packets will not be acknowledged either. When this occurs, there is no need to keep backing off the congestion window and RTT for each of those segments.

Accordingly, if the previous segment was null, the method 2100 moves to step 2152, where the RTT back off occurs by the RTT Backoff Factor (see FIG. 11). In step 2154, the congestion window backoff occurs by the Congestion Backoff Factor. In step 2156, the congestion window is checked to make sure it has not dropped below the size of a single packet. The method 2100 then moves to step 2158. If the previous segment did not receive a timeout as determined in step 2150, the method 2100 also moves to step 2158.

In step 2158, a determination is made as to whether the number of retries for this segment has exceeded a maximum number of retries or if RTT has exceeded Maximum RTT. If neither of these events has occurred, the method 2100 continues to step 2160, where the segment is resent. The method 2100 then moves to step 2162, where the socket is released and the method returns. If either of the events has occurred, the method 2100 moves to step 2164, where the socket is closed. In step 2166, the application 114 is notified that the socket is closed and, in step 2168, any waiting reader, writers, or flushers are signaled that the socket is closed. The method 2100 then moves to step 2162, where the socket is released and the method returns.

Referring to FIGS. 22A-22G, a flow chart illustrates one embodiment of a method 2200 showing steps that may be used to handle messages by the method of FIG. 20. For example, the method 2200 may be used for step 2026 of FIG. 20.

In step 2202, the socket 108 is locked. In step 2204, a packet is received from the socket. In step 2206, a determination is made as to whether a receive error occurred. If a receive error did occur, the method 2200 moves to step 2208, where the socket is released and the method returns. If no receive error occurred, the method 2200 moves to step 2210, where the packet is decrypted.

In step 2212, a determination is made as to whether the source IP address and UID match the current socket information. If there is no match, the method 2200 moves to step 2208, where the socket is released and the method returns. If there is a match, the method 2100 moves to step 2214, where the ACK byte, send byte, remote window, pad, and packet type are obtained from the packet. In step 2216, the packet type is identified as one of Data, Connect, Accept, Other, and Close.

Figure 22B:
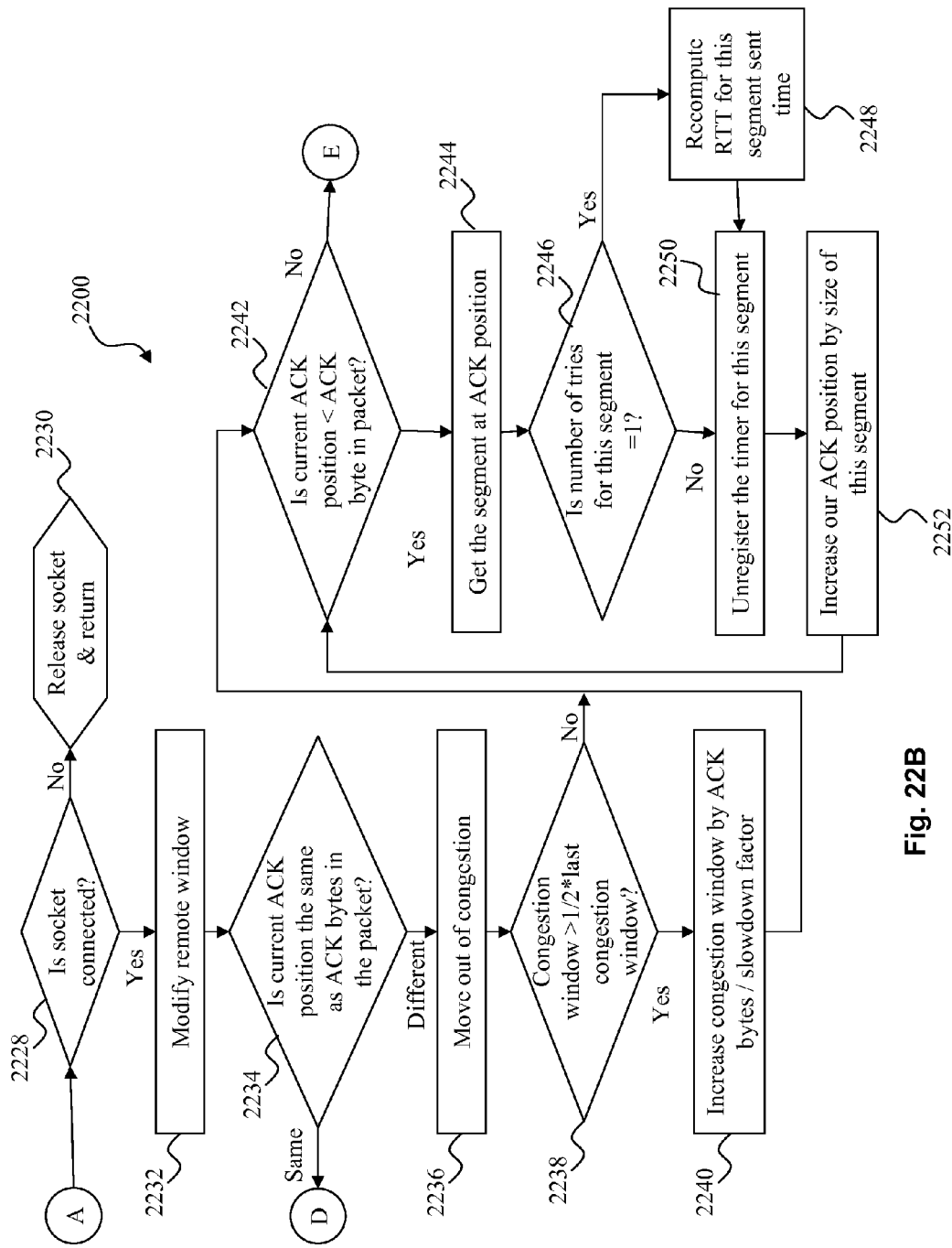

With additional reference to FIG. 22B, identifying the packet as a Data packet moves the method 2200 to step 2228. In step 2228, a determination is made as to whether the socket is connected. If the socket is not connected, the method 2200 moves to step 2208, where the socket is released and the method returns. If the socket is connected, the method 2200 moves to step 2232, where the remote window value is modified with the value obtained in step 2214.

Figure 22C:
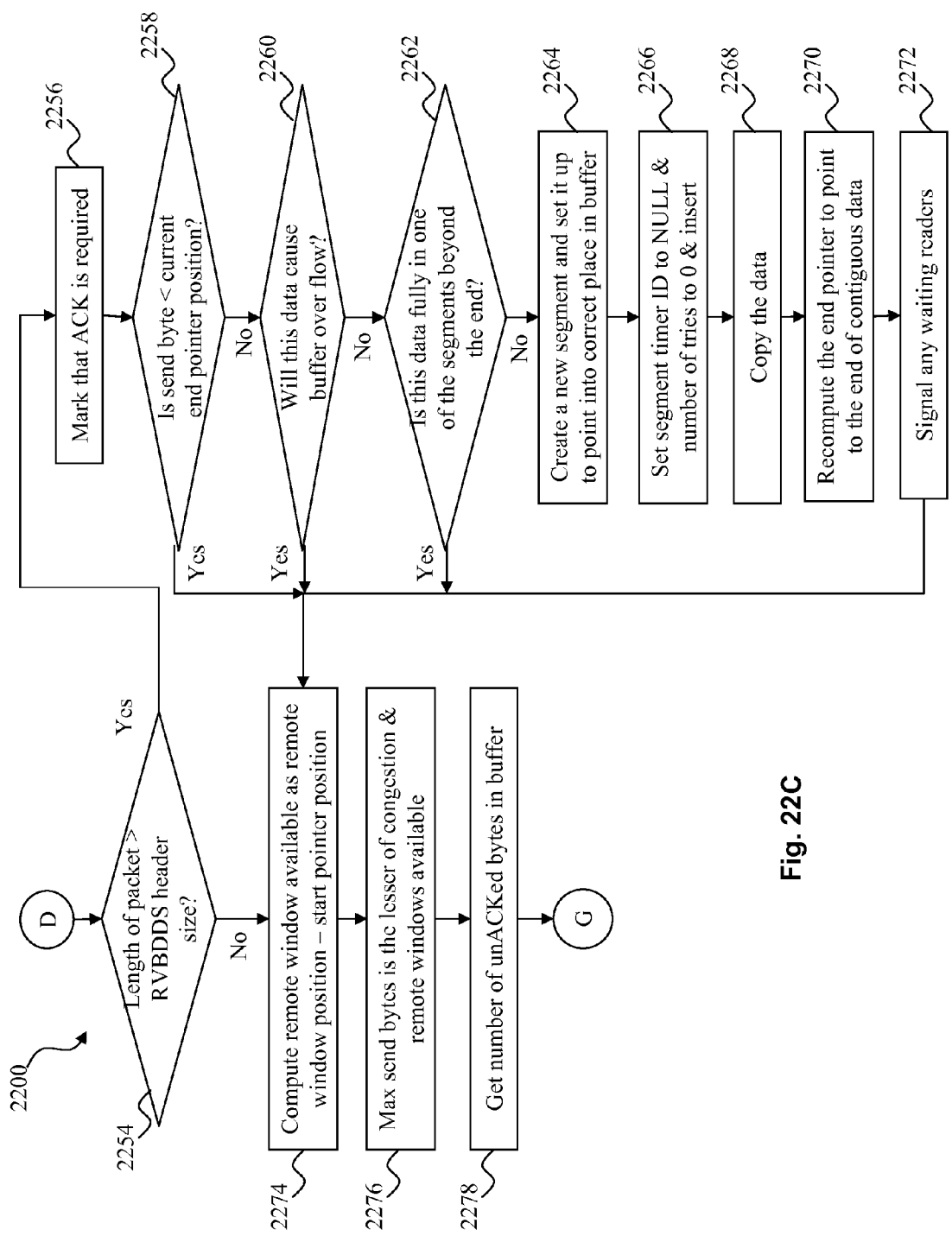

In step 2234, a determination is made as to whether the current ACK position is the same as the ACK byte in the packet. If they are the same, then no congestion is occurring and the method 2200 moves to step 2254 (FIG. 22C).

In step 2254, a determination is made as to whether the length of the packet is greater than the header of the RVBDDS packet header 204. If the length is greater, then the packet carries data and the method 2200 moves to step 2256, where it is noted that an ACK is required. In step 2258, a determination is made as to whether the send byte is less than the current end pointer position. If the send byte is less than the current end pointer position, the method 2200 moves to step 2274, where the available remote window is computed as the remote window position minus the start pointer position (i.e., available remote window=remote window position−start pointer position). If the send byte is not less than the current end pointer position, the method 2200 moves to step 2260, where a determination is made as to whether the data will cause the receive buffer 110 to overflow. If the data will cause the receive buffer 110 to overflow, the method moves to step 2274. If the data will not cause the receive buffer to overflow, the method 2200 continues to step 2262.

In step 2262, a determination is made as to whether this data is fully contained in a segment that is past the end pointer, which points to the end of contiguous data. Accordingly, when data is received, a check is made to determine whether that data has already been received. Because the end pointer only points to the end of contiguous data in the receive buffer 110, step 2262 determines whether the data is within the end pointer and also determines whether the data fits into any of the other non-contiguous segments already received. If the data is fully contained in a segment beyond the end pointer, the method 2200 moves to step 2274. If the data is not fully contained in a segment beyond the end pointer, the method 2200 moves to step 2264, where a new segment is created to point to the correct position in the receive buffer 110. In step 2266, the segment's timer ID is set to null and the number of retries for the timer is set to zero. The segment is then inserted. In step 2268, the data is copied. In step 2270, the end pointer is recalculated to point to the end of the contiguous data within the receive buffer 110. In step 2272, any waiting readers are signaled to indicate that there is new data in the receive buffer 110. The method 2200 then moves to step 2274.

Figure 22D:
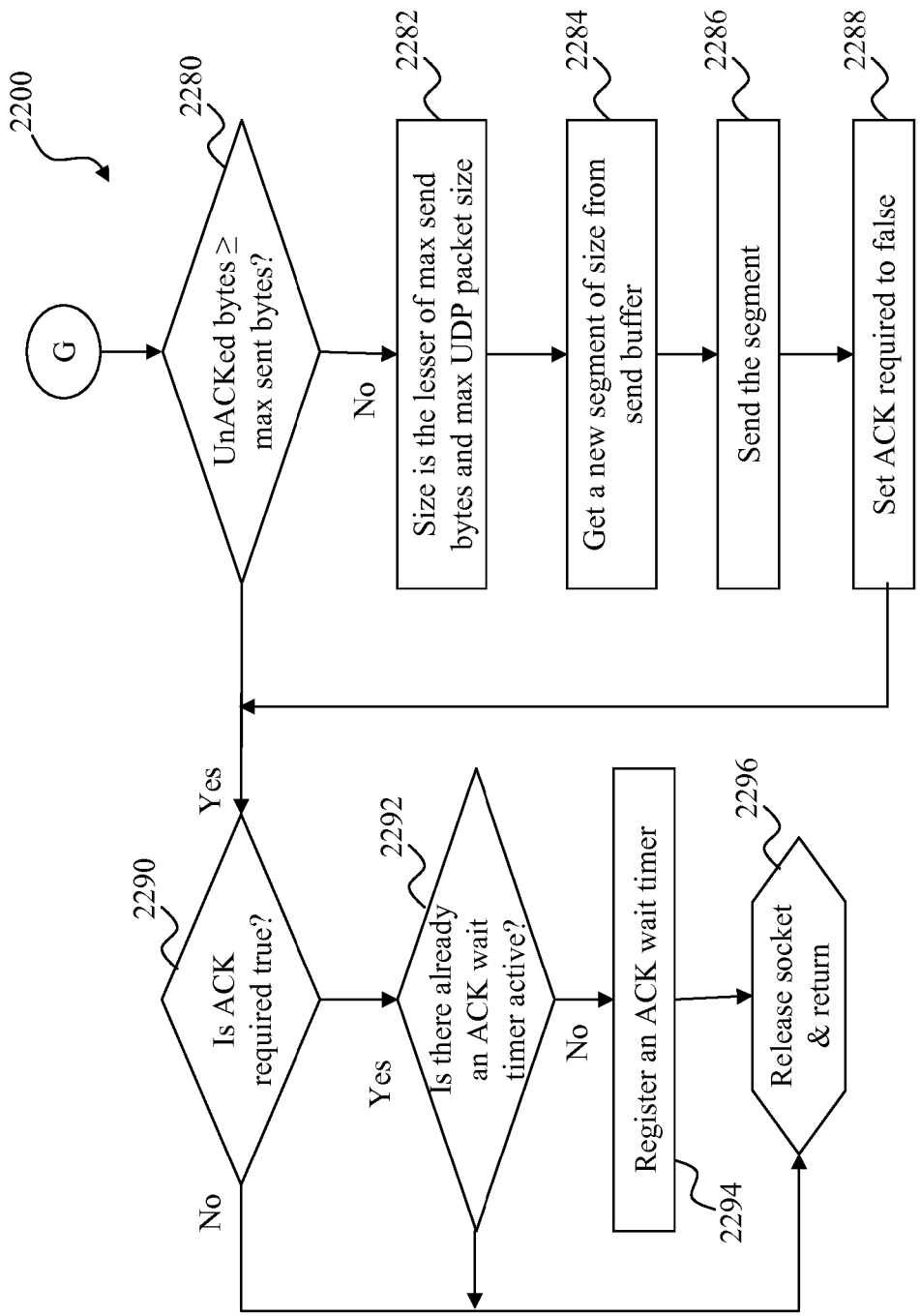

In step 2274, the available remote window is computed as the remote window position minus the start pointer position (i.e., available remote window=remote window position−start pointer position). In step 2276, the maximum number of send bytes is set as the lesser of the congestion window and the remote window. In step 2278, the number of unacknowledged bytes in the send buffer 112 is obtained. The method 2200 then moves to step 2280 (FIG. 22D).

In step 2280, a determination is made as to whether the number of unacknowledged bytes is greater than or equal to the maximum number of send bytes. If the number of unacknowledged bytes is not greater than or equal to the maximum number of send bytes, the method 2200 moves to step 2282, where a size value is set as the lesser of the maximum number of send bytes and the maximum UDP packet size. In step 2284, a new segment of the size value set in step 2282 is retrieved from the send buffer 112. In step 2286, the segment is sent and, in step 2288, an ACK required flag is set to false to indicate that an ACK is not required for the segment sent in step 2284. The method 2200 then moves to step 2290, which is also the next step if it is determined in step 2280 that the number of unacknowledged bytes is greater than or equal to the maximum number of send bytes.

In step 2290, a determination is made as to whether the ACK required flag is set to true, indicating that an acknowledgement is required. If no ACK is required, the method 2200 moves to step 2296, where the socket is released and the method returns. If an ACK is required, the method 2200 moves to step 2292, where a determination is made as to whether there is already an ACK wait timer active. If there is an ACK wait timer active, the method 2200 moves to step 2296, where the socket is released and the method returns. If there is not an ACK wait timer active, the method 2200 moves to step 2294, where an ACK wait timer is registered before the method 2200 moves to step 2296.

Referring again to FIG. 22B, if the current ACK position is not the same as the ACK byte in the packet as determined in step 2234, the method 2200 moves to step 2236. In step 2236, the method 2200 moves out of the congestion that is occurring. In step 2238, a determination is made as to whether the congestion window is greater than one half of the last congestion window (i.e., current congestion window >0.5*last congestion window). If the current congestion window is greater, the method 2200 moves to step 2240, where the congestion window is increased by the number of ACK bytes divided by the slowdown factor (i.e., congestion window=congestion window+(ACK bytes/slowdown factor). The method 2200 then moves to step 2242. If the current congestion window is not greater as determined in step 2238, the method 2200 moves to step 2242.

In step 2242, a determination is made as to whether the ACK position (as represented by the ACK pointer in the receive buffer 110) is less than the ACK byte in the received packet. If the ACK position is less, the method 2200 moves to step 2244, where the segment at the current ACK pointer position is retrieved from the receive buffer 110. In step 2246, a determination is made as to whether the number of tries for this segment is equal to one (i.e., number of tries=1). If the number of tries is equal to one, the method 2200 moves to step 2248, where RTT is recomputed for this segment sent time. The method 2200 then moves to step 2250, which is also the step to which the method 2200 moves if the number of retries is not equal to one. In step 2250, the timer for this segment is unregistered and, in step 2252, the position of the ACK pointer in the receive buffer 110 is moved to reflect the size of this segment. The method 2200 then returns to step 2242.

Figure 22E:
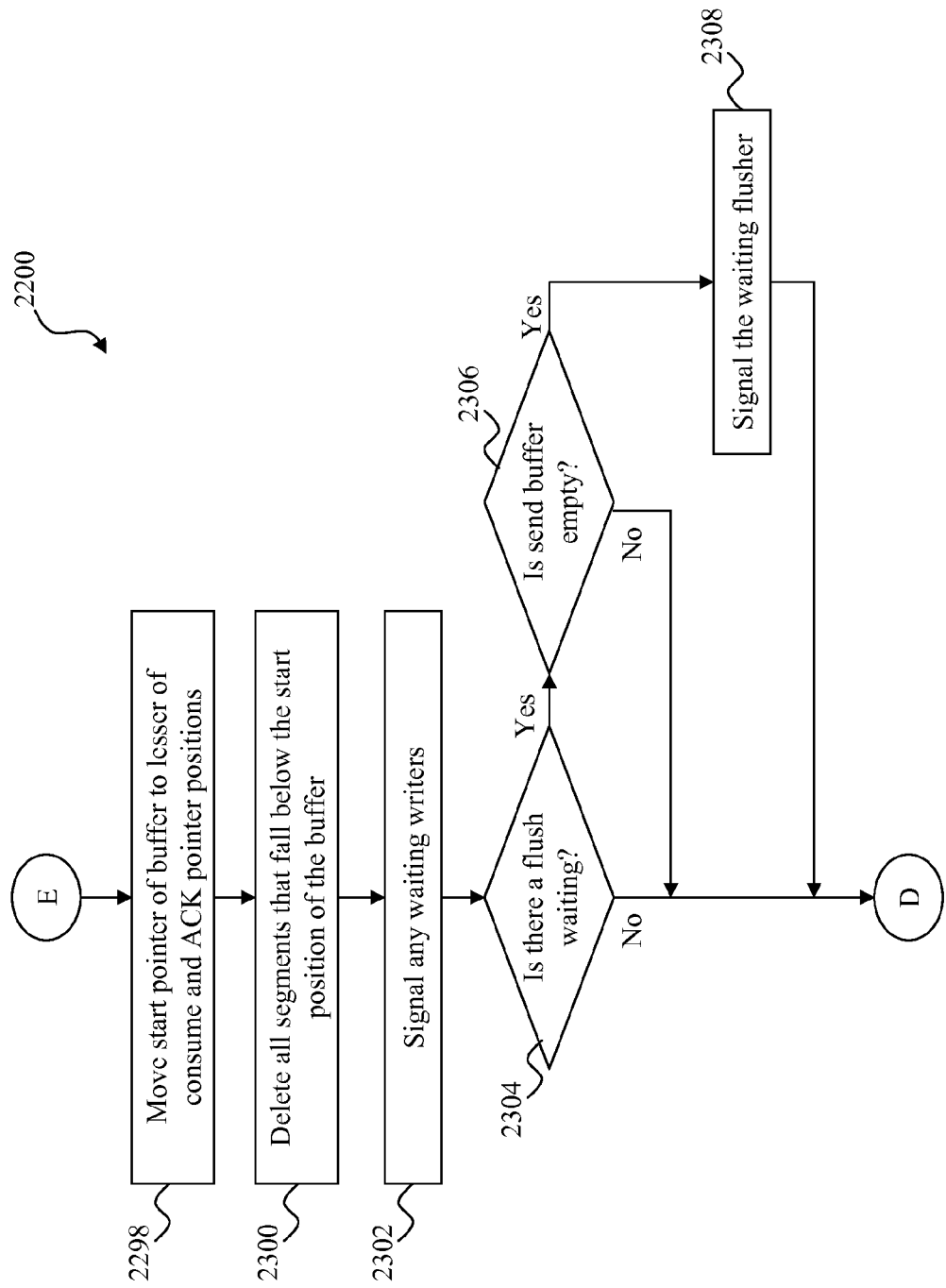

If the ACK position is not less as determined in step 2242, the method 2200 moves to step 2298 (FIG. 22E). In step 2298, the start pointer is moved to the lesser of the consume pointer and the ACK pointer positions. In step 2300, all segments that fall below the start position of the buffer are deleted. In step 2302, any waiting writers are signaled. In step 2304, a determination is made as to whether there is a flush waiting. If there is a flush waiting, the method 2200 moves to step 2306, where a determination is made as to whether the send buffer is empty. If the send buffer is empty, the method 2200 moves to step 2308, where the waiting flusher is signaled. The method 2200 then moves to 2254 (FIG. 22C) and following steps as previously described. The method 2200 also moves to step 2254 if there is not a flush waiting as determined in step 2304 or if the send buffer is not empty as determined in step 2306.

Referring again to FIG. 22A, the packet type may be identified as a Connect packet. With additional reference to FIG. 22F, identifying the packet as a Connect packet moves the method 2200 to step 2310. In step 2310, a determination is made as to whether the socket is in a connecting state. If the socket is not in the connecting state, the method 2200 moves to step 2322, where the socket is released and the method returns. If the socket is in the connecting state, the method 2200 moves to step 2312, where the status is set as connected. In step 2314, a notification is sent to inform the application 114 of the status change. In step 2316, any waiting connecters are signaled. In step 2318, the remote window size is obtained from the received packet. In step 2320, the connect timer is unregistered. The method 2200 then moves to step 2322, where the socket is released and the method returns.

Referring again to FIG. 22A, the packet type may be identified as an Accept packet. With additional reference to FIG. 22G, identifying the packet as an Accept packet moves the method 2200 to step 2324. In step 2324, a determination is made as to whether the socket is in an accepting state or is connected without receiving any bytes. If the socket is not in the accepting state or connected without receiving any bytes, the method 2200 moves to step 2336, where the socket is released and the method returns. If the socket is in the accepting state or connected without receiving any bytes, the method 2200 moves to step 2326, where the status is set as connected. In step 2328, a notification is sent to inform the application 114 of the status change. In step 2330, any waiting connecters are signaled. In step 2332, the remote window size is obtained from the received packet. In step 2334, an accept packet is sent with no data. The method 2200 then moves to step 2336, where the socket is released and the method returns.

Referring again to FIG. 22A, the packet type may be identified as a packet that is not Data, Connect, Accept or Close. In the present example, this packet has no known type and the method 2200 moves to step 2218, where the socket is released and the method returns. It is understood that other handling processes may be implemented for packets of unrecognized types.

Step 2216 may also identify the packet as a Close packet. If so identified, the method 2200 moves to step 2220, where the socket is closed. In step 2222, the application 114 is notified of the socket closure. In step 2224, any waiting readers, writers, connectors, and flushers are signaled that the socket is closed. The method 2200 then returns in step 2226.

Referring to FIG. 23, one embodiment of a peer-to-peer hybrid system 2350 is illustrated. The system 2350 includes an access server 2352 that is coupled to endpoints 2354 and 2356 via a packet network 2358 that may form part or all of the network 105 of FIG. 1. In some embodiments, the endpoints 2354 and 2356 may represent peer-to-peer functionality present on the communication devices 102 and 104 of FIG. 1, and so the peer-to-peer architectures and functions described in this embodiment and following embodiments may be used with the preceding embodiments.

Communication between the access server 2352, endpoint 2354, and endpoint 2356 is accomplished using predefined and publicly available (i.e., non-proprietary) communication standards or protocols (e.g., those defined by the IETF or the ITU-T). For example, signaling communications (e.g., session setup, management, and teardown) may use a protocol such as SIP, while actual data traffic may be communicated using a protocol such as RTP. As will be seen in the following examples, the use of standard protocols for communication enables the endpoints 2354 and 2356 to communicate with any device that uses the same standards. The communications may include, but are not limited to, voice calls, instant messages, audio and video, emails, and any other type of resource transfer, where a resource represents any digital data. In the following description, media traffic is generally based on UDP, while authentication is based on the TCP/IP. However, it is understood that these are used for purposes of example and that other protocols may be used in addition to or instead of UDP and TCP/IP.

Connections between the access server 2352, endpoint 2354, and endpoint 2356 may include wireline and/or wireless communication channels. In the following description, it is understood that the term "direct" means that there is no endpoint or access server in the communication channel(s) between the endpoints 2354 and 2356, or between either endpoint and the access server. Accordingly, the access server 2352, endpoint 2354, and endpoint 2356 are directly connected even if other devices (e.g., routers, firewalls, and other network elements) are positioned between them. In addition, connections to endpoints, locations, or services may be subscription based, with an endpoint only having access if the endpoint has a current subscription. Furthermore, the following description may use the terms "user" and "endpoint" interchangeably, although it is understood that a user may be using any of a plurality of endpoints. Accordingly, if an endpoint logs in to the network, it is understood that the user is logging in via the endpoint and that the endpoint represents the user on the network using the user's identity.

The access server 2352 stores profile information for a user, a session table to track what users are currently online, and a routing table that matches the address of an endpoint to each online user. The profile information includes a "buddy list" for each user that identifies other users ("buddies") that have previously agreed to communicate with the user. Online users on the buddy list will show up when a user logs in, and buddies who log in later will directly notify the user that they are online (as described with respect to FIG. 26). The access server 2352 provides the relevant profile information and routing table to each of the endpoints 2354 and 2356 so that the endpoints can communicate directly with one another. Accordingly, in the present embodiment, one function of the access server 2352 is to serve as a storage location for information needed by an endpoint in order to communicate with other endpoints and as a temporary storage location for requests, voicemails, etc., as will be described later in greater detail.

With additional reference to FIG. 24A, one embodiment of an architecture 2400 for the access server 2352 of FIG. 23 is illustrated. The architecture 2400 includes functionality that may be provided by hardware and/or software, and that may be combined into a single hardware platform or distributed among multiple hardware platforms. For purposes of illustration, the access server in the following examples is described as a single device, but it is understood that the term applies equally to any type of environment (including a distributed environment) in which at least a portion of the functionality attributed to the access server is present.

In the present example, the architecture includes web services 2402 (e.g., based on functionality provided by XML, SOAP, NET, MONO), web server 2404 (using, for example, Apache or IIS), and database 2406 (using, for example, mySQL or SQLServer) for storing and retrieving routing tables 2408, profiles 2410, and one or more session tables 2412. Functionality for a STUN (Simple Traversal of UDP through NATs (Network Address Translation)) server 2414 is also present in the architecture 2400. As is known, STUN is a protocol for assisting devices that are behind a NAT firewall or router with their packet routing. The architecture 2400 may also include a redirect server 2416 for handling requests originating outside of the system 2350. One or both of the STUN server 2414 and redirect server 2416 may be incorporated into the access server 2352 or may be a standalone device. In the present embodiment, both the server 2404 and the redirect server 2416 are coupled to the database 2406.

Figure 24B:
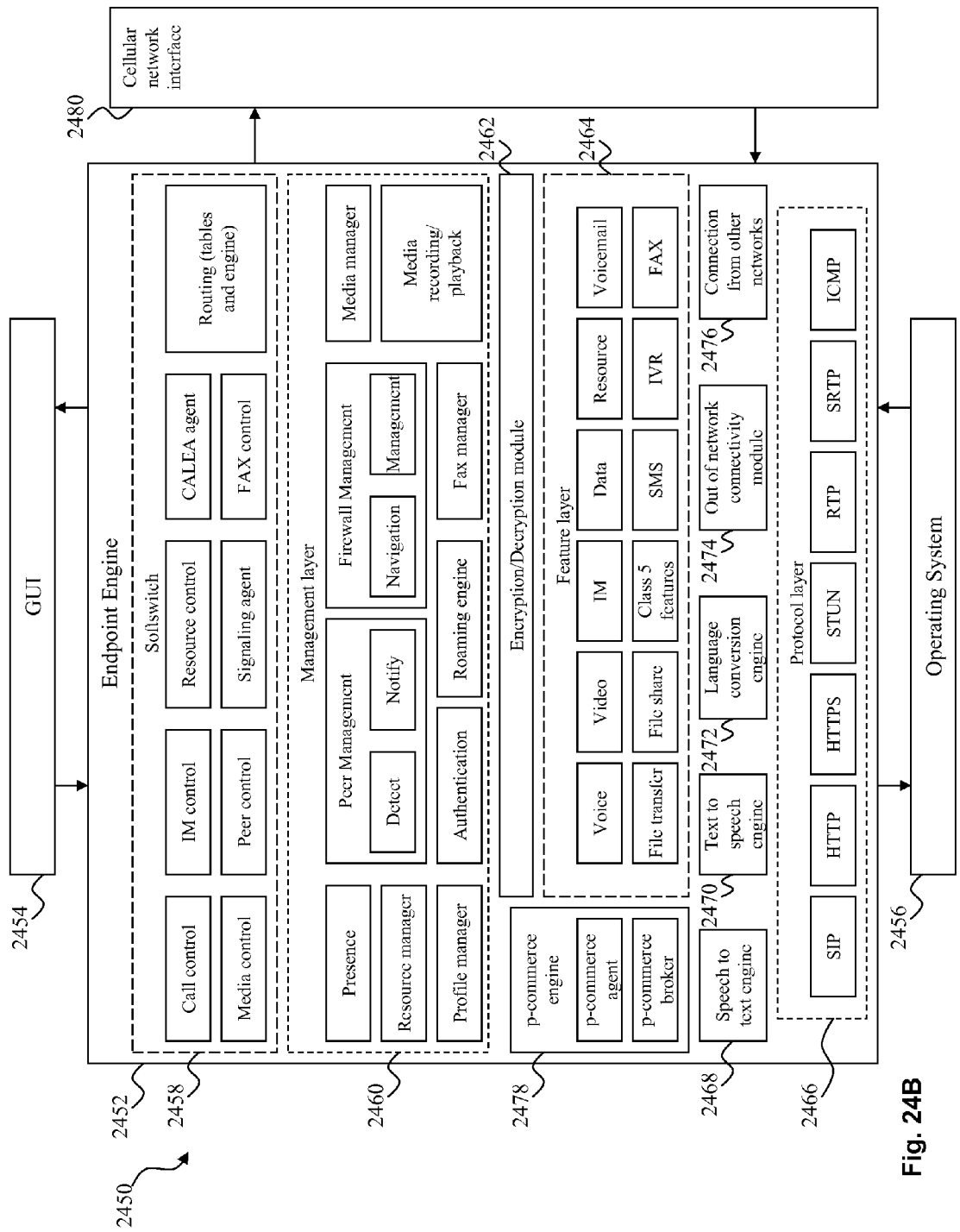
FIG. 24B illustrates one embodiment of an endpoint architecture that may be used by a device within the system of FIG. 23.

Referring to FIG. 24B, one embodiment of an architecture 2450 for the endpoint 2354 (which may be similar or identical to the endpoint 2356) of FIG. 23 is illustrated. It is understood that that term "endpoint" may refer to many different devices having some or all of the described functionality, including a computer, a VoIP telephone, a personal digital assistant, a cellular phone, or any other device having an IP stack upon which the needed protocols may be run. The architecture 2450 includes an endpoint engine 2452 positioned between a graphical user interface (GUI) 2454 and an operating system 2456. The GUI 2454 provides user access to the endpoint engine 2452, while the operating system 2456 provides underlying functionality, as is known to those of skill in the art.

The endpoint engine 2452 may include multiple components and layers that support the functionality required to perform the operations of the endpoint 2354. For example, the endpoint engine 2452 includes a softswitch 2458, a management layer 2460, an encryption/decryption module 2462, a feature layer 2464, a protocol layer 2466, a speech-to-text engine 2468, a text-to-speech engine 2470, a language conversion engine 2472, an out-of-network connectivity module 2474, a connection from other networks module 2476, a p-commerce (e.g., peer commerce) engine 2478 that includes a p-commerce agent and a p-commerce broker, and a cellular network interface module 2480.

Each of these components/layers may be further divided into multiple modules. For example, the softswitch 2458 includes a call control module, an instant messaging (IM) control module, a resource control module, a CALEA (Communications Assistance to Law Enforcement Act) agent, a media control module, a peer control module, a signaling agent, a fax control module, and a routing module.

The management layer 2460 includes modules for presence (i.e., network presence), peer management (detecting peers and notifying peers of being online), firewall management (navigation and management), media management, resource management, profile management, authentication, roaming, fax management, and media playback/recording management.

The encryption/decryption module 2462 provides encryption for outgoing packets and decryption for incoming packets. In the present example, the encryption/decryption module 2462 provides application level encryption at the source, rather than at the network. However, it is understood that the encryption/decryption module 2462 may provide encryption at the network in some embodiments.

The feature layer 2464 provides support for various features such as voice, video, IM, data, voicemail, file transfer, file sharing, class 5 features, short message service (SMS), interactive voice response (IVR), faxes, and other resources. The protocol layer 2466 includes protocols supported by the endpoint, including SIP, HTTP, HTTPS, STUN, RTP, SRTP, and ICMP. It is understood that these are examples only, and that fewer or more protocols may be supported.

The speech-to-text engine 2468 converts speech received by the endpoint (e.g., via a microphone or network) into text, the text-to-speech engine 2470 converts text received by the endpoint into speech (e.g., for output via a speaker), and the language conversion engine 2472 may be configured to convert inbound or outbound information (text or speech) from one language to another language. The out-of-network connectivity module 2474 may be used to handle connections between the endpoint and external devices (as described with respect to FIG. 12), and the connection from other networks module 2476 handles incoming connection attempts from external devices. The cellular network interface module 2480 may be used to interact with a wireless network.

With additional reference to FIG. 24C, the cellular network interface module 2480 is illustrated in greater detail. Although not shown in FIG. 24B, the softswitch 2458 of the endpoint architecture 2450 includes a cellular network interface for communication with the cellular network interface module 2480. In addition, the cellular network interface module 2480 includes various components such as a call control module, a signaling agent, a media manager, a protocol stack, and a device interface. It is noted that these components may correspond to layers within the endpoint architecture 2450 and may be incorporated directly into the endpoint architecture in some embodiments.

Referring again to FIG. 24B, in operation, the softswitch 2458 uses functionality provided by underlying layers to handle connections with other endpoints and the access server 2352, and to handle services needed by the endpoint 2354. For example, as is described below in greater detail with respect to FIGS. 25A and 25B, incoming and outgoing calls may utilize multiple components within the endpoint architecture 2450.

Figure 25A:
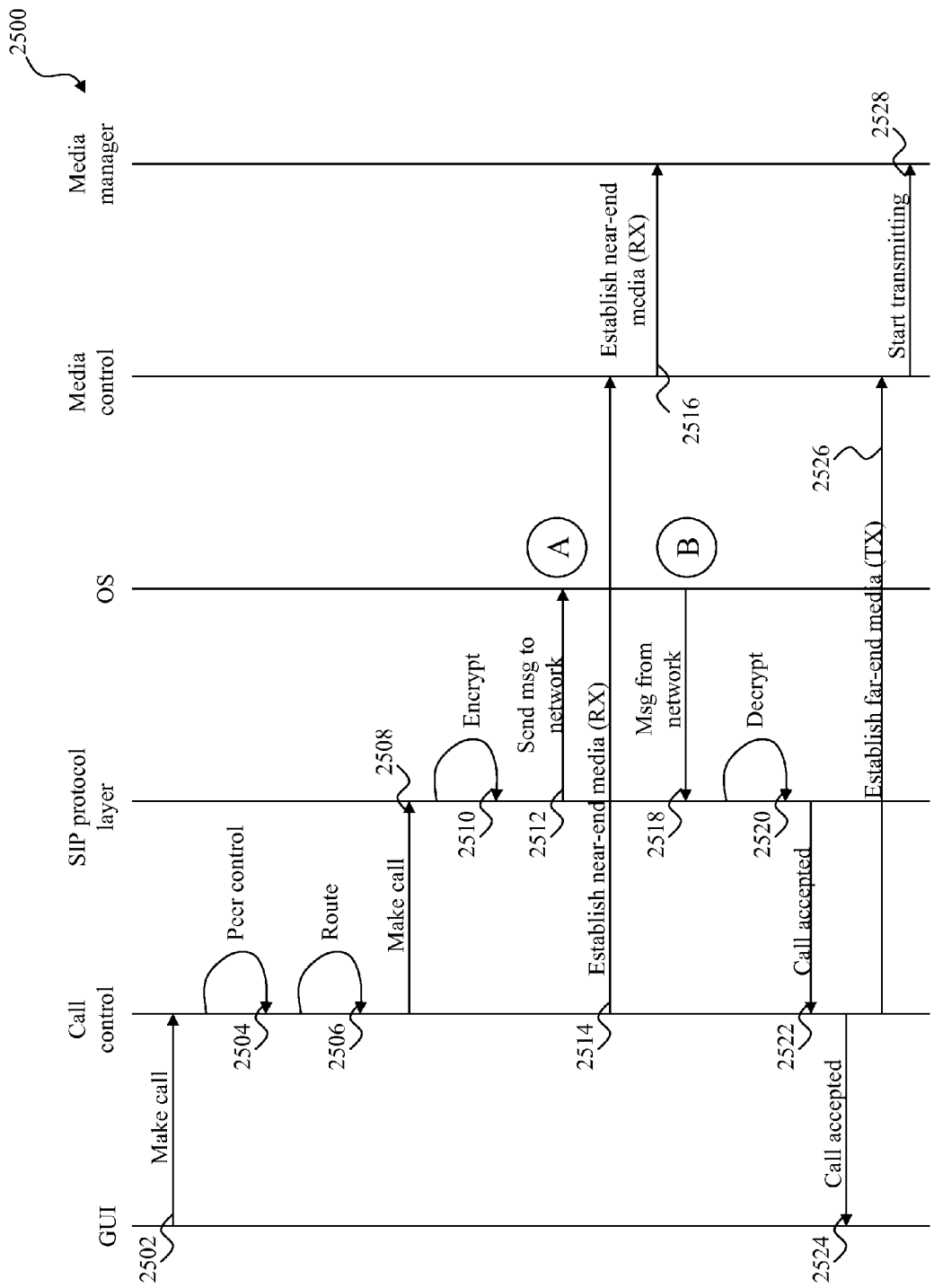
FIG. 25A is a sequence diagram illustrating the interaction of various components of FIG. 24B when placing a call.

Referring to FIG. 25A, a sequence diagram 2500 illustrates an exemplary process by which the endpoint 2354 may initiate a call to the endpoint 2356 using various components of the architecture 2450. Prior to step 2502, a user (not shown) initiates a call via the GUI 2454. In step 2502, the GUI 2454 passes a message to the call control module (of the softswitch 2458) to make the call. The call control module contacts the peer control module (softswitch 2458) in step 2504, which detects the peer (if not already done), goes to the routing table (softswitch 2458) for the routing information, and performs similar operations. It is understood that not all interactions are illustrated. For example, the peer control module may utilize the peer management module (of the management layer 2460) for the peer detection. The call control module then identifies a route for the call in step 2506, and sends message to the SIP protocol layer (of the protocol layer 2466) to make the call in step 2508. In step 2510, the outbound message is encrypted (using the encryption/decryption module 2462) and the message is sent to the network via the OS 2456 in step 2512.

After the message is sent and prior to receiving a response, the call control module instructs the media control module (softswitch 2458) to establish the needed near-end media in step 2514. The media control module passes the instruction to the media manager (of the management layer 2460) in step 2516, which handles the establishment of the near-end media.

Figure 25B:
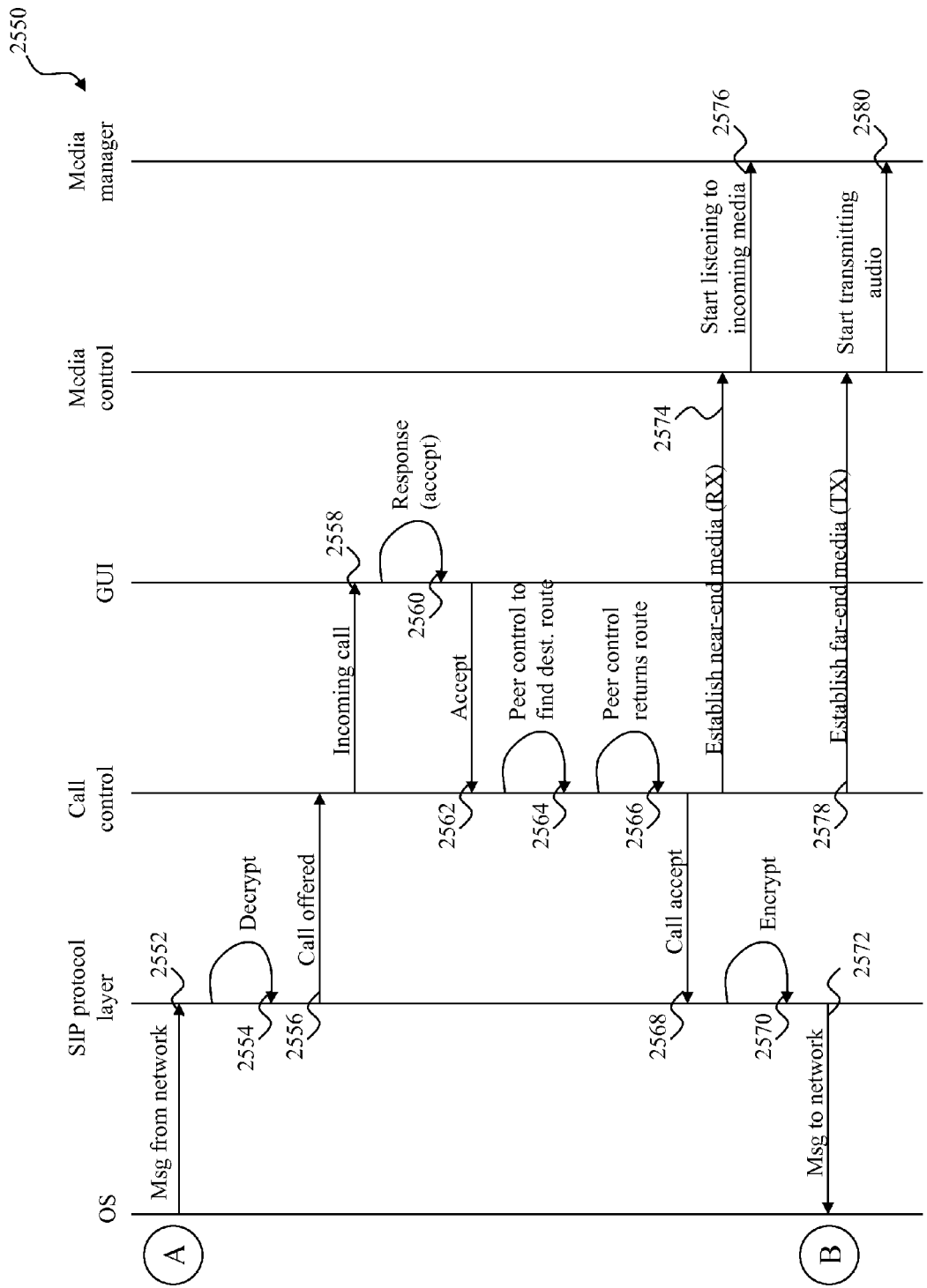
FIG. 25B is a sequence diagram illustrating the interaction of various components of FIG. 24B when receiving a call.

With additional reference to FIG. 25B, the message sent by the endpoint 2354 in step 2512 (FIG. 25A) is received by the endpoint 2356 and passed from the OS to the SIP protocol layer in step 2552. The message is decrypted in step 2554 and the call is offered to the call control module in step 2556. The call control module notifies the GUI of an incoming call in step 2558 and the GUI receives input identifying whether the call is accepted or rejected (e.g., by a user) in step 2560. In the present example, the call is accepted and the GUI passes the acceptance to the call control module in step 2562. The call control module contacts the peer control module in step 2564, which identifies a route to the calling endpoint and returns the route to the call control module in step 2566. In steps 2568 and 2570, the call control module informs the SIP protocol layer that the call has been accepted and the message is encrypted using the encryption/decryption module. The acceptance message is then sent to the network via the OS in step 2572.

In the present example, after the call control module passes the acceptance message to the SIP protocol layer, other steps may occur to prepare the endpoint 2356 for the call. For example, the call control module instructs the media control module to establish near-end media in step 2574, and the media control module instructs the media manager to start listening to incoming media in step 2576. The call control module also instructs the media control module to establish far-end media (step 2578), and the media control module instructs the media manager to start transmitting audio in step 2580.

Returning to FIG. 25A, the message sent by the endpoint 2356 (step 2572) is received by the OS and passed on to the SIP protocol layer in step 2518 and decrypted in step 2520. The message (indicating that the call has been accepted) is passed to the call control module in step 2522 and from there to the GUI in step 2524. The call control module then instructs the media control module to establish far-end media in step 2526, and the media control module instructs the media manager to start transmitting audio in step 2528.

Figure 26:
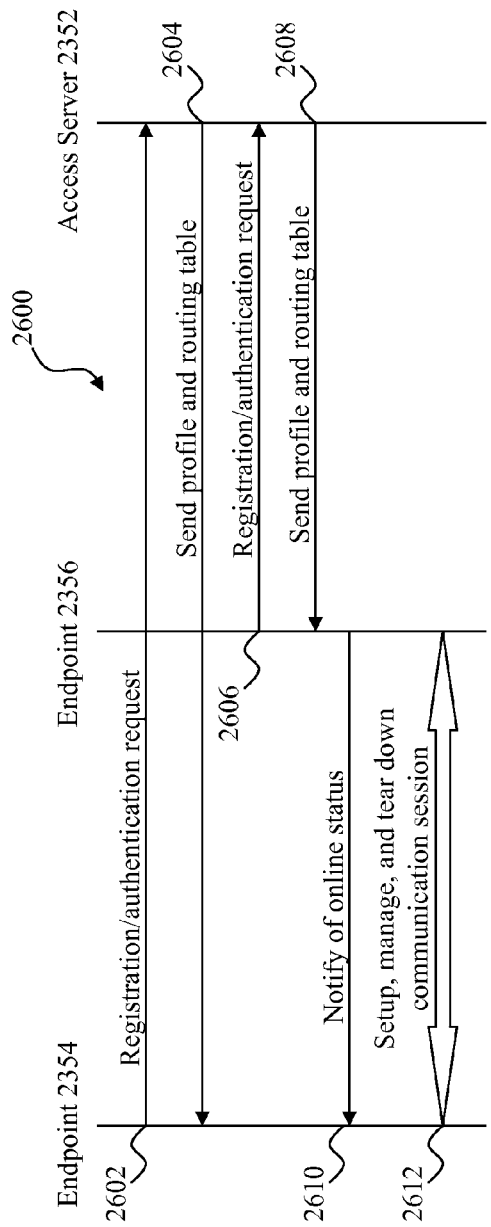
FIG. 26 is a sequence diagram illustrating an exemplary process by which an endpoint of FIG. 23 may be authenticated and communicate with another endpoint.

Referring to FIG. 26 (and using the endpoint 2354 as an example), a sequence diagram 2600 illustrates an exemplary process by which the endpoint 2354 may authenticate with the access server 2352 and then communicate with the endpoint 2356. As will be described, after authentication, all communication (both signaling and media traffic) between the endpoints 2354 and 2356 occurs directly without any intervention by the access server 2352. In the present example, it is understood that neither endpoint is online at the beginning of the sequence, and that the endpoints 2354 and 2356 are "buddies." As described above, buddies are endpoints that have both previously agreed to communicate with one another.

In step 2602, the endpoint 2354 sends a registration and/or authentication request message to the access server 2352. If the endpoint 2354 is not registered with the access server 2352, the access server will receive the registration request (e.g., user ID, password, and email address) and will create a profile for the endpoint (not shown). The user ID and password will then be used to authenticate the endpoint 2354 during later logins. It is understood that the user ID and password may enable the user to authenticate from any endpoint, rather than only the endpoint 2354.

Upon authentication, the access server 2352 updates a session table residing on the server to indicate that the user ID currently associated with the endpoint 2354 is online. The access server 2352 also retrieves a buddy list associated with the user ID currently used by the endpoint 2354 and identifies which of the buddies (if any) are online using the session table. As the endpoint 2356 is currently offline, the buddy list will reflect this status. The access server 2352 then sends the profile information (e.g., the buddy list) and a routing table to the endpoint 2354 in step 2604. The routing table contains address information for online members of the buddy list. It is understood that steps 2602 and 2604 represent a make and break connection that is broken after the endpoint 2354 receives the profile information and routing table.

In steps 2606 and 2608, the endpoint 2356 and access server 2352 repeat steps 2602 and 2604 as described for the endpoint 2354. However, because the endpoint 2354 is online when the endpoint 2356 is authenticated, the profile information sent to the endpoint 2356 will reflect the online status of the endpoint 2354 and the routing table will identify how to directly contact it. Accordingly, in step 2610, the endpoint 2356 sends a message directly to the endpoint 2354 to notify the endpoint 2354 that the endpoint 2356 is now online. This also provides the endpoint 2354 with the address information needed to communicate directly with the endpoint 2356. In step 2612, one or more communication sessions may be established directly between the endpoints 2354 and 2356.

Additional details of endpoints and endpoint functionality, including routing and NAT traversal functionality that may be used to establish and maintain a sharing session as described herein, are provided in U.S. Pat. No. 7,656,870, filed on Mar. 15, 2005, and entitled SYSTEM AND METHOD FOR PEER-TO-PEER HYBRID COMMUNICATIONS; U.S. Pat. No. 7,570,636, filed on Aug. 30, 2005, and entitled SYSTEM AND METHOD FOR TRAVERSING A NAT DEVICE FOR PEER-TO-PEER HYBRID COMMUNICATIONS; and U.S. patent application Ser. No. 12/705,925, filed on Feb. 15, 2010, and entitled SYSTEM AND METHOD FOR STRATEGIC ROUTING IN A PEER-TO-PEER ENVIRONMENT, as previously incorporated by reference in their entirety.

Figure 27:
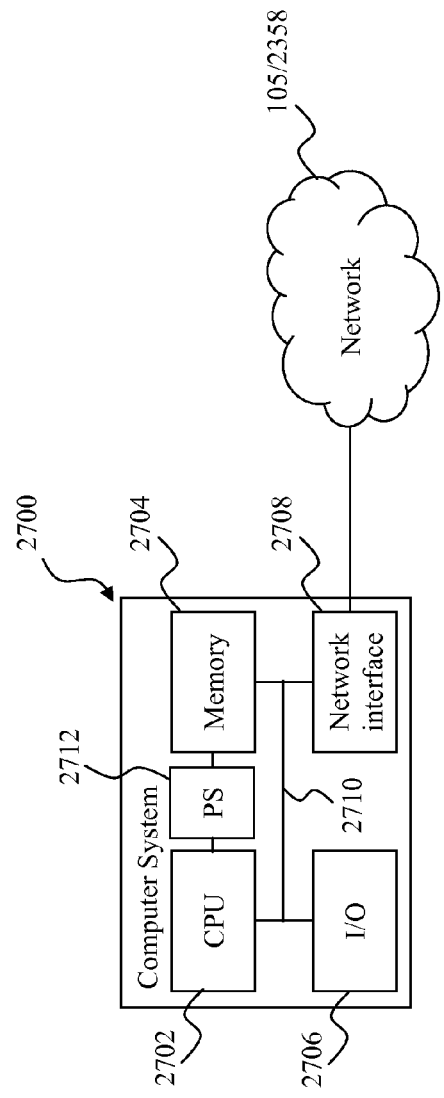
FIG. 27 is a simplified diagram of one embodiment of a computer system that may be used in embodiments of the present disclosure as a communication device and/or an endpoint.

Referring to FIG. 27, one embodiment of a computer system 2700 is illustrated. The computer system 2700 is one possible example of a system component or computing device such as a communication device, a document server, an endpoint, and/or an access server. The computer system 2700 may include a controller (e.g., a central processing unit ("CPU")) 2702, a memory unit 2704, an input/output ("I/O") device 2706, and a network interface 2708. The components 2702, 2704, 2706, and 2708 are interconnected by a transport system (e.g., a bus) 2710. A power supply (PS) 2712 may provide power to components of the computer system 2700, such as the CPU 2702 and memory unit 2704. It is understood that the computer system 2700 may be differently configured and that each of the listed components may actually represent several different components. For example, the CPU 2702 may actually represent a multi-processor or a distributed processing system; the memory unit 2704 may include different levels of cache memory, main memory, hard disks, and remote storage locations; the I/O device 2706 may include monitors, keyboards, and the like; and the network interface 2708 may include one or more network cards providing one or more wired and/or wireless connections to the network 105 (FIG. 1) and/or the network 2358 (FIG. 23). Therefore, a wide range of flexibility is anticipated in the configuration of the computer system 2700.

The computer system 2700 may use any operating system (or multiple operating systems), including various versions of operating systems provided by Microsoft (such as WINDOWS), Apple (such as Mac OS X), UNIX, and LINUX, and may include operating systems specifically developed for handheld devices, personal computers, and servers depending on the use of the computer system 2700. The operating system, as well as other instructions (e.g., for the endpoint engine 2452 of FIG. 24b if an endpoint), may be stored in the memory unit 2704 and executed by the processor 2702. For example, if the computer system 2700 is one of communication devices 102 and 104 or one of the endpoints 2354 and 2356, the memory unit 2704 may include instructions for performing some or all of the message sequences and methods described with respect to FIGS. 4-22G and 25A-26.

Accordingly, in one embodiment, a method for streaming data using a virtual bi-directional data stream between a first communication device and a second communication device comprises: creating, by the first device, a streaming data packet D1; inserting, by the first device, the data segment and D1 into a payload section of a connection-less transport layer packet, wherein at least one of D1 and the transport layer packet includes a send field identifying a starting location in the data stream of a data segment to be sent with D1, an acknowledgement (ACK) field identifying a location in the data stream up to which all data has been received by the first device, a unique identifier (UID) identifying a connection used by the first device for the data stream, a window field identifying an amount of space available in a receive buffer of the first device, a packet type field, a pad field identifying an amount of padding used to ensure D1 has a predefined length, a network address of the first device, a network address of the second device, and a length of the transport layer packet; sending, by the first device, the transport layer packet to the second device; obtaining, by the first device, a current round trip time (RTT) that is based on first and second RTTs of packets previously sent from the first device to the second device and a configurable RTT variation factor; obtaining, by the first device, a current RTT variance that is based on a previous RTT variance, the first and second RTTs, and a configurable RTT variance variation factor; calculating, by the first device, a timeout for D1 based on the current RTT and the current RTT variance; and resending, by the first device, D1 if the timeout does not exceed a predefined timeout limit and if an ACK for D1 has not been received from the second device. The method may further comprise calculating, by the first device, the current RTT as the RTT for a streaming data packet D2 previously sent from the first device to the second device as RTT+=(CurrRTT−OldRTT)*1/M, wherein CurrRTT represents the first RTT of a streaming data packet D3 that was sent prior to D2 from the first device to the second device, OldRTT represents the second RTT of a streaming data packet D4 that was sent prior to D3 from the first device to the second device, and M represents a configurable RTT variation factor. The method may further comprise calculating, by the first device, the current RTT variance (RTTvar) as the RTTvar that was calculated for D2 as RTTvar+=(CurrRTTVar−Abs(CurrRTT−OldRTT))*1/N, wherein CurrRTTVar represents an RTTvar of D3 and is the previous RTT variance, and N represents a configurable RTT variance variation factor. The timeout for D1 may be calculated as timeout=RTT*X+RTTvar*Y, wherein X is a multiple of the RTT of D2 and Y is a timeout variance based on a percentage of streaming data packet RTTs. The method may further comprise, if the timeout does not exceed the predefined timeout limit and if the ACK for D1 has not been received from the second device, calculating, by the first device, a new timeout for D1 based on a new RTT and the current RTT variance, wherein the new RTT is obtained by increasing the current RTT by a defined time backoff factor. The method may further comprise receiving, by the first device, an ACK from the second device acknowledging receipt of D1 by the second device prior to resending the transport layer packet by the first device, wherein receipt of the ACK stops the first device from resending the transport layer packet. The method may further comprise determining, by the first device, whether the segment has been retransmitted if the ACK has been received from the second device; and calculating a new RTT and a new RTTVar based on D1 if the segment has not been retransmitted. Calculating the new RTT and new RTTVar based on D1 may include calculating the new RTT as RTT+=(CurrRTT−OldRTT)*1/M, wherein CurrRTT represents the RTT of D2 and OldRTT represents the RTT of D3; and calculating the new RTTvar as RTTvar+=(CurrRTTVar−Abs(CurrRTT−OldRTT))*1/N, wherein CurrRTTVar represents the RTTvar of D2. The method may further comprise receiving, by the first device, a streaming data packet D2 from the second device; and inserting, by the first device, an ACK into the ACK field of D1, wherein the ACK acknowledges receipt of D2. The method may further comprise initiating, by the first device, the connection with the second device; establishing, by the first device, the connection for the data stream with the second device; and obtaining, by the first device, a remote window size of the second device during the establishment of the connection, wherein the remote window size identifies an amount of available space on the second device for the data stream. The method may further comprise receiving, by the first device, a request for the connection from the second device; and sending, by the first device, a window size of the first device to the second device during the establishment of the connection, wherein the window size identifies an amount of available space on the first device for the data stream. The method may further comprise inserting an updated window size into the window field of D1. The first and second devices may be peer-to-peer devices that communicate directly with each other and the method may further include establishing, by the first device, a peer-to-peer session for the connection with the second device. Signaling between the first and second devices may be Session Initiation Protocol (SIP) compliant signaling. The transport layer packet may be a User Datagram Protocol (UDP) packet.

In another embodiment, a method for streaming data using a virtual bi-directional data stream between a first device and a second device comprises: establishing, by the first device, a virtual bi-directional data stream connection with the second device; receiving, by the first device, a streaming data packet D1 from the second device; creating, by the first device, a streaming data packet D2 for a segment to be sent from the first device to the second device via the connection, wherein D2 has a send field identifying a location of the data segment in the data stream, an acknowledgement (ACK) field for D1, a unique identifier identifying the connection used by the first device for the data stream, a packet type field, and a window value identifying an amount of space available in a receive buffer of the first device; creating, by the first device, a connection-less transport layer packet containing an IP address of the first device, an IP address of the second device, a length of the transport layer packet, the segment, and D2; sending, by the first device, the transport layer packet to the second device; calculating, by the first device, a timeout for D2 based on a round trip time (RTT) and an RTT variance, wherein the RTT and the RTT variance are based on streaming data packets D3 and D4 previously sent from the first device to the second device; and resending, by the first device, D2 if the timeout does not exceed a predefined timeout limit and if an ACK for D2 has not been received from the second device. The method may further comprise calculating, by the first device, a new RTT as RTT+=(CurrRTT−OldRTT)*1/M, wherein CurrRTT represents the RTT of D3, OldRTT represents the RTT of D4, and M represents a configurable RTT variation factor. The method may further comprise calculating, by the first device, a new RTT variance (RTTvar) as RTTvar+=(CurrRTTVar−Abs(CurrRTT−OldRTT))*1/N, wherein CurrRTTVar represents the RTT variance of D3, and N represents a configurable RTT variance variation factor. Receiving, by the first device, D1 from the second device may include receiving, by the first device, a connection-less transport layer packet associated with the data stream from the second device; and extracting, by the first device, D1 and a segment of the data stream from the transport layer packet. The method may further comprise obtaining from D1, by the first device, a send field value identifying a starting location in the data stream of the segment sent with D1, an ACK field value identifying a location in the data stream up to which all data has been received by the second device, a UID identifying a connection used by the second device for the data stream, a window field value identifying an amount of space available in a receive buffer of the second device, and a packet type field value. The method may further comprise updating, by the first device, a remote window value based on the window field value of D1. The method may further comprise updating, by the first device, a sent pointer in a send buffer of the first device based on the ACK field value of D1. The virtual bi-directional data stream connection may be initiated by either of the first or second devices. Establishing, by the first device, the virtual bi-directional data stream connection with the second device may include establishing a peer-to-peer session between the first and second devices, wherein signaling and data are communicated directly between the first and second devices.

In yet another embodiment, a communication device comprises a network interface configured to send and receive communications via at least one of a wireless and a wireline network; a controller coupled to the network interface; and a memory coupled to the controller, the memory having a plurality of instructions stored thereon for execution by the controller, the instructions including instructions for: establishing, by the first device, a virtual bi-directional connection with a second communication device; receiving, by the first device, a streaming data packet D1 from the second device; creating, by the first device, a streaming data packet D2 for a segment to be sent from the first device to the second device via the connection, wherein D2 has a send field identifying a starting location of the data segment in the data stream, an acknowledgement (ACK) field for D1, a unique identifier identifying the connection used by the first device for the data stream, a packet type, and a window value identifying an amount of space available in a receive buffer of the first device; creating, by the first device, a connection-less transport layer packet containing an IP address of the first device, an IP address of the second device, a length of the transport layer packet, the segment, and D1; sending, by the first device, the transport layer packet to the second device; calculating, by the first device, a timeout for D2 based on a round trip time (RTT) and an RTT variance, wherein the RTT and the RTT variance are based on streaming data packets D3 and D4 previously sent from the first device to the second device; and resending, by the first device, D1 if the timeout does not exceed a predefined timeout limit and if an ACK for D1 has not been received from the second device. The instructions may further include instructions for establishing, by the first device, a peer-to-peer session for the connection with the second device. Signaling between the first and second devices may be Session Initiation Protocol (SIP) compliant signaling. The transport layer packet may be a User Datagram Protocol (UDP) packet.

While the preceding description shows and describes one or more embodiments, it will be understood by those skilled in the art that various changes in form and detail may be made therein without departing from the spirit and scope of the present disclosure. For example, various steps illustrated within a particular sequence diagram or flow chart may be combined or further divided. In addition, steps described in one diagram or flow chart may be incorporated into another diagram or flow chart. Furthermore, the described functionality may be provided by hardware and/or software, and may be distributed or combined into a single platform. Additionally, functionality described in a particular example may be achieved in a manner different than that illustrated, but is still encompassed within the present disclosure. Therefore, the claims should be interpreted in a broad manner, consistent with the present disclosure.

What is claimed is:

1. A method for streaming data using a virtual bi-directional data stream between a first communication device and a second communication device comprising:

creating, by the first device, a streaming data packet D1;

inserting, by the first device, a data segment and D1 into a payload section of a connection-less transport layer packet, wherein at least one of D1 and the connection-less transport layer packet includes a send field identifying a starting location in the data stream of the data segment to be sent with D1, an acknowledgement (ACK) field identifying a location in the data stream up to which all data has been received by the first device, a unique identifier (UID) identifying a connection used by the first device for the data stream, a window field identifying an amount of space available in a receive buffer of the first device, a packet type field, a pad field identifying an amount of padding used to ensure D1 has a predefined length, a network address of the first device, a network address of the second device, and a length of the connection-less transport layer packet;

sending, by the first device, the connection-less transport layer packet to the second device;

obtaining, by the first device, a current round trip time (RTT) that is based on first and second RTTs of packets previously sent from the first device to the second device and a configurable RTT variation factor, wherein the obtaining includes calculating, by the first device, the current RTT as the RTT for a streaming data packet D2 previously sent from the first device to the second device as RTT=RTT+((CurrRTT−OldRTT)*1/M), wherein CurrRTT represents the first RTT of a streaming data packet D3 that was sent prior to D2 from the first device to the second device, OldRTT represents the second RTT of a streaming data packet D4 that was sent prior to D3 from the first device to the second device, and M represents the configurable RTT variation factor;

obtaining, by the first device, a current RTT variance that is based on a previous RTT variance, the first and second RTTs, and a configurable RTT variance variation factor, wherein the obtaining includes calculating, by the first device, the current RTT variance (RTTvar) as the RTTvar that was calculated for D2 as RTTvar=RTTvar+((CurrRTTVar−Abs(CurrRTT−OldRTT))*1/N), wherein CurrRTTVar represents an RTTvar of D3 and is the previous RTT variance, and N represents the configurable RTT variance variation factor;

calculating, by the first device, a timeout for D1 based on the current RTT and the current RTT variance; and resending, by the first device, D1 if the timeout does not exceed a predefined timeout limit and if an ACK for D1 has not been received from the second device.

2. The method of claim 1 wherein calculating, by the first device, the timeout for D1 as timeout=RTT*X+RTTvar*Y, wherein X is a multiple of the RTT of D2 and Y is a timeout variance based on a percentage of streaming data packet RTTs.

3. The method of claim 1 further comprising, if the timeout does not exceed the predefined timeout limit and if the ACK for D1 has not been received from the second device, calculating, by the first device, a new timeout for D1 based on a new RTT and the current RTT variance, wherein the new RTT is obtained by increasing the current RTT by a defined time backoff factor.

4. The method of claim 1 further comprising:

receiving, by the first device, a streaming data packet D2 from the second device; and inserting, by the first device, an ACK into the ACK field of D1, wherein the ACK acknowledges receipt of D2.

5. The method of claim 1 further comprising:

initiating, by the first device, the connection with the second device;

establishing, by the first device, the connection for the data stream with the second device; and obtaining, by the first device, a remote window size of the second device during the establishment of the connection, wherein the remote window size identifies an amount of available space on the second device for the data stream.

6. The method of claim 1 further comprising:

receiving, by the first device, a request for the connection from the second device; and sending, by the first device, a window size of the first device to the second device during the establishment of the connection, wherein the window size identifies an amount of available space on the first device for the data stream.

7. The method of claim 6 further comprising inserting an updated window size into the window field of D1.

8. The method of claim 1 wherein the first and second devices are peer-to-peer devices that communicate directly with each other and wherein the method further includes establishing, by the first device, a peer-to-peer session for the connection with the second device.

9. The method of claim 8 wherein signaling between the first and second devices is Session Initiation Protocol (SIP) compliant signaling.

10. The method of claim 9 wherein the connection-less transport layer packet is a User Datagram Protocol (UDP) packet.

11. The method of claim 1 wherein creating, by the first device, the streaming data packet D1 includes creating D1 with the send field, the ACK field, the UID, the window field, the packet type field, and the pad field, and wherein the network address of the first device, the network address of the second device, and the length of the connection-less transport layer packet are contained in the connection-less transport layer packet and not D1.

12. A method for streaming data using a virtual bi-directional data stream between a first communication device and a second communication device comprising:

creating, by the first device, a streaming data packet D1;

inserting, by the first device, a data segment and D1 into a payload section of a connection-less transport layer packet, wherein at least one of D1 and the connection-less transport layer packet includes a send field identifying a starting location in the data stream of the data segment to be sent with D1, an acknowledgement (ACK) field identifying a location in the data stream up to which all data has been received by the first device, a unique identifier (UID) identifying a connection used by the first device for the data stream, a window field identifying an amount of space available in a receive buffer of the first device, a packet type field, a pad field identifying an amount of padding used to ensure D1 has a predefined length, a network address of the first device, a network address of the second device, and a length of the connection-less transport layer packet sending, by the first device, the connection-less transport layer packet to the second device;

obtaining, by the first device, a current round trip time (RTT) that is based on first and second RTTs of packets previously sent from the first device to the second device and a configurable RTT variation factor;

obtaining, by the first device, a current RTT variance that is based on a previous RTT variance, the first and second RTTs, and a configurable RTT variance variation factor;

calculating, by the first device, a timeout for D1 based on the current RTT and the current RTT variance;

resending, by the first device, D1 if the timeout does not exceed a predefined timeout limit and if an ACK for D1 has not been received from the second device;

receiving, by the first device, an ACK from the second device acknowledging receipt of D1 by the second device prior to resending the connection-less transport layer packet by the first device, wherein receipt of the ACK stops the first device from resending the connection-less transport layer packet;

determining, by the first device, whether the segment has been retransmitted if the ACK has been received from the second device; and calculating a new RTT and a new RTTVar based on D1 if the segment has not been retransmitted, wherein calculating the new RTT and new RTTVar based on D1 includes:
calculating the new RTT as RTT=RTT+((CurrRTT−OldRTT)*1/M), wherein CurrRTT represents the RTT of D2 and OldRTT represents the RTT of D3; and
calculating the new RTTvar as RTTvar=RTTvar+((CurrRTTVar−Abs(CurrRTT−OldRTT))*1/N), wherein CurrRTTVar represents the RTTvar of D2.

13. A method for streaming data using a virtual bi-directional data stream between a first device and a second device comprising:
establishing, by the first device, a virtual bi-directional data stream connection with the second device;
receiving, by the first device, a streaming data packet D1 from the second device;
creating, by the first device, a streaming data packet D2 for a segment to be sent from the first device to the second device via the connection, wherein D2 has a send field identifying a location of the data segment in the data stream, an acknowledgement (ACK) field for D1, a unique identifier identifying the connection used by the first device for the data stream, a packet type field, and a window value identifying an amount of space available in a receive buffer of the first device;
creating, by the first device, a connection-less transport layer packet containing an IP address of the first device, an IP address of the second device, a length of the connection-less transport layer packet, the segment, and D2;
sending, by the first device, the connection-less transport layer packet to the second device;
calculating, by the first device, a timeout for D2 based on a round trip time (RTT) and an RTT variance (RTTvar), wherein the RTT and the RTTvar are based on streaming data packets D3 and D4 previously sent from the first device to the second device, wherein RTT is calculated as RTT=RTT+((CurrRTT−OldRTT)*1/M), wherein CurrRTT represents the RTT of D3, OldRTT represents the RTT of D4, and M represents a configurable RTT variation factor, and wherein RTTvar is calculated as RTTvar=RTTvar+((CurrRTTVar−Abs(CurrRTT−OldRTT))*1/N), wherein CurrRTTVar represents the RTT variance of D3, and N represents a configurable RTT variance variation factor; and resending, by the first device, D2 if the timeout does not exceed a predefined timeout limit and if an ACK for D2 has not been received from the second device.

14. The method of claim 13 wherein receiving, by the first device, D1 from the second device includes:
receiving, by the first device, a connection-less transport layer packet associated with the data stream from the second device; and
extracting, by the first device, D1 and a segment of the data stream from the connection-less transport layer packet.

15. The method of claim 14 further comprising obtaining from D1, by the first device, a send field value identifying a starting location in the data stream of the segment sent with D1, an ACK field value identifying a location in the data stream up to which all data has been received by the second device, a UID identifying a connection used by the second device for the data stream, a window field value identifying an amount of space available in a receive buffer of the second device, and a packet type field value.

16. The method of claim 15 further comprising updating, by the first device, a remote window value based on the window field value of D1.

17. The method of claim 15 further comprising updating, by the first device, a sent pointer in a send buffer of the first device based on the ACK field value of D1.

18. The method of claim 13 wherein the virtual bi-directional data stream connection can be initiated by either of the first or second devices.

19. The method of claim 13 wherein establishing, by the first device, the virtual bi-directional data stream connection with the second device includes establishing a peer-to-peer session between the first and second devices, wherein signaling and data are communicated directly between the first and second devices.

20. A communication device comprising:
a network interface configured to send and receive communications via at least one of a wireless and a wireline network;
a controller coupled to the network interface; and
a memory coupled to the controller, the memory having a plurality of instructions stored thereon for execution by the controller, the instructions including instructions for:
establishing, by the first device, a virtual bi-directional connection with a second communication device;
receiving, by the first device, a streaming data packet D1 from the second device;
creating, by the first device, a streaming data packet D2 for a segment to be sent from the first device to the second device via the connection, wherein D2 has a send field identifying a starting location of the data segment in the data stream, an acknowledgement (ACK) field for D1, a unique identifier identifying the connection used by the first device for the data stream, a packet type, and a window value identifying an amount of space available in a receive buffer of the first device;
creating, by the first device, a connection-less transport layer packet containing an IP address of the first device, an IP address of the second device, a length of the connection-less transport layer packet, the segment, and D1;
sending, by the first device, the connection-less transport layer packet to the second device;
calculating, by the first device, a timeout for D2 based on a round trip time (RTT) and an RTT variance (RTTvar), wherein the RTT and the RTTvar are based on streaming data packets D3 and D4 previously sent from the first device to the second device, wherein RTT is calculated as $RTT=RTT+((CurrRTT-OldRTT)*1/M)$, wherein CurrRTT represents the RTT of D3, OldRTT represents the RTT of D4, and M represents a configurable RTT variation factor, and wherein RTTvar is calculated as $RTTvar=RTTvar+((CurrRTTVar-Abs(CurrRTT-OldRTT))*1/N)$, wherein CurrRTTVar represents the RTT variance of D3, and N represents a configurable RTT variance variation factor; and resending, by the first device, D1 if the timeout does not exceed a predefined timeout limit and if an ACK for D1 has not been received from the second device.

21. The communication device of claim 20 wherein the instructions further include instructions for establishing, by the first device, a peer-to-peer session for the connection with the second device.

22. The communication device of claim 21 wherein signaling between the first and second devices is Session Initiation Protocol (SIP) compliant signaling.

23. The communication device of claim 22 wherein the connection-less transport layer packet is a User Datagram Protocol (UDP) packet.

* * * * *